United States Patent
Luby

(10) Patent No.: US 9,288,010 B2
(45) Date of Patent: Mar. 15, 2016

(54) UNIVERSAL FILE DELIVERY METHODS FOR PROVIDING UNEQUAL ERROR PROTECTION AND BUNDLED FILE DELIVERY SERVICES

(75) Inventor: Michael G. Luby, Berkeley, CA (US)

(73) Assignee: QUALCOMM Incorporated, San Diego, CA (US)

(*) Notice: Subject to any disclaimer, the term of this patent is extended or adjusted under 35 U.S.C. 154(b) by 534 days.

(21) Appl. No.: 13/041,085

(22) Filed: Mar. 4, 2011

(65) Prior Publication Data

US 2012/0099593 A1    Apr. 26, 2012

Related U.S. Application Data

(60) Provisional application No. 61/406,091, filed on Oct. 22, 2010.

(51) Int. Cl.
| | |
|---|---|
| H04L 12/28 | (2006.01) |
| H04L 1/00 | (2006.01) |
| H04L 29/08 | (2006.01) |
| H04L 1/16 | (2006.01) |

(52) U.S. Cl.
CPC ............ *H04L 1/0056* (2013.01); *H04L 1/0083* (2013.01); *H04L 1/0089* (2013.01); *H04L 1/1621* (2013.01); *H04L 67/02* (2013.01); *H04L 1/1607* (2013.01); *H04L 2001/0098* (2013.01)

(58) Field of Classification Search
None
See application file for complete search history.

(56) References Cited

U.S. PATENT DOCUMENTS

| | | |
|---|---|---|
| 3,909,721 A | 9/1975 | Bussgang et al. |
| 4,365,338 A | 12/1982 | McRae et al. |
| 4,589,112 A | 5/1986 | Karim |
| 4,901,319 A | 2/1990 | Ross |
| 5,136,592 A | 8/1992 | Weng |
| 5,153,591 A | 10/1992 | Clark |
| 5,331,320 A | 7/1994 | Cideciyan et al. |
| 5,371,532 A | 12/1994 | Gelman et al. |
| 5,372,532 A | 12/1994 | Robertson, Jr. |
| 5,379,297 A | 1/1995 | Glover et al. |
| 5,421,031 A | 5/1995 | De Bey |
| 5,425,050 A | 6/1995 | Schreiber et al. |

(Continued)

FOREIGN PATENT DOCUMENTS

| | | |
|---|---|---|
| CN | 1338839 A | 3/2002 |
| CN | 1425228 A | 6/2003 |

(Continued)

OTHER PUBLICATIONS

Luby et al, RaptorQ Forward Error Correction Scheme for Object Delivery draft-ietf-rmt-bb-fec-raptorq-00, Qualcomm, Inc. Jan. 28, 2010, 68 Pages.*

(Continued)

*Primary Examiner* — Mounir Moutaouakil

(57) ABSTRACT

Methods and apparatus for delivering data objects from an electronic device or system over a packet-switched network are provided, wherein source data is represented by encoded symbols in packets such that the source data is recoverable, at least approximately, from the encoded symbols, by arranging the source data into a plurality of source symbols, generating a plurality of encoding packets, wherein an encoding packet comprises a universal object symbol identifier ("UOSI") and a plurality of encoding symbols representing source data for a packet structure identified by the UOSI, and sending the plurality of encoding packets to the packet-switched network.

41 Claims, 18 Drawing Sheets

(56) References Cited

U.S. PATENT DOCUMENTS

| | | |
|---|---|---|
| 5,432,787 A | 7/1995 | Chethik |
| 5,455,823 A | 10/1995 | Noreen et al. |
| 5,465,318 A | 11/1995 | Sejnoha |
| 5,517,508 A | 5/1996 | Scott |
| 5,524,025 A | 6/1996 | Lawrence et al. |
| 5,566,208 A | 10/1996 | Balakrishnan |
| 5,568,614 A | 10/1996 | Mendelson et al. |
| 5,583,784 A | 12/1996 | Kapust et al. |
| 5,608,738 A | 3/1997 | Matsushita |
| 5,617,541 A | 4/1997 | Albanese et al. |
| 5,642,365 A | 6/1997 | Murakami et al. |
| 5,659,614 A | 8/1997 | Bailey, III |
| 5,699,473 A | 12/1997 | Kim |
| 5,701,582 A | 12/1997 | DeBey |
| 5,751,336 A | 5/1998 | Aggarwal et al. |
| 5,754,563 A | 5/1998 | White |
| 5,757,415 A | 5/1998 | Asamizuya et al. |
| 5,802,394 A | 9/1998 | Baird et al. |
| 5,805,825 A | 9/1998 | Danneels et al. |
| 5,835,165 A | 11/1998 | Keate et al. |
| 5,844,636 A | 12/1998 | Joseph et al. |
| 5,870,412 A | 2/1999 | Schuster et al. |
| 5,903,775 A | 5/1999 | Murray |
| 5,917,852 A | 6/1999 | Butterfield et al. |
| 5,926,205 A | 7/1999 | Krause et al. |
| 5,933,056 A | 8/1999 | Rothenberg |
| 5,936,659 A | 8/1999 | Viswanathan et al. |
| 5,936,949 A | 8/1999 | Pasternak et al. |
| 5,953,537 A | 9/1999 | Balicki et al. |
| 5,970,098 A | 10/1999 | Herzberg |
| 5,983,383 A | 11/1999 | Wolf |
| 5,993,056 A | 11/1999 | Vaman et al. |
| 6,005,477 A | 12/1999 | Deck et al. |
| 6,011,590 A | 1/2000 | Saukkonen |
| 6,012,159 A | 1/2000 | Fischer et al. |
| 6,014,706 A | 1/2000 | Cannon et al. |
| 6,018,359 A | 1/2000 | Kermode et al. |
| 6,041,001 A | 3/2000 | Estakhri |
| 6,044,485 A | 3/2000 | Dent et al. |
| 6,061,820 A | 5/2000 | Nakakita et al. |
| 6,073,250 A | 6/2000 | Luby et al. |
| 6,079,041 A | 6/2000 | Kunisa et al. |
| 6,079,042 A | 6/2000 | Vaman et al. |
| 6,081,907 A | 6/2000 | Witty et al. |
| 6,081,909 A | 6/2000 | Luby et al. |
| 6,081,918 A | 6/2000 | Spielman |
| 6,088,330 A | 7/2000 | Bruck et al. |
| 6,097,320 A | 8/2000 | Kuki et al. |
| 6,134,596 A | 10/2000 | Bolosky et al. |
| 6,141,053 A | 10/2000 | Saukkonen |
| 6,141,787 A | 10/2000 | Kunisa et al. |
| 6,141,788 A | 10/2000 | Rosenberg et al. |
| 6,154,452 A | 11/2000 | Marko et al. |
| 6,163,870 A | 12/2000 | Luby et al. |
| 6,166,544 A | 12/2000 | Debbins et al. |
| 6,175,944 B1 | 1/2001 | Urbanke et al. |
| 6,178,536 B1 | 1/2001 | Sorkin |
| 6,185,265 B1 | 2/2001 | Campanella |
| 6,195,777 B1 | 2/2001 | Luby et al. |
| 6,223,324 B1 | 4/2001 | Sinha et al. |
| 6,226,259 B1 | 5/2001 | Piret |
| 6,226,301 B1 | 5/2001 | Cheng et al. |
| 6,229,824 B1 | 5/2001 | Marko |
| 6,243,846 B1 | 6/2001 | Schuster et al. |
| 6,272,658 B1 | 8/2001 | Steele et al. |
| 6,278,716 B1 | 8/2001 | Rubenstein et al. |
| 6,298,462 B1 | 10/2001 | Yi |
| 6,307,487 B1 | 10/2001 | Luby |
| 6,314,289 B1 | 11/2001 | Eberlein et al. |
| 6,320,520 B1 | 11/2001 | Luby |
| 6,332,163 B1 | 12/2001 | Bowman-Amuah |
| 6,333,926 B1 | 12/2001 | Van Heeswyk et al. |
| 6,373,406 B2 | 4/2002 | Luby |
| 6,393,065 B1 | 5/2002 | Piret et al. |
| 6,411,223 B1 | 6/2002 | Haken et al. |
| 6,415,326 B1 | 7/2002 | Gupta et al. |
| 6,420,982 B1 | 7/2002 | Brown |
| 6,421,387 B1 | 7/2002 | Rhee |
| 6,430,233 B1 | 8/2002 | Dillon et al. |
| 6,445,717 B1 | 9/2002 | Gibson et al. |
| 6,459,811 B1 | 10/2002 | Hurst, Jr. |
| 6,466,698 B1 | 10/2002 | Creusere |
| 6,473,010 B1 | 10/2002 | Vityaev et al. |
| 6,486,803 B1 | 11/2002 | Luby et al. |
| 6,487,692 B1 | 11/2002 | Morelos-Zaragoza |
| 6,496,980 B1 | 12/2002 | Tillman et al. |
| 6,497,479 B1 | 12/2002 | Stoffel et al. |
| 6,510,177 B1 | 1/2003 | De Bonet et al. |
| 6,523,147 B1 | 2/2003 | Kroeger et al. |
| 6,535,920 B1 | 3/2003 | Parry et al. |
| 6,577,599 B1 | 6/2003 | Gupta et al. |
| 6,584,543 B2 | 6/2003 | Williams et al. |
| 6,609,223 B1 | 8/2003 | Wolfgang |
| 6,614,366 B2 | 9/2003 | Luby |
| 6,618,451 B1 | 9/2003 | Gonikberg |
| 6,631,172 B1 | 10/2003 | Shokrollahi et al. |
| 6,633,856 B2 | 10/2003 | Richardson et al. |
| 6,641,366 B2 | 11/2003 | Nordhoff |
| 6,643,332 B1 | 11/2003 | Morelos-Zaragoza et al. |
| 6,677,864 B2 | 1/2004 | Khayrallah |
| 6,678,855 B1 | 1/2004 | Gemmell |
| 6,694,476 B1 | 2/2004 | Sridharan et al. |
| 6,704,370 B1 | 3/2004 | Chheda et al. |
| 6,732,325 B1 | 5/2004 | Tash et al. |
| 6,742,154 B1 | 5/2004 | Barnard |
| 6,748,441 B1 | 6/2004 | Gemmell |
| 6,751,772 B1 | 6/2004 | Kim et al. |
| 6,765,866 B1 | 7/2004 | Wyatt |
| 6,804,202 B1 | 10/2004 | Hwang |
| 6,810,499 B2 | 10/2004 | Sridharan et al. |
| 6,820,221 B2 | 11/2004 | Fleming |
| 6,831,172 B1 | 12/2004 | Barbucci et al. |
| 6,849,803 B1 | 2/2005 | Gretz |
| 6,850,736 B2 | 2/2005 | McCune, Jr. |
| 6,856,263 B2 | 2/2005 | Shokrollahi et al. |
| 6,868,083 B2 | 3/2005 | Apostolopoulos et al. |
| 6,876,623 B1 | 4/2005 | Lou et al. |
| 6,882,618 B1 | 4/2005 | Sakoda et al. |
| 6,895,547 B2 | 5/2005 | Eleftheriou et al. |
| 6,909,383 B2 | 6/2005 | Shokrollahi et al. |
| 6,928,603 B1 | 8/2005 | Castagna et al. |
| 6,937,618 B1 | 8/2005 | Noda et al. |
| 6,956,875 B2 | 10/2005 | Kapadia et al. |
| 6,965,636 B1 | 11/2005 | DesJardins et al. |
| 6,985,459 B2 | 1/2006 | Dickson |
| 6,995,692 B2 | 2/2006 | Yokota et al. |
| 7,010,052 B2 | 3/2006 | Dill et al. |
| 7,030,785 B2 | 4/2006 | Shokrollahi et al. |
| 7,031,257 B1 | 4/2006 | Lu et al. |
| 7,057,534 B2 | 6/2006 | Luby |
| 7,068,681 B2 | 6/2006 | Chang et al. |
| 7,068,729 B2 | 6/2006 | Shokrollahi et al. |
| 7,072,971 B2 | 7/2006 | Lassen et al. |
| 7,073,191 B2 | 7/2006 | Srikantan et al. |
| 7,100,188 B2 | 8/2006 | Hejna et al. |
| 7,110,412 B2 | 9/2006 | Costa et al. |
| 7,139,660 B2 | 11/2006 | Sarkar et al. |
| 7,139,960 B2 | 11/2006 | Shokrollahi |
| 7,143,433 B1 | 11/2006 | Duan et al. |
| 7,151,754 B1 | 12/2006 | Boyce et al. |
| 7,154,951 B2 | 12/2006 | Wang |
| 7,164,370 B1 | 1/2007 | Mishra |
| 7,164,882 B2 | 1/2007 | Poltorak |
| 7,168,030 B2 | 1/2007 | Ariyoshi |
| 7,219,289 B2 | 5/2007 | Dickson |
| 7,231,404 B2 | 6/2007 | Paila et al. |
| 7,233,264 B2 | 6/2007 | Luby |
| 7,240,236 B2 | 7/2007 | Cutts et al. |
| 7,240,358 B2 | 7/2007 | Horn et al. |
| 7,243,285 B2 | 7/2007 | Foisy et al. |
| 7,249,291 B2 | 7/2007 | Rasmussen et al. |
| 7,254,754 B2 | 8/2007 | Hetzler et al. |
| 7,257,764 B2 | 8/2007 | Suzuki et al. |
| 7,265,688 B2 | 9/2007 | Shokrollahi et al. |

(56) References Cited

U.S. PATENT DOCUMENTS

| | | |
|---|---|---|
| 7,293,222 B2 | 11/2007 | Shokrollahi et al. |
| 7,295,573 B2 | 11/2007 | Yi et al. |
| 7,304,990 B2 | 12/2007 | Rajwan |
| 7,318,180 B2 | 1/2008 | Starr |
| 7,320,099 B2 | 1/2008 | Miura et al. |
| 7,363,048 B2 | 4/2008 | Cheng et al. |
| 7,391,717 B2 | 6/2008 | Klemets et al. |
| 7,394,407 B2 | 7/2008 | Shokrollahi et al. |
| 7,398,454 B2 | 7/2008 | Cai et al. |
| 7,409,626 B1 | 8/2008 | Schelstraete |
| 7,412,641 B2 | 8/2008 | Shokrollahi |
| 7,418,651 B2 | 8/2008 | Luby et al. |
| 7,451,377 B2 | 11/2008 | Shokrollahi |
| 7,483,447 B2 | 1/2009 | Chang et al. |
| 7,483,489 B2 | 1/2009 | Gentric et al. |
| 7,512,697 B2 | 3/2009 | Lassen et al. |
| 7,525,994 B2 | 4/2009 | Scholte |
| 7,529,806 B1 | 5/2009 | Shteyn |
| 7,532,132 B2 | 5/2009 | Shokrollahi et al. |
| 7,555,006 B2 | 6/2009 | Wolfe et al. |
| 7,559,004 B1 | 7/2009 | Chang et al. |
| 7,570,665 B2 | 8/2009 | Ertel et al. |
| 7,574,706 B2 | 8/2009 | Meulemans et al. |
| 7,590,118 B2 | 9/2009 | Giesberts |
| 7,597,423 B2 | 10/2009 | Silverbrook |
| 7,613,183 B1 | 11/2009 | Brewer et al. |
| 7,633,413 B2 | 12/2009 | Shokrollahi et al. |
| 7,633,970 B2 | 12/2009 | Van Kampen et al. |
| 7,644,335 B2 | 1/2010 | Luby et al. |
| 7,650,036 B2 | 1/2010 | Lei et al. |
| 7,668,198 B2 | 2/2010 | Yi et al. |
| 7,676,735 B2 | 3/2010 | Luby et al. |
| 7,711,068 B2 | 5/2010 | Shokrollahi et al. |
| 7,720,096 B2 | 5/2010 | Klemets |
| 7,720,174 B2 | 5/2010 | Shokrollahi et al. |
| 7,721,184 B2 | 5/2010 | Luby et al. |
| 7,812,743 B2 | 10/2010 | Luby |
| 7,831,896 B2 | 11/2010 | Amram et al. |
| 7,924,913 B2 | 4/2011 | Sullivan et al. |
| 7,956,772 B2 | 6/2011 | Shokrollahi et al. |
| 7,961,700 B2 | 6/2011 | Malladi et al. |
| 7,971,129 B2 | 6/2011 | Watson et al. |
| 7,979,769 B2 | 7/2011 | Lee et al. |
| 8,027,328 B2 | 9/2011 | Yang et al. |
| 8,028,322 B2 | 9/2011 | Riedl et al. |
| 8,081,716 B2 | 12/2011 | Kang et al. |
| 8,135,073 B2 | 3/2012 | Shen |
| 8,185,794 B2 | 5/2012 | Lohmar et al. |
| 8,185,809 B2 | 5/2012 | Luby et al. |
| RE43,741 E | 10/2012 | Shokrollahi et al. |
| 8,301,725 B2 | 10/2012 | Biderman et al. |
| 8,327,403 B1 | 12/2012 | Chilvers et al. |
| 8,340,133 B2 | 12/2012 | Kim et al. |
| 8,422,474 B2 | 4/2013 | Park et al. |
| 8,462,643 B2 | 6/2013 | Walton et al. |
| 8,544,043 B2 | 9/2013 | Parekh et al. |
| 8,572,646 B2 | 10/2013 | Haberman et al. |
| 8,615,023 B2 | 12/2013 | Oh et al. |
| 8,638,796 B2 | 1/2014 | Dan et al. |
| 8,713,624 B1 | 4/2014 | Harvey et al. |
| 8,737,421 B2 | 5/2014 | Zhang et al. |
| 8,812,735 B2 | 8/2014 | Igarashi |
| 2001/0015944 A1 | 8/2001 | Takahashi et al. |
| 2001/0033586 A1 | 10/2001 | Takashimizu et al. |
| 2002/0009137 A1 | 1/2002 | Nelson et al. |
| 2002/0053062 A1 | 5/2002 | Szymanski |
| 2002/0083345 A1 | 6/2002 | Halliday et al. |
| 2002/0085013 A1 | 7/2002 | Lippincott |
| 2002/0133247 A1 | 9/2002 | Smith et al. |
| 2002/0141433 A1 | 10/2002 | Kwon et al. |
| 2002/0143953 A1 | 10/2002 | Aiken |
| 2002/0191116 A1 | 12/2002 | Kessler et al. |
| 2003/0005386 A1 | 1/2003 | Bhatt et al. |
| 2003/0037299 A1 | 2/2003 | Smith |
| 2003/0086515 A1 | 5/2003 | Trans et al. |
| 2003/0101408 A1 | 5/2003 | Martinian et al. |
| 2003/0106014 A1 | 6/2003 | Dohmen et al. |
| 2003/0138043 A1 | 7/2003 | Hannuksela |
| 2003/0194211 A1 | 10/2003 | Abecassis |
| 2003/0207696 A1 | 11/2003 | Willenegger et al. |
| 2003/0224773 A1 | 12/2003 | Deeds |
| 2004/0015768 A1 | 1/2004 | Bordes et al. |
| 2004/0031054 A1 | 2/2004 | Dankworth et al. |
| 2004/0049793 A1 | 3/2004 | Chou |
| 2004/0081106 A1 | 4/2004 | Bruhn |
| 2004/0096110 A1 | 5/2004 | Yogeshwar et al. |
| 2004/0117716 A1 | 6/2004 | Shen |
| 2004/0151109 A1 | 8/2004 | Batra et al. |
| 2004/0162071 A1 | 8/2004 | Grilli et al. |
| 2004/0207548 A1 | 10/2004 | Kilbank |
| 2004/0240382 A1 | 12/2004 | Ido et al. |
| 2004/0255328 A1 | 12/2004 | Baldwin et al. |
| 2005/0018635 A1 | 1/2005 | Proctor, Jr. |
| 2005/0028067 A1 | 2/2005 | Weirauch |
| 2005/0071491 A1 | 3/2005 | Seo |
| 2005/0091697 A1 | 4/2005 | Tanaka et al. |
| 2005/0097213 A1 | 5/2005 | Barrett et al. |
| 2005/0105371 A1 | 5/2005 | Johnson et al. |
| 2005/0123058 A1 | 6/2005 | Greenbaum et al. |
| 2005/0138286 A1 | 6/2005 | Franklin et al. |
| 2005/0160272 A1 | 7/2005 | Teppler |
| 2005/0163468 A1 | 7/2005 | Takahashi et al. |
| 2005/0180415 A1 | 8/2005 | Cheung et al. |
| 2005/0193309 A1 | 9/2005 | Grilli et al. |
| 2005/0195752 A1 | 9/2005 | Amin et al. |
| 2005/0207392 A1 | 9/2005 | Sivalingham et al. |
| 2005/0216472 A1* | 9/2005 | Leon et al. ............... 707/10 |
| 2005/0216951 A1 | 9/2005 | MacInnis |
| 2005/0254575 A1 | 11/2005 | Hannuksela et al. |
| 2006/0015568 A1 | 1/2006 | Walsh et al. |
| 2006/0020796 A1 | 1/2006 | Aura et al. |
| 2006/0031738 A1 | 2/2006 | Fay et al. |
| 2006/0037057 A1 | 2/2006 | Xu |
| 2006/0093634 A1 | 5/2006 | Lutz et al. |
| 2006/0107174 A1 | 5/2006 | Heise |
| 2006/0109805 A1 | 5/2006 | Malamal Vadakital et al. |
| 2006/0120464 A1 | 6/2006 | Hannuksela |
| 2006/0212444 A1 | 9/2006 | Handman et al. |
| 2006/0212782 A1 | 9/2006 | Li |
| 2006/0229075 A1 | 10/2006 | Kim et al. |
| 2006/0244824 A1 | 11/2006 | Debey |
| 2006/0244865 A1 | 11/2006 | Simon |
| 2006/0248195 A1 | 11/2006 | Toumura et al. |
| 2006/0256851 A1 | 11/2006 | Wang et al. |
| 2006/0279437 A1 | 12/2006 | Luby et al. |
| 2007/0002953 A1 | 1/2007 | Kusunoki |
| 2007/0006274 A1 | 1/2007 | Paila et al. |
| 2007/0016594 A1 | 1/2007 | Visharam et al. |
| 2007/0022215 A1 | 1/2007 | Singer et al. |
| 2007/0028099 A1 | 2/2007 | Entin et al. |
| 2007/0078876 A1 | 4/2007 | Hayashi et al. |
| 2007/0081562 A1 | 4/2007 | Ma |
| 2007/0110074 A1 | 5/2007 | Bradley et al. |
| 2007/0140369 A1 | 6/2007 | Limberg et al. |
| 2007/0162568 A1 | 7/2007 | Gupta et al. |
| 2007/0162611 A1 | 7/2007 | Yu et al. |
| 2007/0176800 A1 | 8/2007 | Rijavec |
| 2007/0177811 A1 | 8/2007 | Yang |
| 2007/0185973 A1 | 8/2007 | Wayda et al. |
| 2007/0195894 A1 | 8/2007 | Shokrollahi et al. |
| 2007/0200949 A1 | 8/2007 | Walker et al. |
| 2007/0201549 A1 | 8/2007 | Hannuksela et al. |
| 2007/0204196 A1* | 8/2007 | Watson et al. ............... 714/751 |
| 2007/0230568 A1 | 10/2007 | Eleftheriadis et al. |
| 2007/0233784 A1 | 10/2007 | ORourke et al. |
| 2007/0255844 A1 | 11/2007 | Shen et al. |
| 2007/0277209 A1 | 11/2007 | Yousef |
| 2007/0300127 A1 | 12/2007 | Watson et al. |
| 2008/0010153 A1 | 1/2008 | Pugh-O'Connor et al. |
| 2008/0034273 A1 | 2/2008 | Luby |
| 2008/0052753 A1 | 2/2008 | Huang et al. |
| 2008/0058958 A1 | 3/2008 | Cheng |
| 2008/0059532 A1 | 3/2008 | Kazmi et al. |
| 2008/0066136 A1 | 3/2008 | Dorai et al. |

(56) References Cited

U.S. PATENT DOCUMENTS

| | | |
|---|---|---|
| 2008/0075172 A1 | 3/2008 | Koto |
| 2008/0086751 A1 | 4/2008 | Horn et al. |
| 2008/0101478 A1 | 5/2008 | Kusunoki |
| 2008/0134005 A1 | 6/2008 | Izzat et al. |
| 2008/0170564 A1 | 7/2008 | Shi et al. |
| 2008/0170806 A1 | 7/2008 | Kim |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0189419 A1 | 8/2008 | Girle et al. |
| 2008/0192818 A1 | 8/2008 | DiPietro et al. |
| 2008/0215317 A1 | 9/2008 | Fejzo |
| 2008/0232357 A1 | 9/2008 | Chen |
| 2008/0243918 A1 | 10/2008 | Holtman |
| 2008/0256418 A1 | 10/2008 | Luby et al. |
| 2008/0281943 A1 | 11/2008 | Shapiro |
| 2008/0285556 A1* | 11/2008 | Park et al. ................. 370/389 |
| 2008/0303893 A1 | 12/2008 | Kim et al. |
| 2008/0309525 A1 | 12/2008 | Shokrollahi et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0031199 A1 | 1/2009 | Luby et al. |
| 2009/0043906 A1 | 2/2009 | Hurst et al. |
| 2009/0055705 A1 | 2/2009 | Gao |
| 2009/0067551 A1 | 3/2009 | Chen et al. |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0103523 A1 | 4/2009 | Katis et al. |
| 2009/0106356 A1 | 4/2009 | Brase et al. |
| 2009/0125636 A1 | 5/2009 | Li et al. |
| 2009/0150557 A1 | 6/2009 | Wormley et al. |
| 2009/0158114 A1 | 6/2009 | Shokrollahi |
| 2009/0164653 A1 | 6/2009 | Mandyam et al. |
| 2009/0189792 A1 | 7/2009 | Shokrollahi et al. |
| 2009/0201990 A1 | 8/2009 | Leprovost et al. |
| 2009/0204877 A1 | 8/2009 | Betts |
| 2009/0210547 A1 | 8/2009 | Lassen et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0307565 A1 | 12/2009 | Luby et al. |
| 2009/0319563 A1 | 12/2009 | Schnell |
| 2009/0328228 A1 | 12/2009 | Schnell |
| 2010/0011061 A1 | 1/2010 | Hudson et al. |
| 2010/0011117 A1 | 1/2010 | Hristodorescu et al. |
| 2010/0011274 A1 | 1/2010 | Stockhammer et al. |
| 2010/0020871 A1 | 1/2010 | Hannuksela et al. |
| 2010/0023525 A1 | 1/2010 | Westerlund et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0103001 A1 | 4/2010 | Shokrollahi et al. |
| 2010/0131671 A1 | 5/2010 | Kohli et al. |
| 2010/0153578 A1 | 6/2010 | Van et al. |
| 2010/0174823 A1 | 7/2010 | Huang |
| 2010/0189131 A1 | 7/2010 | Branam et al. |
| 2010/0198982 A1 | 8/2010 | Fernandez |
| 2010/0211690 A1 | 8/2010 | Pakzad et al. |
| 2010/0223533 A1 | 9/2010 | Stockhammer et al. |
| 2010/0235472 A1 | 9/2010 | Sood et al. |
| 2010/0235528 A1 | 9/2010 | Bocharov et al. |
| 2010/0257051 A1 | 10/2010 | Fernandez |
| 2010/0318632 A1 | 12/2010 | Yoo et al. |
| 2011/0019769 A1 | 1/2011 | Shokrollahi et al. |
| 2011/0055881 A1 | 3/2011 | Yu et al. |
| 2011/0083144 A1 | 4/2011 | Bocharov et al. |
| 2011/0096828 A1 | 4/2011 | Chen et al. |
| 2011/0103519 A1 | 5/2011 | Shokrollahi et al. |
| 2011/0119394 A1 | 5/2011 | Wang et al. |
| 2011/0119396 A1 | 5/2011 | Kwon et al. |
| 2011/0216541 A1 | 9/2011 | Inoue et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0258510 A1 | 10/2011 | Watson et al. |
| 2011/0268178 A1 | 11/2011 | Park et al. |
| 2011/0280311 A1 | 11/2011 | Chen et al. |
| 2011/0280316 A1 | 11/2011 | Chen et al. |
| 2011/0299629 A1 | 12/2011 | Luby et al. |
| 2011/0307545 A1 | 12/2011 | Bouazizi |
| 2011/0307581 A1 | 12/2011 | Furbeck et al. |
| 2012/0013746 A1 | 1/2012 | Chen et al. |
| 2012/0016965 A1 | 1/2012 | Chen et al. |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0033730 A1 | 2/2012 | Lee |
| 2012/0042050 A1 | 2/2012 | Chen et al. |
| 2012/0042089 A1 | 2/2012 | Chen et al. |
| 2012/0042090 A1 | 2/2012 | Chen et al. |
| 2012/0047280 A1 | 2/2012 | Park et al. |
| 2012/0151302 A1 | 6/2012 | Luby et al. |
| 2012/0185530 A1 | 7/2012 | Reza |
| 2012/0202535 A1* | 8/2012 | Chaddha et al. .............. 455/466 |
| 2012/0207068 A1 | 8/2012 | Watson et al. |
| 2012/0208580 A1 | 8/2012 | Luby et al. |
| 2012/0210190 A1 | 8/2012 | Luby et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0246643 A1 | 9/2013 | Luby et al. |
| 2013/0254634 A1 | 9/2013 | Luby |
| 2013/0287023 A1 | 10/2013 | Bims |
| 2014/0009578 A1 | 1/2014 | Chen et al. |
| 2014/0380113 A1 | 12/2014 | Luby |

FOREIGN PATENT DOCUMENTS

| | | |
|---|---|---|
| CN | 1481643 A | 3/2004 |
| CN | 1708934 A | 12/2005 |
| CN | 1714577 A | 12/2005 |
| CN | 1792056 A | 6/2006 |
| CN | 1806392 A | 7/2006 |
| CN | 1819661 A | 8/2006 |
| CN | 1868157 A | 11/2006 |
| CN | 101390399 A | 3/2009 |
| CN | 101729857 A | 6/2010 |
| EP | 0669587 A2 | 8/1995 |
| EP | 0701371 A1 | 3/1996 |
| EP | 0784401 A2 | 7/1997 |
| EP | 0853433 A1 | 7/1998 |
| EP | 0854650 A2 | 7/1998 |
| EP | 0903955 A1 | 3/1999 |
| EP | 0986908 A1 | 3/2000 |
| EP | 1051027 A1 | 11/2000 |
| EP | 1124344 A1 | 8/2001 |
| EP | 1298931 A2 | 4/2003 |
| EP | 1406452 A2 | 4/2004 |
| EP | 1455504 A2 | 9/2004 |
| EP | 1468497 A1 | 10/2004 |
| EP | 1670256 A2 | 6/2006 |
| EP | 1755248 A1 | 2/2007 |
| EP | 2071827 A2 | 6/2009 |
| EP | 1241795 A2 | 8/2009 |
| EP | 1700410 B1 | 4/2010 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11112479 | 4/1999 |
| JP | 11164270 A | 6/1999 |
| JP | 2000151426 A | 5/2000 |
| JP | 2000216835 A | 8/2000 |

(56) References Cited

FOREIGN PATENT DOCUMENTS

| | | |
|---|---|---|
| JP | 2000513164 A | 10/2000 |
| JP | 2000307435 A | 11/2000 |
| JP | 2000353969 A | 12/2000 |
| JP | 2001036417 | 2/2001 |
| JP | 2001094625 | 4/2001 |
| JP | 2001223655 A | 8/2001 |
| JP | 2001251287 | 9/2001 |
| JP | 2001274776 A | 10/2001 |
| JP | 2001274855 A | 10/2001 |
| JP | 2002073625 A | 3/2002 |
| JP | 2002204219 A | 7/2002 |
| JP | 2002543705 | 12/2002 |
| JP | 2003507985 | 2/2003 |
| JP | 2003092564 A | 3/2003 |
| JP | 2003510734 A | 3/2003 |
| JP | 2003174489 | 6/2003 |
| JP | 2003256321 | 9/2003 |
| JP | 2003318975 | 11/2003 |
| JP | 2003319012 | 11/2003 |
| JP | 2003333577 | 11/2003 |
| JP | 2004048704 A | 2/2004 |
| JP | 2004070712 A | 3/2004 |
| JP | 2004135013 A | 4/2004 |
| JP | 2004165922 A | 6/2004 |
| JP | 2004516717 A | 6/2004 |
| JP | 2004192140 A | 7/2004 |
| JP | 2004193992 | 7/2004 |
| JP | 2004529533 A | 9/2004 |
| JP | 2004289621 A | 10/2004 |
| JP | 2004343701 | 12/2004 |
| JP | 2004348824 A | 12/2004 |
| JP | 2004362099 | 12/2004 |
| JP | 2005094140 A | 4/2005 |
| JP | 2005136546 A | 5/2005 |
| JP | 2005514828 T | 5/2005 |
| JP | 2005204170 A | 7/2005 |
| JP | 2005223433 A | 8/2005 |
| JP | 2005277950 A | 10/2005 |
| JP | 2006503463 | 1/2006 |
| JP | 2006505177 A | 2/2006 |
| JP | 2006506926 A | 2/2006 |
| JP | 2006074335 A | 3/2006 |
| JP | 2006074421 A | 3/2006 |
| JP | 2006115104 A | 4/2006 |
| JP | 3809957 | 6/2006 |
| JP | 2006174032 A | 6/2006 |
| JP | 2006174045 A | 6/2006 |
| JP | 2006186419 A | 7/2006 |
| JP | 2006519517 A | 8/2006 |
| JP | 2006287422 | 10/2006 |
| JP | 2006319743 A | 11/2006 |
| JP | 2007013675 A | 1/2007 |
| JP | 2007089137 A | 4/2007 |
| JP | 3976163 | 6/2007 |
| JP | 2007158592 A | 6/2007 |
| JP | 2007174170 A | 7/2007 |
| JP | 2007520961 A | 7/2007 |
| JP | 2007228205 A | 9/2007 |
| JP | 2008011404 | 1/2008 |
| JP | 2008016907 A | 1/2008 |
| JP | 2008508761 A | 3/2008 |
| JP | 2008508762 A | 3/2008 |
| JP | 2008283232 A | 11/2008 |
| JP | 2008283571 A | 11/2008 |
| JP | 2008543142 A | 11/2008 |
| JP | 2008546361 A | 12/2008 |
| JP | 2009027598 A | 2/2009 |
| JP | 2009522921 A | 6/2009 |
| JP | 2009522922 A | 6/2009 |
| JP | 2009171558 A | 7/2009 |
| JP | 2009527949 A | 7/2009 |
| JP | 2009277182 A | 11/2009 |
| JP | 2009544991 A | 12/2009 |
| JP | 2010539832 A | 12/2010 |
| JP | 2008502212 A | 1/2011 |
| JP | 2001189665 A | 2/2011 |
| JP | 2011087103 A | 4/2011 |
| JP | 4971144 B2 | 7/2012 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 100809086 B1 | 3/2008 |
| KR | 20080083299 A | 9/2008 |
| KR | 20090098919 A | 9/2009 |
| RU | 99117925 A | 7/2001 |
| RU | 2189629 C2 | 9/2002 |
| RU | 2265960 C2 | 12/2005 |
| RU | 2290768 C1 | 12/2006 |
| RU | 2297663 C2 | 4/2007 |
| RU | 2312390 C2 | 12/2007 |
| RU | 2357279 C2 | 5/2009 |
| TW | 1246841 B | 1/2006 |
| TW | 1354908 | 12/2011 |
| TW | 1355168 | 12/2011 |
| WO | WO9634463 A1 | 10/1996 |
| WO | WO-9750183 A1 | 12/1997 |
| WO | WO9804973 A1 | 2/1998 |
| WO | WO9832231 | 7/1998 |
| WO | WO-9832256 A1 | 7/1998 |
| WO | WO0014921 A1 | 3/2000 |
| WO | WO0018017 | 3/2000 |
| WO | WO0052600 A1 | 9/2000 |
| WO | WO0120786 A1 | 3/2001 |
| WO | WO0157667 A1 | 8/2001 |
| WO | WO0158130 A2 | 8/2001 |
| WO | WO0158131 A2 | 8/2001 |
| WO | WO0227988 A2 | 4/2002 |
| WO | WO0247391 | 6/2002 |
| WO | 02063461 A1 | 8/2002 |
| WO | WO-03046742 A1 | 6/2003 |
| WO | WO03056703 | 7/2003 |
| WO | WO03105350 | 12/2003 |
| WO | WO-03105484 A1 | 12/2003 |
| WO | WO2004015948 A1 | 2/2004 |
| WO | WO2004019521 A1 | 3/2004 |
| WO | WO2004030273 A1 | 4/2004 |
| WO | WO2004034589 A2 | 4/2004 |
| WO | WO-2004036824 A1 | 4/2004 |
| WO | WO2004040831 A1 | 5/2004 |
| WO | WO-2004047019 A2 | 6/2004 |
| WO | WO2004047455 A1 | 6/2004 |
| WO | WO-2004088988 A1 | 10/2004 |
| WO | WO-2004109538 A1 | 12/2004 |
| WO | WO2005036753 A2 | 4/2005 |
| WO | WO2005041421 A1 | 5/2005 |
| WO | WO2005078982 A1 | 8/2005 |
| WO | WO-2005107123 | 11/2005 |
| WO | WO2005112250 A2 | 11/2005 |
| WO | WO-2006013459 A1 | 2/2006 |
| WO | WO2006020826 A2 | 2/2006 |
| WO | WO-2006036276 | 4/2006 |
| WO | 2006060036 A1 | 6/2006 |
| WO | WO-2006057938 A2 | 6/2006 |
| WO | WO2006084503 A1 | 8/2006 |
| WO | WO-2006116102 A1 | 11/2006 |
| WO | WO-2006135878 A2 | 12/2006 |
| WO | 2007078253 A2 | 7/2007 |
| WO | WO2007090834 A2 | 8/2007 |
| WO | WO-2007098397 A2 | 8/2007 |
| WO | WO-2007098480 A1 | 8/2007 |
| WO | 2008011549 A2 | 1/2008 |
| WO | WO-2008023328 A3 | 4/2008 |
| WO | WO2008054100 A1 | 5/2008 |
| WO | 2008086313 A1 | 7/2008 |
| WO | WO2008085013 A1 | 7/2008 |
| WO | WO-2008131023 A1 | 10/2008 |
| WO | 2008144004 A1 | 11/2008 |
| WO | WO-2009065526 A1 | 5/2009 |
| WO | WO-2009137705 A2 | 11/2009 |
| WO | 2009143741 A1 | 12/2009 |
| WO | WO2010085361 A2 | 7/2010 |
| WO | WO-2011038013 | 3/2011 |

(56) References Cited

FOREIGN PATENT DOCUMENTS

| WO | WO-2011038034 A1 | 3/2011 |
| WO | 2011059286 A2 | 5/2011 |
| WO | 2011070552 A1 | 6/2011 |
| WO | 2011102792 A1 | 8/2011 |
| WO | WO-2012021540 | 2/2012 |
| WO | WO-2012109614 A1 | 8/2012 |

OTHER PUBLICATIONS

Luby et al,Raptor Forward Error Correction Scheme for Object Delivery, Qualcomm, Inc. Oct. 2007, 46 pages.*

3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, 179 pages.

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.

3GPP TS 26.247, v1.5.0, 3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10), 2010, 91 pages.

3rd Generation Partnership Project, Technical Specification Group Services and System Aspects Transparent end-to-end packet switched streaming service (PSS), 3GPP file format (3GP) (Release 9 ) , 3GPP Standard, 3GPP TS 26.244, 3rd Generation Partnership Project (3GPP), Mobile Competence Centre , 650, Route Des Lucioles , F-06921 Sophia-Antipolis Cedex , France, No. V8.1.0, Jun. 1, 2009, pp. 1-52, XP050370199.

3rd Generation Partnership Project; Technical Specification Group Services and System Aspects; Transparent end-to-end packet switched streaming service (PSS); 3GPP file format (3GP) (Release 9), 3GPP Standard; 3GPP TS 26.244, 3rd Generation Partnership Project (3GPP), Mobile Competence Centre; 650, Route Des Lucioles; F-06921 Sophia-Antipolis Cedex; France, No. V9.2.0, Jun. 9, 2010, pp. 1-55, XP050441544, [retrieved on Jun. 9, 2010].

Aggarwal, C. et al.: "A Permutation-Based Pyramid Broadcasting Scheme for Video-on-Demand Systems," Proc. IEEE Intl Conf. on Multimedia Systems, Hiroshima, Japan (Jun. 1996).

Aggarwal, C. et al.: "On Optimal Batching Policies for Video-on-Demand Storage Servers," Multimedia Systems, vol. 4, No. 4, pp. 253-258 (1996).

Albanese, A., et al., "Priority Encoding Transmission", IEEE Transactions on Information Theory, vol. 42, No. 6, pp. 1-22, (Nov. 1996).

Alex Zambelli,"IIS Smooth Streaming Technical Overview", Microsoft Mar. 25, 2009, XP002620446, Retrieved from the Internet: URL:http://www.microsoft.com/downloads/en/ details.aspx FamilyID=03d22583-3ed6-44da-8464-blb4b5ca7520, [retrieved on Jan. 21, 2011].

Almeroth, et al., "The use of multicast delivery to provide a scalable and interactive video-on-demand service", IEEE Journal on Selected Areas in Communication, 14(6): 1110-1122, (1996).

Alon, et al.: "Linear Time Erasure Codes with Nearly Optimal Recovery," Proceedings of the Annual Symposium on Foundations of Computer Science, US, Los Alamitos, IEEE Comp. Soc. Press, vol. Symp. 36, pp. 512-516 (Oct. 23, 1995) XP000557871.

Amin Shokrollahi: "LDPC Codes: An Introduction" Internet Citation 2 Apr. 1, 2003 (Apr. 2, 2003), XP002360065 Retrieved from the Internet: URL : http ://www . ipm.ac . ir/IPM/homepage/ Amin 2. pdf [retrieved on Dec. 19, 2005].

Amon P. et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/ TCSVT.2007.905521.

Anonymous: [Gruneberg, K., Narasimhan, S. and Chen, Y., editors] "Text of ISO/IEC13818-1:2007/PDAM 6 MVC operation point descriptor", 90 MPEG Meeting; Oct. 26, 2009; - Oct. 30, 2009; Xian; (Motion Picture Expertgroup or ISO/IEC JTC1/SC29/WG111), No. N10942, Nov. 19, 2009, XP030017441.

Anonymous: "Text of ISO/IEC 14496-12 3rd Edition", 83 MPEG Meeting; Jan. 14, 2008-Jan. 18, 2008; Antalya; (Motion Pictureexpert Group or ISO/IEC JTC1/SC29/WG11), No. N9678, Apr. 22, 2008, XP030016172.

Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11) No. N11139, Jan. 22, 2010, XP030017636.

Bar-Noy, et al., "Competitive on-line stream merging algorithms for media-on-demand", Draft (Jul. 2000), pp. 1-34.

Bar-Noy et al. "Efficient algorithms for optimal stream merging for media-on-demand," Draft (Aug. 2000), pp. 1-43.

Bigloo, A. et al.: "A Robust Rate-Adaptive Hybrid ARQ Scheme and Frequency Hopping for Multiple-Access Communication Systems," IEEE Journal on Selected Areas in Communications, US, IEEE Inc, New York (Jun. 1, 1994) pp. 889-893, XP000464977.

Bitner, J.R., et al.: "Efficient Generation of the Binary Reflected Gray code and Its Applications," Communications of the ACM, pp. 517-521, vol. 19 (9), 1976.

Blomer, et al., "An XOR-Based Erasure-Resilient Coding Scheme," ICSI Technical Report No. TR-95-048 (1995) [avail. At ftp://ftp.icsi. berkeley.edu/pub/techreports/1995/tr-95-048.pdf].

Byers, J.W. et al.: "A Digital Fountain Approach to Reliable Distribution of Bulk Data," Computer Communication Review, Association for Computing Machinery. New York, US, vol. 28, No. 4 (Oct. 1998) pp. 56-67 XP000914424 ISSN:0146-4833.

Byers, J.W. et al.: "Accessing multiple mirror sites in parallel: using Tornado codes to speed up downloads," 1999, Eighteenth Annual Joint Conference of the IEEE Comupter and Communications Socities, pp. 275-283, Mar. 21, 1999, XP000868811.

Cataldi et al., "Sliding-Window Raptor Codes for Efficient Scalable Wireless Video Broadcasting With Unequal Loss Protection", IEEE Transactions on Image Processing, Jun. 1, 2010, pp. 1491-1503, vol. 19, No. 6, IEEE Service Center, XP011328559, ISSN: 1057-7149, DOI: 10.1109/TIP.2010.2042985.

Charles Lee L.H, "Error-Control Block Codes for Communications Engineers", 2000, Artech House, XP002642221 pp. 39-45.

Chen et al., "Response to the CfP on HTTP Streaming: Adaptive Video Streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.

Choi S: "Temporally enhanced erasure codes for reliable communication protocols" Computer Networks, Elsevier Science Publishers B.V., Amsterdam, NL, vol. 38, No. 6, Apr. 22, 2002, pp. 713-730, XP004345778, ISSN: 1389-1286, DOI:10.1016/S1389-1286(01)00280-8.

Clark G.C., et al., "Error Correction Coding for Digital Communications, System Applications," Error Correction Coding for Digital Communications, New York, Plenum Press, US, Jan. 1, 1981, pp. 331-341.

D. Gozalvez et,al. "AL-FEC for Improved Mobile Reception of MPEG-2 DVB-Transport Streams" Hindawi Publishing Corporation, International Journal of Digital Multimedia Broadcasting vol. 2009, Dec. 31, 2009, pp. 1-10, XP002582035 Retrieved from the Internet: URL:http://www.hindawi.com/journals/ijdmb/2009/ 614178.html> [retrieved on May 12, 2010] .

Dan, A. et al.: "Scheduling Policies for an On-Demand Video Server with Batching," Proc. ACM Multimedia, pp. 15-23 (Oct. 1998).

Davey, M.C. et al.: "Low Density Parity Check Codes over GF(q)" IEEE Communications Letters, vol. 2, No. 6 pp. 165-167 (1998).

Digital Fountain: "Specification Text for Raptor Forward Error Correction," TDOC S4-050249 of 3GPP TSG SA WG 4 Meeting #34 [Online] (Feb. 25, 2005) pp. 1-23, XP002425167, Retrieved from the Internet: URL:http://www.3gpp.org/ftp/tsg_sa/WG4_CODEC/ TSGS4_34/Docs.

Digital Fountain: "Raptor code specification for MBMS file download," 3GPP SA4 PSM AD-HOC #31 (May 21, 2004) XP002355055 pp. 1-6.

"Digital Video Broadcasting (DVB); Guidelines for the implementation of DVB-IP Phase 1 specifications; ETSI TS 102 542" ETSI

(56) References Cited

OTHER PUBLICATIONS

Standards, LIS, Sophia Antipoliscedex, France, vol. BC, No. V1.2.1, Apr. 1, 2008, XP014041619 ISSN: 0000-0001 p. 43 p. 66 pp. 70, 71.
DVB-IPI Standard: DVB BlueBook A086r4 (Mar. 2007) Transport of MPEG 2 Transport Streatm (TS) Based DVB Services over IP Based Networks, ETSI Technical Specification 102 034 v1.3.1.
Eager, et al. "Minimizing bandwidth requirements for on-demand data delivery," Proceedings of the International Workshop on Advances in Multimedia Information Systems, p. 80-87 (Indian Wells, CA Oct. 1999).
Eager, et al., "Optimal and efficient merging schedules for video-on-demand servers", Proc. ACM Multimedia, vol. 7, pp. 199-202 (1999).
Esaki, et al.: "Reliable IP Multicast Communication Over ATM Networks Using Forward Error Correction Policy," IEICE Transactions on Communications, JP, Institute of Electronics Information and Comm. Eng. Tokyo, vol. E78-V, No. 12, (Dec. 1995), pp. 1622-1637, XP000556183.
Feng, G., Error Correcting Codes over Z2m for Algorithm-Based Fault-Tolerance, IEEE Transactions on Computers, vol. 43, No. 3, Mar. 1994, pp. 370-374.
Fernando, et al., "httpstreaming of MPEG Media—Response to CfP", 93 MPEG Meeting; Jul. 26, 2010-Jul. 30, 2010; Geneva; (Motion Picture Expert Group or ISO/IEC JTC1/SCE29/WG11), No. M17756, Jul. 22, 2010, XP030046346.
Fielding et al., "RFC 2616: Hypertext Transfer Protocol HTTP/1.1", Internet Citation, Jun. 1999, pp. 165, XP002196143, Retrieved from the Internet: URL:http://www.rfc-editor-org/ [retrieved on Apr. 15, 2002].
Gao, L. et al.: "Efficient Schemes for Broadcasting Popular Videos," Proc. Inter. Workshop on Network and Operating System Support for Digital Audio and Video, pp. 1-13 (1998).
Gasiba, Tiago et al., "System Design and Advanced Receiver Techniques for MBMS Broadcast Services" Proc. 2006 International Conference on Communications (ICC 2006), Jun. 1, 2006, pp. 5444-5450, XP031025781 ISBN: 978-1-4244-0354-7.
Gemmell, et al., "A Scalable Multicast Architecture for One-To-Many Telepresentations", Multimedia Computing and Systems, 1998/Proceedings. IEEE International Conference on Austin, TX, USA Jun. 28,-Jul. 1, 1998, Los Alamitos, CA USA, IEEE Comput. Soc, US, Jun. 28, 1998, pp. 128-139, XP010291559.
Goyal: "Multiple Description Coding: Compression Meets the Network," In Signal Processing Magazine, IEEE, vol. 18., Issue 5 (Sep. 2001) pp. 74-93 URL:http://www.rle.mit.edu/stir/documents/Goyal_SigProcMag2001_MD.pdf [Nov. 4, 2007].
Gozalvez D et, al: "Mobile reception of DVB-T services by means of AL-FEC protection" Proc. IEEE Intern. Symposium on Broadband Multimedia Systems and Broadcasting (BMSB '09), IEEE, Piscataway, NJ, USA, May 13, 2009, pp. 1-5, XP031480155 ISBN: 978-1-4244-2590-7.
Gracie et al., "Turbo and Turbo-Like Codes: Principles and Applications in Telecommunications", Proceedings of the IEEE, Jun. 1, 2007, pp. 1228-1254, vol. 95, No. 6, IEEE, XP011189323, ISSN: 0018-9219, DOI: 10.1109/JPROC.2007.895197.
Hagenauer, J. : "Soft is better than hard" Communications, Coding and Cryptology, Kluwer Publication May 1994, XP002606615 Retrieved from the Internet : URL: http://www. Int . ei .turn. de/veroeffentlic hungen/I994/ccc94h. pdf [retrieved on Oct. 25, 2010].
Hershey, et al., "Random Parity Coding (RPC)", 1996 IEEE International Conference on Communications (ICC). Converging Technologies for Tomorrow's Applications. Dallas, June 23-27, 1996, IEEE International Conference on Communications (ICC), New York, IEEE, US, vol. 1, Jun. 23, 1996, pp. 122-126, XP000625654.
Hua, et al., "Skyscraper broadcasting: A new broadcsting system for metropolitan video-on-demand systems", Proc. ACM SIGCOMM, pp. 89-100 (Cannes, France, 1997).
Huawei et al., "Implict mapping between CCE and PUCCH for ACK/NACK TDD", 3GPP Draft; R1-082359, 3rd Generation Partnership Project (3GPP), Mobile Competence Centre; 650, Route Des Lucioles ; F-06921 Sophia-Antipolis Cedex ; France, vol. RAN WG1, No. Warsaw, Poland, Jun. 24, 2008, XP050110650, [retrieved on Jun. 24, 2008].
IETF RFC 2733: Rosenberg, J. et al. "An RTP Payload Format for Generic Forward Error Correction," Network Working Group, RFC 2733 (Dec. 1999).
International Search Report and Written Opinion—PCT/US2011/057382-ISAEPO—May 3, 2012.
International Search Report and Written Opinion—PCT/US2012/024737—ISA/EPO—May 11, 2012.
International Standard ISO/IEC 14496-12, Information Technology—Coding of audio-visual objects—Part 12: ISO base media file format, Third Edition, Oct. 15, 2008, 120 pp.
ISO/IEC JTC 1/SC 29, ISO/IEC FCD 23001-6, Information technology—MPEG systems technologies—Part 6: Dynamic adaptive streaming over HTTP (DASH), Jan. 28, 2011.
Jin Li, "The Efficient Implementation of Reed-Solomon High Rate Erasure Resilient Codes" Proc. 2005 IEEE International Conference on Acoustics, Speech, and Signal Processing, Philadelphia, PA, USA, IEEE, Piscataway, NJ, vol. 3, Mar. 18, 2005, pp. 1097-1100, XP010792442, DOI: 10.1109/ICASSP.2005.1415905 ISBN: 978-0-7803-8874-1.
Juhn, L. et al.: "Adaptive Fast Data Broadcasting Scheme for Video-on-Demand Service," IEEE Transactions on Broadcasting, vol. 44, No. 2, pp. 182-185 (Jun. 1998).
Juhn, L. et al.: "Harmonic Broadcasting for Video-on-Demand Service," IEEE Transactions on Broadcasting, vol. 43, No. 3, pp. 268-271 (Sep. 1997).
Kallel, "Complementary Punctured Convolutional (CPC) Codes and Their Applications", IEEE Transactions on Communications, IEEE Inc., New York, US, Vol. 43, No. 6, Jun. 1, 1995, pp. 2005-2009.
Kimura et al., "A Highly Mobile SDM-0FDM System Using Reduced-Complexity-and-Processing", IEEE International Symposium on Personal, Indoor and Mobile Radio Communications (PIMRC), Sep. 1, 2007, pp. 1-5, IEEE, XP031168836, ISBN: 978-1-4244-1143-6, DOI: 10.1109/PIMRC.2007.4394758.
Kozamernik F: "Media streaming over the Internet", Internet Citation, Oct. 2002, XP002266291, Retrieved from the Internet: URL: http://www.ebu.ch/trev_292-kozamerni k. pdf [retrieved on Jan. 8, 2004] section "Video codecs for scalable streaming".
Lee L., et al.,"VLSI implementation for low density parity check decoder", Proceedings of the 8th IEEE International Conference on Elecctronics, Circuits and Systems, 2001. ICECS 2001, Sep. 2, 2001, vol. 3, pp. 1223-1226.
Lin, S. et al.: "Error Control Coding-Fundamentals and Applications," 1983, Englewood Cliffs, pp. 288, XP002305226.
Luby Digital Fountain A Shokrollahi Epfl M Watson Digital Fountain T Stockhammer Nomor Research M: "Raptor Forward Error Correction Scheme for Object Delivery; rfc5053.txt", IETF Standard, Internet Engineering Task Force, IETF, CH, Oct. 1, 2007, XP015055125, ISSN: 0000-0003.
Luby, et al., "Analysis of Low Density Codes and Improved Designs Using Irregular Graphs", 1998, Proceedings of the 30th Annual ACM Symposium on Theory of Computing, May 23, 1998, pp. 249-258, XP000970907.
Luby, et al.: "Analysis of Low Density Codes and Improved Designs Using Irregular Graphs," International Computer Science Institute Technical Report TR-97-045 (Nov. 1997) [available at ftp://ftp.icsi.berkeley.edu/pub/techreports/1997/tr-97-045.pdf].
Luby, et al., "Flute—File Delivery over Unidirectional Transport", IETF RFC 3926, pp. 1-35, (Oct. 2004).
Luby et al., "Improved Low-Density Parity-Check Codes Using Irregular Graphs and Belief Propogation", Information Theory, 1998. Proceedings. 1998 IEEE International Symposium on Cambridge, MA, USA Aug. 16-21, 1998, pp. 1-9, New York, NY, USA, IEEE, US Aug. 16, 199.
Luby et, al. "Layered Coding Transport (LCT) Building Block", IETF RFC 5651, pp. 1-42, (Oct. 2009).
Luby, M. et al.: "Efficient Erasure Correction Codes," 2001, IEEE Transactions on Information Theory, Vo. 47, No. 2, pp. 569-584, XP002305225.
Luby, M., et, al. "Forward Error Correction (FEC) Building Block", IETF RFC 5052, pp. 1-31, (Aug. 2007).

(56) References Cited

OTHER PUBLICATIONS

Luby M et al: "IPTV Systems, Standards and Architectures: Part II—Application Layer FEC in IPTV Services" IEEE Communications Magazine, IEEE Service Center, Piscataway, US LNKDDOI: 10.1109/MCOM.2008.4511656, vol. 46, No. 5, May 1, 2008, pp. 94-101, XP011226858 ISSN: 0163-6804.
Luby, M. et al.: "Pairwise Independence and Derandomization," Foundations and Trends in Theoretical Computer Science, vol. 1, Issue 4, 2005, Print ISSN 1551-305X, ISSN 1551-3068.
Luby, M. et al., "Practical Loss-Resilient Codes: Tornado Codes," 29th Annual ACM Symposium on Theory of Computing, vol. SYMP. 29, May 4, 1997, pp. 150-159, XP002271229.
Luby, M., et al., "Raptor Forward Error Correction Scheme for Object Delivery", IETF RFC5053, pp. 1-46 (Sep. 2007).
Luby M. et al., "RaptorQ Forward Error Correction Scheme for Object Delivery", IETF draft ietf-rmt-bb-fec-raptorq-04, Reliable Multicast Transport, Internet Engineering Task Force (IETF), Standard Workingdraft, Internet Society (ISOC), Aug. 24, 2010, pp. 1-68, XP015070705, [retrieved on Aug. 24, 2010].
Luby, M., et al., "Request for Comments: 3453: The Use of Forward Error Correction (FEC) in Reliable Multicast," Internet Article, [Online] Dec. 2002, pp. 1-19.
Luby, Michael G. "Analysis of Random Processes via And-Or Tree Evaluation," Proceedings of the 9th Annual ACM-SIAM Symposium on Discrete Algorithms,TR-97-0, 1998, pp. 364-373, (search date: Jan. 25, 2010) URL: <http://portal.acm.prg.citation.cfm id=314722>.
Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011, pp. 1-10, XP015074424, [retrieved on Mar. 7, 2011].
Mackay, "Fountain codes Capacity approaching codes design and implementation", IEE Proceedings: Communications, Dec. 9, 2005, pp. 1062-1068, vol. 152, No. 6, Institution of Electrical Engineers, XP006025749, ISSN: 1350-2425, DOI: 10.1049/IP-COM:20050237.
Mandelbaum D.M., "An Adaptive-Feedback Coding Scheme Using Incremental Redundancy", IEEE Trans on Information Theory, vol. May 1974, pp. 388-389, XP002628271, the whole document.
Matsuoka H., et al., "Low-Density Parity-Check Code Extensions Applied for Broadcast-Communication Integrated Content Delivery", Research Laboratories, NTT Docomo, Inc., 3-6, Hikari-No-Oka, Yokosuka, Kanagawa, 239-8536, Japan, ITC-SS21, 2010 IEICE, pp. 59-63.
Mimnaugh, A et, al. "Enabling Mobile Coverage for DVB-T" Digital Fountain Whitepaper Jan. 29, 2008, pp. 1-9, XP002581808 Retrieved from the Internet: URL:http://www.digitalfountain.com/ufiles/library/DVB-T-whitepaper.pdf> [retrieved on May 10, 2010].
Min-Goo Kim: "On systematic punctured convolutional codes", IEEE Trans on Communications, vol. 45, No. 2, Feb. 1997, XP002628272, the whole document, pp. 133-139.
Muller, et al., "A test-bed for the dynamic adaptive streaming over HTTP featuring session mobility" MMSys '11 Proceedings of the second annual ACM conference on Multimedia systems, Feb. 23-25, 2011, San Jose, CA, pp. 271-276.
Naguib, Ayman, et al., "Applications of Space-Time Block Codes and Interference Suppression for High Capacity and High Data Rate Wireless Systems," IEEE, 1998, pp. 1803-1810.
Narayanan, et al., "Physical Layer Design for Packet Data Over IS-136", Vehicular Technology Conference, 1997, IEEE 47th Phoenix, AZ, USA May 4-7, 1997, New York, NY, USA, IEEE, US May 4, 1997, pp. 1029-1033.
Nokia: "Reed-Solomon Code Specification for. MBMS Download and Streaming Services", 3GPP Draft; 54-050265_RS_SPEC, 3rd Generation Partnership Project (3GPP), Mobile Competence Centre ; 650, Route Des Lucioles ; F-06921 Sophia-Antipolis Cedex ; France, vol. SA WG4, No. San Diego, USA; 20050415, Apr. 15, 2005, XP050287675, [retrieved on Apr. 15, 2005].
Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.
Nonnenmacher, et al., "Parity-Based Loss Recovery for Reliable Multicast Transmission", IEEE / ACM Transactions on Networking, IEEE Inc. New York, US, vol. 6, No. 4, Aug. 1, 1998, pp. 349-361.
Ozden, B. et al.: "A Low-Cost Storage Service for Movie on Demand Databases," Proceedings of the 20th Very Large DataBases (VLDB) Conference, Santiago, Chile (1994).
PA. Chou, A. Mohr, A. Wang, S. Mehrotra, "FEC and Pseudo-ARQ for Receiver-Driven Layered Multicast of Audio and Video," pp. 440-449, IEEE Computer Society, Data Compression Conference (2000).
Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.
Pantos R et al., "HTTP Live Streaming; draft-pantos-http-live-streaming-01.txt", HTTP Live Streaming; Draft-Pantos-Http-Live-Streaming-01.Txt, Internet Engineering Task Force, IETF; Standardworkingdraft, Internet Society (ISOC) 4, Rue Des Falaises Ch- 1205 Geneva, Switzerland, No. 1, Jun. 8, 2009, XP015062692.
Paris, et al., "A low bandwidth broadcasting protocol for video on demand", Proc. International Conference on Computer Communications and Networks, vol. 7, pp. 690-697 (Oct. 1998).
Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).
Perkins, et al.: "Survey of Packet Loss Recovery Techniques for Streaming Audio," IEEE Network; Sep./Oct. 1998, pp. 40-48.
Petition decision for Petition Under 37 C.F.R. § 1.78 to Accept an Unintentionally Delayed Priority Claim under 35 U.S.C. § 120 in U.S. Patent No. 7,532,132, dated Jul. 21, 2011, 2 pages.
Petition under 37 C.F.R. § 1.78 to Accept an Unintentionally Delayed Priority Claim under 35 U.S.C. § 120 in U.S. Patent No. 7,532,132, dated May 27, 2011, 2 pages.
Plank J. S., "A Tutorial on Reed-Solomon Coding for Fault-Tolerance I N Raid-Like Systems", Software Practice & Experience, Wiley & Sons, Bognor Regis, GB, vol. 27, No. 9, Sep. 1, 1997, pp. 995-1012, XP00069594.
Pless and WC Huffman EDS V S: Algebraic geometry codes, Handbook of Coding Theory, 1998, pp. 871-961, XP002300927.
Pursley, et al.: "Variable-Rate Coding for Meteor-Burst Communications," IEEE Transactions on Communications, US, IEEE Inc. New York (1989) vol. 37, No. 11, pp. 1105-1112 XP000074533.
Pursley, M. et al.: A Correction and an Addendum for "Variable-Rate Coding for Meteor-Burst Communications," IEEE Transactions on Communications, vol. 43, No. 12 pp. 2866-2867 (Dec. 1995).
Pyle, et al., "Microsoft http smooth Streaming: Microsoft response to the Call for Proposal on httpstreaming", 93 MPEG Meeting; Jul. 26, 2010-Jul. 30, 2010; Geneva; (Motion Picture Expert Group or ISO/IEC JTC1/SCE29/WG11), No. M17902, Jul. 22, 2010, XP030046492.
Qualcomm Europe S A R L: "Baseline Architecture and Definitions for HTTP Streaming", 3GPP Draft; S4-090603_HTTP_STREAMING_ARCHITECTURE, 3rd Generation Partnership Project (3GPP), Mobile Competence Centre; 650, Route Des Lucioles; F-06921 Sophia-Antipolis Cedex; France, No. Kista; 20090812, Aug. 12, 2009, XP050356889.
Qualcomm Incorporated: "Use Cases and Examples for Adaptive httpstreaming", 3GPP Draft; S4-100408-Usecases-HSD, 3rd Generation Partnership Project (JGPP), Mobile Competence Centre; 650, Route Des Lucioles; F-06921 Sophia-Antipolis Cedex; France, vol. SA WG4, No. Prague, Czech Republic; 20100621, Jun. 17, 2010, XP050438085, [retrieved on Jun. 17, 2010].
Rangan, et al., "Designing an On-Demand Multimedia Service," IEEE Communication Magazine, vol. 30, pp. 56-64, (Jul. 1992).
Realnetworks Inc et al., "Format for HTTP Streaming Media Presentation Description", 3GPP Draft; S4-100020, 3rd Generation Partnership Project (3GPP), Mobile Competence Centre; 650, Route Des

(56) References Cited

OTHER PUBLICATIONS

Lucioles; F-06921 Sophia-Anti Polis Cedex; France, vol. SA WG4, No. St Julians, Malta; 20100125, Jan. 20, 2010, XP050437753, [retrieved on Jan. 20, 2010].
Research in Motion UK Limited: "An MPD delta file for httpstreaming", 3GPP Draft; S4-100453, 3rd Generation Partnership Project (SGPP), Mobile Competence Centre; 650, Route Des Lucioles; F-06921 Sophia-Antipolis Cedex; France, vol. SA WG4, No. Prague, Czech Republic; 20100621, Jun. 16, 2010, XP050438066, [retrieved on Jun. 16, 2010].
Rhyu, et al., "Response to Call for Proposals on httpstreaming of MPEG Media", 93 MPEG Meeting; Jul. 26, 2010-Jul. 30, 2010; Geneva; (Motion Picture Expert Group or ISO/IEC JTC1/SCE29/WG11) No. M17779, Jul. 26, 2010, XP030046369.
Rizzo, L. "Effective Erasure Codes for Reliable Computer Communication Protocols," Computer Communication Review, 27 (2) pp. 24-36 (Apr. 1, 2997), XP000696916.
Roca, V. et al.: "Design, Evaluation and Comparison of Four Large Block FEC Codecs, LDPC, LDGM, LDGM Staircase and LDGM Triangle, plus a Reed-Solomon Small Block FEC Codec," INRIA Research Report RR-5225 (2004).
Roca, V., et, al. "Low Density Parity Check (LPDC) Staircase and Triangle Forward Error Correction (FEC) Schemes", IETF RFC 5170 (Jun. 2008), pp. 1-34.
Rost, S. et al., "The Cyclone Server Architecture: streamlining delivery of popular content," 2002, Computer Communications, vol. 25, No. 4, pp. 1-10.
Roth, R., et al., "A Construction of Non-Reed-Solomon Type MDS Codes", IEEE Transactions of Information Theory, vol. 35, No. 3, May 1989, pp. 655-657.
Roth, R., "On MDS Codes via Cauchy Matrices", IEEE Transactions on Information Theory, vol. 35, No. 6, Nov. 1989, pp. 1314-1319.
Seshan, S. et al., "Handoffs in Cellular Wireless Networks: The Daedalus Implementation and Experience," Wireless Personal Communications, NL; Kluwer Academic Publishers, vol. 4, No. 2 (Mar. 1, 1997) pp. 141-162, XP000728589.
Shacham: "Packet Recovery and Error Correction in High-Speed Wide-Area Networks," Proceedings of the Military Communications Conference. (Milcom), US, New York, IEEE, vol. 1, pp. 551-557 (1989) XP000131876.
Shierl T; Gruneberg K; Narasimhan S; Vetro A: "ISO/IEC 13818-1:2007/FPDAM 4—Information Technology Generic Coding of Moving Pictures and Audio Systems amendment 4: Transport of Multiview Video over ITU-T Rec H.222.0 ISO/IEC 13818-1" ITU-T REC. H.222.0(May 2006)FPDAM 4, vol. MPEG2009, No. 10572, May 11, 2009, pp. 1-20, XP002605067 page 11, last two paragraphs sections 2.6.78 and 2.6.79 table T-1.
Shokrollahi, A.: "Raptor Codes," Internet Citation [Online] (Jan. 13, 2004) XP002367883, Retrieved from the Internet: URL:http://www.cs.huji.ac.il/labs/danss/p2p/resources/raptor.pdf.
Shokrollahi, Amin. "Raptor Codes," IEEE Transactions on Information Theory, Jun. 2006, vol. 52, No. 6, pp. 2551-2567, (search date: Feb. 1, 2010) URL: <http://portal.acm.org/citation.cfm id=1148681>.
Shokrollahi et al., "Design of Efficient Easure Codes with Differential Evolution", IEEE International Symposium on Information Theory, Jun. 25, 2000, pp. 5-5.
Sincoskie, W. D., "System Architecture for Large Scale Video on Demand Service," Computer Network and ISDN Systems, pp. 155-162, (1991).
Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.
Sullivan et al., Document: JVT-AA007, "Editors' Draft Revision to ITU-T Rec. H.264|ISO/IEC 14496-10 Advanced Video Coding—In Preparation for ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), 30th Meeting: Geneva, CH, Jan. 29-Feb. 3, 2009, pp. 1-683, http://wftp3.itu.int/av-arch/jvt-site/2009_01_Geneva/JVT-AD007.zip.
Sun, et al., "Seamless Switching of Scalable Video Bitstreams for Efficient Streaming," IEEE Transactions on Multimedia, vol. 6, No. 2, Apr. 2004, pp. 291-303.
Telefon AB LM Ericsson, et al., "Media Presentation Description in httpstreaming", 3GPP Draft; 54-100080-MPD, 3rd Generation Partnership Project (3GPP), Mobile Competence Centre; 650, Route Des Lucioles; F-06921 Sophia-Antipolis Cedex; France, vol. SA WG4, No. St Julians, Malta; 20100125, Jan. 20, 2010, XP050437773, [retrieved on Jan. 20, 2010].
Todd, "Error Correction Coding: Mathematical Methods and Algorithms", Mathematical Methods and Algorithms, Jan. 1, 2005, pp. 451-534, Wiley, XP002618913.
Tsunoda T., et al., "Reliable Streaming Contents Delivery by Using Multiple Paths," Technical Report of The Institute of Electronics, Information and Communication Engineers, Japan, Mar. 2004, vol. 103, No. 692, pp. 187-190, NS2003-331, IN2003-286.
U.S. Appl. No. 12/840,146, by Ying Chen et al., filed Jul. 20, 2010.
U.S. Appl. No. 12/908,537, by Ying Chen et al., filed Oct. 20, 2010.
U.S. Appl. No. 12/908,593, by Ying Chen et al., filed Oct. 20, 2010.
U.S. Appl. No. 13/082,051, by Ying Chen et al., filed Apr. 7, 2011.
U.S. Appl. No. 13/205,559, by Ying Chen et al., filed Aug. 8, 2011.
U.S. Appl. No. 13/205,565, by Ying Chen et al., filed Aug. 8, 2011.
U.S. Appl. No. 13/205,574, by Ying Chen et al., filed Aug. 8, 2011.
Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010, XP014047290, paragraphs [5.5.4.2], [5.5.4.3], [5.5.4.4], [5.4.5], [5.5.4.6] paragraphs [10.2.3], [11.2.7], [12.2.3], [12.4.2], [12.6.2] paragraphs [12.6.3], [12.6.3.1], [12.6.4], [12.6.6].
Viswanathan, et al., "Metropolitan area video-on-demand services using pyramid broadcasting", Multimedia Systems, 4(4): 197-208 (1996).
Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).
Viswanathan,Subramaniyam R., "Publishing in Wireless and Wireline Environments," Ph. D Thesis, Rutgers, The State University of New Jersey (Nov. 1994), 180pages.
Watson, M., et, al. "Asynchronous Layered Coding (ALC) Protocol Instantiation", IETF RFC 5775, pp. 1-23, (Apr. 2010).
Wong, J.W., "Broadcast delivery", Proceedings of the IEEE, 76(12): 1566-1577, (1988).
Yamauchi, Nagamasa. "Application of Lost Packet Recovery by Front Error Correction to Internet Multimedia Transfer" Proceedings of Workshop for Multimedia Communication and Distributed Processing, Japan, Information Processing Society of Japan (IPS), Dec. 6, 2000, vol. 2000, No. 15, pp. 145-150.
Yin et al., "Modified Belief-Propogation algorithm for Decoding of Irregular Low-Density Parity-Check Codes", Electronics Letters, IEE Stevenage, GB, vol. 38, No. 24, Nov. 21, 2002, pp. 1551-1553.
Zorzi, et al.: "On the Statistics of Block Errors in Bursty Channels," IEEE Transactions on Communications, vol. 45, No. 6, Jun. 1997, pp. 660-667.
Anonymous: "Technologies under Consideration", 98. MPEG Meeting; Nov. 28, 2011-Dec. 2, 2011; Geneva; (Motion Picture Expert Group or ISO/IEC JTC1/SC29/WG11),, No. N12330, Dec. 3, 2011, XP030018825.
Anonymous: "Text of ISO/IEC IS 23009-1 Media Presentation Description and Segment Formats", 98. MPEG Meeting; Nov. 28, 2011-Dec. 2, 2012; Geneva; (Motion Picture Expert Group or ISO/IEC JTC1/SC29/WG11),, No. N12329, Jan. 6, 2012, XP030018824.
"Digital Video Broadcasting (DVB); Framing structure, channel coding and modulation for digital terrestrial television; ETSI EN 300 744" ETSI Standards, LIS, Sophia Antipolis Cedex, France, V1.6.1, pp. 9, Jan. 10, 2009.
Kim J., et al., "Enhanced Adaptive Modulation and Coding Schemes Based on Multiple Channel Reportings for Wireless Multicast Systems", 62nd IEEE Vehicular Technology Conference, VTC-2005-

(56) References Cited

OTHER PUBLICATIONS

FALL, Sep. 25-28, 2005, vol. 2, pp. 725-729, XP010878578, DOI: 10.1109/VETECF.2005.1558019, ISBN: 978-0-7803-9152-9.
3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005, XP002695256, Retrieved from the Internet: URL:http://www.etsi.org/deliver/etsi_ts/126300_126399/126346/06.01.00_60/ts_126346v060100p.pdf.
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP Standard; 3GPP TS 26.247, 3rd Generation Partnership Project (3GPP), Mobile Competence Centre ; 650, Route Des Lucioles ; F-06921 Sophia-Antipolis Cedex ; France, vol. SA WG4, No. V10.0.0, Jun. 17, 2011, pp. 1-94, XP050553206, [retrieved on Jun. 17, 2010].
Anonymous: "Technologies under Consideration", 100. MPEG Meeting;Apr. 30, 2012-Apr. 5, 2012; Geneva; (Motion Picture Expert Group or ISO/IEC JTC1 /SC29/WG11),, No. N12682, Jun. 7, 2012, XP030019156.
Atis: "PTV Content on Demand Service", IIF-WT-063R44, Nov. 11, 2010, pp. 1-124, XP055045168, Retrieved from the Internet: URL:ftp://vqeg.its.bldrdoc.gov/Documents/VQEG_Atlanta_Nov10/MeetingFiles/Liaison/IIF-WT-063R44_Content_on_Demand.pdf [retrieved on Nov. 22, 2011].
Bouazizi I, et al., "Proposals for ALC/FLUTE server file format (14496-12Amd.2)", 77. MPEG Meeting; Jul. 17, 2006-Jul. 21, 2006; Klagenfurt; (Motion Pictureexpert Group or ISO/IEC JTC1/SC29/WG11), No. M13675, Jul. 12, 2006, XP030042344, ISSN 0000-0236.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pp.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20 2012, JCTVC-J1003_d7, pp. 261.
Bross, et al., "WD4: Working Draft 4 of High-Efficiency Video Coding," JVTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Frojdh P., et al., "Study on 14496-12:2005/PDAM2 ALU/ FLUTE Server File Format", 78.MPEG Meeting; Oct. 23, 2006-Oct. 27, 2006; Hangzhou: (Motion Picturexpert Group or ISO/ IEC JTC1/SC29/WG11) No. M13855, Oct. 13, 2006, XP030042523, ISSN: 0000-0233.
Gil A., et al., "Personalized Multimedia Touristic Services for Hybrid Broadcast/Broadband Mobile Receivers," IEEE Transactions on Consumer Electronics, 2010, vol. 56 (1), pp. 211-219.
Hannuksela M.M., et al., "DASH: Indication of Subsegments Starting with SAP", 97. MPEG Meeting; Jul. 18, 2011-Jul. 22, 2011; Torino; (Motion Picture Expert Group or ISO/IEC JTC1/SC29/WG11) No. m21096, Jul. 21, 2011, XP030049659.
Hannuksela M.M., et al., "ISOBMFF: SAP definitions and 'sidx' box", 97. MPEG Meeting; Jul. 18, 2011-Jul. 22, 2011; Torino; (Motion Picture Expert Group or ISO/IEC JTC1/SC29/WG11) No. m21435, Jul. 22, 2011, XP030049998.
International Search Report and Written Opinion—PCT/US2012/053394—ISA/EPO—Feb. 6, 2013.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang J., "File Format for Scalable Video Coding", PowerPoint Presentation for CMPT 820, Summer 2008.
Li, M., et al., "Playout Buffer and Rate Optimization for Streaming over IEEE 802.11 Wireless Networks", Aug. 2009, Worcester Polytechnic Institute, USA.
Michael G et al., "Improved low-density parity-check codes using irregular graphs", Information Theory, IEEE Transactions on,Feb. 2001,vol. 47, No. 2,pp. 585-598.
Motorola et al: "An Analysis of DCD Channel Mapping to BCAST File Delivery Sessions; OMA-CD-DCD-2007-0112-INP_DCD_Channel_Mapping_to_BCAST_File_Delivery", Open Mobile Alliance (OMA), 4330 La Jolla Village Dr., Suite 110 San Diego, CA 92122; USA Oct. 2, 2007, pp. 1-13, XP064036903.
Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.
Roumy A., et al., "Unequal Erasure Protection and Object Bundle Protection with the Generalized Object Encoding Approach", Inria-00612583, Version 1, Jul. 29, 2011, 25 pages.
Schulzrinne, et al., "Real Time Streaming Protocol (RTSP)" Network Working Group, Request for Comments: 2326, Apr. 1998, pp. 1-92.
Stockhammer T., et al., "DASH: Improvements on Representation Access Points and related flags", 97. MPEG Meeting; Jul. 18, 2011-Jul. 22, 2011; Torino; (Motion Picture Expert Group or ISO/IEC JTC1/SC29/WG11) No. m20339, Jul. 24, 2011, XP030048903.
Wadayama T, "Introduction to Low Density Parity Check Codes and Sum-Product Algorithm," Technical Report of the Institute of Electronics, Information and Communication Engineers, Dec. 6, 2001, vol. 101, No. 498, pp. 39-46, MR2001-83.
Wiegand, T., et al., "WD2: Working Draft 2 of High-Efficiency Video Coding", 20110128, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].
Wiegand, T., et al., "WD3: Working Draft 3 of High-Efficiency Video Coding," Document JCTVC-E603, 5th Meeting: Geneva, CH, Mar. 16-23, 2011,pp. 193.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Yamanouchi N., et al., "Internet Multimedia Transmission with Packet Recovery by Using Forward Error Correction," Proceedings of DPS Workshop, The Information Processing Society of Japan, Dec. 6, 2000, vol. 2000, No. 15, pp. 145-150.
Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Makoto N., et al., "On Tuning of Blocking LU decomposition for VP2000 series" The 42th Information Processing Society of Japan Conference (1st term in 1991), Feb. 25, 1991, pp. 71-72, 4B-8.
Miller G., et al., "Bounds on the maximum likelihood decoding error probability of low density parity check codes", Information Theory, 2000. Proceedings. IEEE International Symposium on, 2000, p. 290.
Moriyama, S., "5. Present Situation of Terrestrial Digital Broadcasting in Europe and USA", Journal of The Institute of Image Information and Television Engineers, Nov. 20, 1999, vol. 53, No. 11, pp. 1476-1478.
Muramatsu J., et al., "Low density parity check matrices for coding of multiple access networks", Information Theory Workshop, 2003. Proceedings. 2003 IEEE , Apr. 4, 2003, pp. 304-307.
Qualcomm Incorporated: "RaptorQ Technical Overview", pp. 1-12, Oct. 1, 2010.

(56) References Cited

OTHER PUBLICATIONS

Samukawa, H. "Blocked Algorithm for LU Decomposition" Journal of the Information Processing Society of Japan, Mar. 15, 1993, vol. 34, No. 3, pp. 398-408.
3GPP TSG-SA4 #57 S4-100015, IMS based PSS and MBMS User Service extensions, Jan. 19, 2010, URL: http://www.3gpp.org/ftp/tsg_sa/WG4_CODEC/TSGS4_57/docs/S4-100015.zip.
3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010 pP.85-102,URL,http://www.3gpp.org/ftp/TSG_SA/WG4_CODEC/TSGS4_59/Docs/S4-100511.zip, 26234-930.zip.
Lee, J.Y., "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.
Luby M., "Simple Forward Error Correction (FEC) Schemes," draft-luby-rmt-bb-fec-supp-simple-00.txt, pp. 1-14, Jun. 2004.
Luby M., "LT Codes", Foundations of Computer Science, 2002, Proceedings, The 43rd Annual IEEE Symposium on, 2002.
Morioka S., "A Verification Methodology for Error Correction Circuits over Galois Fields", Tokyo Research Laboratory, IBM Japan Ltd, pp. 275-280, Apr. 22-23, 2002.
Qualcomm Incorporated: "Adaptive HTTP Streaming: Complete Proposal", 3GPP TSG-SA4 AHI Meeting S4-AHI170, Mar. 2, 2010, URL: http://www.3gpp.org/FTP/tsg_sa/WG4_CODEC/Ad-hoc_MBS/Docs_AHI/S4-AHI170.zip, S4-AH170_CR_AdaptiveHTTPStreaming-Full.doc.
Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Rel-9.doc.
Gerard F., et al., "HTTP Streaming MPEG media—Response to CFP", 93. MPEG Meeting, Geneva Jul. 26, 2010 to Jul. 30, 2010.
Chikara S., et al., "Add-on Download Scheme for Multicast Content Distribution Using LT Codes", IEICE. B, Communications, Aug. 1, 2006, J89-B (8), pp. 1379-1389.
Hasan M A., et al., "Architecture for a Low Complexity Rate-Adaptive Reed-Solomon Encoder", IEEE Transactions on Computers, IEEE Service Center, Los Alamitos, CA, US, vol. 44, No. 7, Jul. 1, 1995, pp. 938-942, XP000525729, ISSN: 0018-9340, DOI: 10.1109/12.392853.
Tetsuo M., et al., "Comparison of Loss Resilient Ability between Multi-Stage and Reed-Solomon Coding ", Technical report of IEICE. CQ, Communication Quality, vol. 103 (178), Jul. 4, 2003, pp. 19-24.
Watson M., et al., "Forward Error Correction (FEC) Framework draft-ietf-fecframe-framework-11," 2011, pp. 1-38, URL,http://tools.ietf.org/pdf/draft-ietf-fecframe-framework-11.pdf.
Watson M., et al., "Raptor FEC Schemes for FECFRAME draft-ietf-fecframe-raptor-04," 2010, pp. 1-21, URL,http://tools.ietf.org/pdf/draft-ietf-fecframe-raptor-04.pdf.
Qualcomm Incorporated: "RatorQ Forward Error Correction Scheme for Object Delivery draft-ietf-rmt-bb-fec-raptorq-04", Internet Engineering Task Force, IETF, pp. 1-68, Aug. 24, 2010.
Ramsey B, "HTTP Status: 206 Partial Content and Range Requests," May 5, 2008 obtained at http://benramsey.com/blog/2008/05/206-partial-content-and-range-requests/.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+---------------------------------------+-----------------------+
|      Source Block Number (SBN)        |  Encoding Symbol ID (ESI) |
|            (16 bits)                  |        (16 bits)      |
+---------------------------------------+-----------------------+
```

Fig. 1A. Raptor-RFC 5053 Payload ID (prior art)

```
 0                   1                   2                   3
 0 1 2 3 4 5 6 7 8 9 0 1 2 3 4 5 6 7 8 9 0 1 2 3 4 5 6 7 8 9 0 1
+---------+---------------------------------------------------+
| Source Block |                                              |
| Number (SBN) |        Encoding Symbol ID (ESI)              |
|   (8 bits)   |              (24 bits)                       |
+---------+---------------------------------------------------+
```

Fig. 1B. RaptorQ-Spec Payload ID (prior art)

```
 0                   1                   2                   3
 0 1 2 3 4 5 6 7 8 9 0 1 2 3 4 5 6 7 8 9 0 1 2 3 4 5 6 7 8 9 0 1
+---------------------------------------------------------------+
|              Universal File Symbol Identifier (UFSI)          |
|                          (32 bits)                            |
+---------------------------------------------------------------+
```

Fig. 2

|  | ESI 0 | ESI 1 | ESI 2 | ESI 3 | ESI 4 | ESI 5 |  |
|---|---|---|---|---|---|---|---|
|  | (0,0) | (0,1) | (0,2) | (0,3) | (0,4) | (0,5) | SBN 0 |
|  | (1,0) | (1,1) | (1,2) | (1,3) | (1,4) | (1,5) | SBN 1 |
|  | (2,0) | (2,1) | (2,2) | (2,3) | (2,4) | (2,5) | SBN 2 |
|  | (3,0) | (3,1) | (3,2) | (3,3) | (3,4) |  | SBN 3 |
|  | (4,0) | (4,1) | (4,2) | (4,3) | (4,4) |  | SBN 4 |

| | | | | | | |
|---|---|---|---|---|---|---|
| SBN 0 | UFSI 0 | UFSI 5 | UFSI 10 | UFSI 15 | UFSI 20 | UFSI 25 |
| SBN 1 | UFSI 1 | UFSI 6 | UFSI 11 | UFSI 16 | UFSI 21 | UFSI 26 |
| SBN 2 | UFSI 2 | UFSI 7 | UFSI 12 | UFSI 17 | UFSI 22 | UFSI 27 |
| SBN 3 | UFSI 3 | UFSI 8 | UFSI 13 | UFSI 18 | UFSI 23 | |
| SBN 4 | UFSI 4 | UFSI 9 | UFSI 14 | UFSI 19 | UFSI 24 | |

Fig. 5

Structure of part 1 of file

| (0,0) | (0,1) | (0,2) | (0,3) | (0,4) | (0,5) | SBN 0 |
|---|---|---|---|---|---|---|
| (1,0) | (1,1) | (1,2) | (1,3) | (1,4) | (1,5) | SBN 1 |
| (2,0) | (2,1) | (2,2) | (2,3) | (2,4) | (2,5) | SBN 2 |
| (3,0) | (3,1) | (3,2) | (3,3) | (3,4) |  | SBN 3 |
| (4,0) | (4,1) | (4,2) | (4,3) | (4,4) |  | SBN 4 |
| ESI 0 | ESI 1 | ESI 2 | ESI 3 | ESI 4 | ESI 5 |  |

Structure of part 2 of file

| (0,0) | (0,1) | (0,2) | (0,3) | SBN 0 |
|---|---|---|---|---|
| (1,0) | (1,1) | (1,2) | (1,3) | SBN 1 |
| (2,0) | (2,1) | (2,2) | (2,3) | SBN 2 |
| (3,0) | (3,1) | (3,2) |  | SBN 3 |
| ESI 0 | ESI 1 | ESI 2 | ESI 3 |  |

| UFSI | $T_1$ | $T_2$ |
|---|---|---|
| UFSI 0 | (0,0) | (0,0) |
| UFSI 1 | (1,0) | (1,0) |
| UFSI 2 | (2,0) | (2,0) |
| UFSI 3 | (3,0) | (3,0) |
| UFSI 4 | (4,0) | (0,1) |
| UFSI 5 | (0,1) | (1,1) |
| UFSI 6 | (1,1) | (2,1) |
| UFSI 7 | (2,1) | (3,1) |
| UFSI 8 | (3,1) | (0,2) |
| UFSI 9 | (4,1) | (1,2) |
| UFSI 10 | (0,2) | (2,2) |
| UFSI 11 | (1,2) | (3,2) |
| UFSI 12 | (2,2) | (0,3) |
| UFSI 13 | (3,2) | (1,3) |
| UFSI 14 | (4,2) | (2,3) |
| UFSI 15 | (0,3) | (3,3) |
| UFSI 16 | (1,3) | (0,4) |
| UFSI 17 | (2,3) | (1,4) |
| UFSI 18 | (3,3) | (2,4) |
| UFSI 19 | (4,3) | (3,4) |
| UFSI 20 | (0,4) | (0,5) |
| UFSI 21 | (1,4) | (1,5) |
| UFSI 22 | (2,4) | (2,5) |
| UFSI 23 | (3,4) | (3,5) |
| UFSI 24 | (4,4) | (0,6) |
| UFSI 25 | (0,5) | (1,6) |
| UFSI 26 | (1,5) | (2,6) |
| UFSI 27 | (2,5) | (3,6) |

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| Number of Objects ($d$=2) (8 bits) | Object 1 Symbol Size ($T_1$) | $F_1$ |
|---|---|---|
| Object 1 Transfer Length (cont.) ($F_1$) ||| 
| Object 2 Symbol Size ($T_2$) | Object 2 Transfer Length ($F_2$) ||
| Object 2 Transfer Length (cont.) ($F_1$) || padding |

Fig. 20

| 0 | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| $A1$ | $Z_1$ | $N_1$ |
|---|---|---|
| $Z_2$ | $N_2$ | padding |

Fig. 21

UNIVERSAL FILE DELIVERY METHODS FOR PROVIDING UNEQUAL ERROR PROTECTION AND BUNDLED FILE DELIVERY SERVICES

CROSS-REFERENCE TO RELATED APPLICATIONS

The present Nonprovisional Application claims benefit of priority under 35 USC §119(e) of U.S. Provisional Patent Application No. 61/406,091, filed Oct. 22, 2010, titled "File Delivery Methods for Providing Unequal Error Protection and Bundled File Delivery Services", the entire contents of which are herein incorporated by reference for all purposes.

The present disclosure may be related to the following commonly assigned patents or applications, each of which are herein incorporated by reference in their entirety for all purposes:

1) U.S. Pat. No. 6,307,487 issued to Michael G. Luby, entitled "Information Additive Code Generator and Decoder for Communication Systems" (hereinafter "Luby I");

2) U.S. Pat. No. 6,320,520 issued to Michael G. Luby, entitled "Information Additive Group Code Generator and Decoder for Communication Systems" (hereinafter "Luby II");

3) U.S. Pat. No. 6,856,263 issued to M. Amin Shokrollahi, entitled "Systems and Processes for Decoding a Chain Reaction Code Through Inactivation" (hereinafter "Shokrollahi I");

4) U.S. Pat. No. 6,909,383, issued to M. Amin Shokrollahi, entitled "Systematic Encoding and Decoding of Chain Reaction Codes" (hereinafter "Shokrollahi II");

5) U.S. Pat. No. 7,068,729 issued to M. Amin Shokrollahi, entitled "Multi-Stage Code Generator and Decoder for Communication Systems" (hereinafter "Shokrollahi III");

6) U.S. Pat. No. 7,418,651, issued to Michael G. Luby, M. Amin Shokrollahi and Mark Watson, entitled "File Download and Streaming System" (hereinafter "Luby III");

7) U.S. Patent Publication No. 2006/0280254 naming Michael G. Luby and M. Amin Shokrollahi, entitled "In-Place Transformations with Applications to Encoding and Decoding Various Classes of Codes" (hereinafter "Luby IV");

8) U.S. Patent Publication No. 2007/0195894 naming M. Amin Shokrollahi, entitled "Multiple-Field Based Code Generator and Decoder for Communications Systems" (hereinafter "Shokrollahi IV");

9) U.S. patent application Ser. No. 12/604,773, filed Oct. 23, 2009, naming M. Amin Shokrollahi, et al., entitled "Method and Apparatus Employing FEC Codes with Permanent Inactivation of Symbols for Encoding and Decoding Processes" (hereinafter "Shokrollahi V");

10) U.S. Provisional Application No. 61/235,285, filed Aug. 19, 2009, naming Michael G. Luby, entitled "Methods and Apparatus Employing FEC Codes with Permanent Inactivation of Symbols for Encoding and Decoding Processes" (hereinafter "Luby V"); and 11) U.S. patent application Ser. No. 12/859,161 filed Aug. 18, 2010 naming Michael G. Luby, M. Amin Shokrollahi, entitled "Methods and Apparatus Employing FEC Codes with Permanent Inactivation of Symbols for Encoding and Decoding Processes" (hereinafter "Shokrollahi VI").

REFERENCES

Each of references below is herein incorporated by reference in their entirety for all purposes:

[Albanese96], or [PET] "Priority Encoding Transmission", Andres Albanese, Johannes Blomer, Jeff Edmonds, Michael Luby, and Madhu Sudan, IEEE Transactions on Information Theory, vol. 42, no. 6 (November 1996);

[Albanese97], or [PET-Patent] U.S. Pat. No. 5,617,541 to A. Albanese, M. Luby, J. Blomer, J. Edmonds, entitled "System for Packetizing Data Encoded Corresponding to Priority Levels Where Reconstructed Data Corresponds to Fractionalized Priority Level and Received Fractionalized Packets" (issued Apr. 1, 1997);

[ALC] Luby, M., Watson, M., Vicisano, L., "Asynchronous Layered Coding (ALC) Protocol Instantiation", IETF RFC 5775 (April 2010);

[FEC BB] Watson, M., Luby, M., and L. Vicisano, "Forward Error Correction (FEC) Building Block", IETF RFC 5052 (August 2007);

[FLUTE] Paila, T., Luby, M., Lehtonen, R., Roca, V., Walsh, R., "FLUTE—File Delivery over Unidirectional Transport", IETF RFC 3926 (October 2004);

[LCT] Luby, M., Watson, M., Vicisano, L., "Layered Coding Transport (LCT) Building Block", IETF RFC 5651 (October 2009)

[Luby2010], or [RaptorQ-Spec] M. Luby, A. Shokrollahi, M. Watson, T. Stockhammer, L. Minder, "RaptorQ Forward Error Correction Scheme for Object Delivery", draft-ietf-rmt-bb-fec-raptorq-04, Reliable Multicast Transport (Aug. 24, 2010);

[Luby2007], or [Raptor-RFC-5053] M. Luby, A. Shokrollahi, M. Watson, T. Stockhammer, "Raptor Forward Error Correction Scheme for Object Delivery", IETF RFC 5053 (September 2007);

[Luby2002] Luby, M., Vicisano, L., Gemmell, J., Rizzo, L., Handley, M., and J. Crowcroft, "The Use of Forward Error Correction (FEC) in Reliable Multicast", IETF RFC 3453 (December 2002);

[Matsuoka], or [LDPC-Extensions] "Low-Density Parity-Check Code Extensions Applied for Broadcast-Communication Integrated Content Delivery", Hosei Matsuoka, Akira Yamada, and Tomoyuki Ohya, Research Laboratories, NTT DOCOMO, Inc., 3-6, Hikari-No-Oka, Yokosuka, Kanagawa, 239-8536, Japan; and

[Roca], or [LDPC-RFC-5170] V. Roca, C. Neumann, D. Furodet, "Low Density Parity Check (LDPC) Staircase and Triangle Forward Error Correction (FEC) Schemes", IETF RFC 5170 (June 2008).

FIELD OF THE INVENTION

The present invention relates to encoding and decoding data in communications systems and more specifically to communication systems that encode and decode data to account for errors and gaps in communicated data in an efficient manner and that handle different file delivery methods.

BACKGROUND OF THE INVENTION

Techniques for transmission of files between a sender and a recipient over a communications channel are the subject of much literature. Preferably, a recipient desires to receive an exact copy of data transmitted over a channel by a sender with some level of certainty. Where the channel does not have perfect fidelity (which covers most all physically realizable systems), one concern is how to deal with data lost or garbled in transmission. Lost data (erasures) are often easier to deal with than corrupted data (errors) because the recipient cannot always tell when corrupted data is data received in error. Many error-correcting codes have been developed to correct for erasures and/or for errors. Typically, the particular code used is chosen based on some information about the infidelities of the channel through which the data is being transmitted and the nature of the data being transmitted. For example, where the channel is known to have long periods of infidelity, a burst error code might be best suited for that application. Where only short, infrequent errors are expected a simple parity code might be best.

As used herein, "source data" refers to data that is available at one or more senders and that a receiver is used to obtain, by recovery from a transmitted sequence with or without errors and/or erasures, etc. As used herein, "encoded data" refers to data that is conveyed and can be used to recover or obtain the source data. In a simple case, the encoded data is a copy of the source data, but if the received encoded data differs (due to errors and/or erasures) from the transmitted encoded data, in this simple case the source data might not be entirely recoverable absent additional data about the source data. Transmission can be through space or time. In a more complex case, the encoded data is generated based on source data in a transformation and is transmitted from one or more senders to receivers. The encoding is said to be "systematic" if the source data is found to be part of the encoded data. In a simple example of systematic encoding, redundant information about the source data is appended to the end of the source data to form the encoded data.

Also as used herein, "input data" refers to data that is present at an input of an FEC (forward-error correcting) encoder apparatus or an FEC encoder module, component, step, etc., ("FEC encoder") and "output data" refers to data that is present at an output of an FEC encoder. Correspondingly, output data would be expected to be present at an input of an FEC decoder and the FEC decoder would be expected to output the input data, or a correspondence thereof, based on the output data it processed. In some cases, the input data is, or includes, the source data, and in some cases, the output data is, or includes, the encoded data. For example, the input data would be the source data if there is no processing before the input of an FEC encoder. However, in some cases, the source data is processed into a different form (e.g., a static encoder, an inverse encoder or another process) to generate intermediate data that is presented to the FEC encoder instead of the source data.

In some cases, a sender device or sender program code may comprise more than one FEC encoder, i.e., source data is transformed into encoded data in a series of a plurality of FEC encoders. Similarly at the receiver, there may be more than one FEC decoder applied to generate source data from received encoded data.

Data can be thought of as partitioned into symbols. An encoder is a computer system, device, electronic circuit, or the like, that generates encoded symbols or output symbols from a sequence of source symbols or input symbols and a decoder is the counterpart that recovers a sequence of source symbols or input symbols from received or recovered encoded symbols or output symbols. The encoder and decoder are separated in time and/or space by the channel and any received encoded symbols might not be exactly the same as corresponding transmitted encoded symbols and they might not be received in exactly the same sequence as they were transmitted. The "size" of a symbol can be measured in bits, whether or not the symbol is actually broken into a bit stream, where a symbol has a size of M bits when the symbol is selected from an alphabet of $2^M$ symbols. In many of the examples herein, symbols are measured in octets and codes might be over a field of 256 possibilities (there are 256 possible 8-bit patterns within each octet), but it should be understood that different units of data measurement can be used and it is well-known to measure data in various ways. In the general literature, the term "byte" is sometimes used interchangeably with the term "octet" to indicate an 8-bit value, although in some contexts "byte" indicates an X-bit value where X is not equal to 8, e.g., X=7, and thus, in general, the term "octet" is used herein. Unless otherwise indicated, the examples herein are not limited to a particular integer or noninteger number of bits per symbol.

Luby I describes the use of codes, such as chain reaction codes, to address error correction in a compute-efficient, memory-efficient and bandwidth-efficient manner. One property of the encoded symbols produced by a chain reaction encoder is that a receiver is able to recover the original file as soon as enough encoded symbols have been received. Specifically, to recover the original K source symbols with a high probability, the receiver needs approximately K+A encoded symbols.

The "absolute reception overhead" for a given situation is represented by the value A, while a "relative reception overhead" can be calculated as the ratio A/K. The absolute reception overhead is a measure of how much extra data needs to be received beyond the information theoretic minimal amount of data, and it may depend on the reliability of the decoder and may vary as a function of the number, K, of source symbols. Similarly, the relative reception overhead, A/K, is a measure of how much extra data needs to be received beyond the information theoretic minimal amount of data relative to the size of the source data being recovered, and also may depend on the reliability of the decoder and may vary as a function of the number K of source symbols.

Chain reaction codes are extremely useful for communication over a packet based network. However, they can be fairly computationally intensive at times. A decoder might be able to decode more often, or more easily, if the source symbols are encoded using a static encoder prior to a dynamic encoder that encodes using a chain reaction or another rateless code. Such decoders are shown in Shokrollahi I, for example. In examples shown there, source symbols are input symbols to a static encoder that produces output symbols that are input symbols to a dynamic encoder that produces output symbols that are the encoded symbols, wherein the dynamic encoder is a rateless encoder that that can generate a number of output symbols in a quantity that is not a fixed rate relative to the number of input symbols. The static encoder might include more than one fixed rate encoder. For example a static encoder might include a Hamming encoder, a low-density parity-check ("LDPC") encoder, a high-density parity-check ("HDPC") encoder, and/or the like.

Chain reaction codes have a property that as some symbols are recovered at the decoder from the received symbols, those symbols might be able to be used to recover additional symbols, which in turn might be used to recover yet more symbols. Preferably, the chain reaction of symbol solving at the decoder can continue such that all of the desired symbols are recovered before the pool of received symbols is used up. Preferably, the computational complexity of performing chain reaction encoding and decoding processes is low.

A recovery process at the decoder might involve determining which symbols were received, creating a matrix that would map the original input symbols to those encoded symbols that were received, then inverting the matrix and performing a matrix multiplication of the inverted matrix and a vector of the received encoded symbols. In a typical system, a brute force implementation of this can consume excessive computing effort and memory requirements. Of course, for a particular set of received encoded symbols, it might be impossible to recover all of the original input symbols, but even where it is possible, it might be very computationally expensive to compute the result.

Forward Error Correction ("FEC") Object Transmission Information ("OTI"), or "FEC OTI"

Based on the FEC OTI a receiver receives (or is able to infer), the receiver can determine the source block and sub-block structure of the file transfer. In [Raptor-RFC-5053] and [RaptorQ-Spec], the FEC Payload ID is (SBN, ESI), where in [Raptor-RFC-5053] the source block number (SBN) is 16 bits and the encoding symbol ID (ESI) is 16 bits, whereas in [RaptorQ-Spec] the SBN is 8 bits and the ESI is 24 bits, as illustrated in FIG. 1 herein. One disadvantage of this FEC Payload ID format is that one has to pre-determine the number of bits of the FEC Payload ID to allocate to the SBN and to the ESI, and it is sometimes difficult to determine a proper mix that will be adequate for all file delivery parameters.

For example, when using [Raptor-RFC-5053], having only $2^{16}$=65,536 ESIs available might be limiting in some situations, since in some cases there might be a source block with 8,192 source symbols and thus the number of encoded symbols is only a factor of 8 larger, limiting the possible code rate that could be used to not go down below ⅛ in this case. In this example, it may be that $2^{16}$=65,536 source blocks available could be more than would ever be used, e.g., with 8,192 source symbols of 1,024 octets each, the size of the file that could be supported is 524 GB, which in many applications is two orders of magnitude larger than is needed.

As another example, when using [RaptorQ-Spec], having only $2^8$=256 SBNs available might be limiting in some situations, since for a 4 GB file, if each source block is limited to 8 MB (which might be the case if the maximum sub-block size is 256 KB, the minimum sub-symbol size is 32 octets, and the symbol size is 1,024 octets) then limiting the number of source blocks to 256 in turn limits the file size to 2 GB. In this example, it may be that having available $2^{24}$=16,777,216 possible encoded symbols are more than would ever be used, e.g., with 8,192 source symbols the number of possible encoded symbols is 2,048 times larger, which may never be needed in some applications.

Another desirable property is to provide capabilities for prioritized encoding transmission, sometimes also called unequal error protection ("UEP"), between different parts of the file. For example, it might be desirable to protect the first 10% of the file more strongly against packet loss than the remaining 90%. For example, [LDPC-Extensions] describes how [LDPC-RFC-5170] can be extended to provide support for UEP. In this case, the actual FEC code itself is modified to provide different levels of parity protection on different parts of a file. However, there are drawbacks to this approach. For example, it is not desirable to have to modify the FEC code itself to provide UEP, as this complicates implementing and testing the FEC code itself. Furthermore, as the results shown in FIG. 6 of [LDPC-Extensions], the resulting performance of such an approach in terms of the resiliency to packet loss that is provided for the different parts of the file is far from optimal.

One way to provide UEP file delivery capabilities, as described in [PET] and [PET-Patent], is to allocate different parts of each packet for the different parts of the file according to their priority and size. However, a concern is how to incorporate such UEP methods in such a way that each different part of the file can be partitioned into source blocks and sub-blocks independently of other parts of the file, for example to support small memory decoding of each part of the file, and yet at the same time provide an FEC Payload ID within each packet that allows the receiver to determine which symbol for each part of the file is contained in each packet. This is very difficult to support using an FEC Payload ID of the format (SBN, ESI), as for each part of the file the corresponding SBN and ESI for the symbol in the packet for a first part of the file might be different than the SBN and ESI for the symbol in the packet for a second part of the file.

HTTP Repair Methods

The way that repair requests are made in the 3GPP MBMS standard TS 26.346 for broadcast/multicast file delivery, for example, is to use the FEC Payload ID specified in [Raptor-RFC-5053], i.e., by specifying the source block number (SBN) and the encoding symbol identifier (ESI). Although this method is reasonable if the servers that respond to repair requests have specialized methods that require them to determine the file delivery structure used in the broadcast/multicast file delivery, i.e., they are required to interpret which parts of the file are referenced by the requested SBNs and ESIs, which requires knowing the source block and sub-block structure as well as the symbol size, T. On the other hand, there may be millions of broadcast/multicast receivers spread across a large geographic area, and requiring deployment of specialized response servers is both expensive and cumbersome, both from a capital expense and from an operational perspective. What are widely deployed are standard HTTP web servers and web caches that support Internet delivery, e.g., web pages, video streaming, etc. What is desirable is a method that supports using standard HTTP web servers and web caches as broadcast/multicast response servers.

SUMMARY OF THE INVENTION

In embodiments of a file delivery method and apparatus, a universal file symbol identifier ("UFSI") or a universal object symbol identifier ("UOSI") is associated with is provided with a packet to identify structures within the packet that are needed for identifying encoding symbols contained within the packet. When so used, the UFSIs/UOSIs allow for enhanced handling of FEC and file/object delivery, including unequal error protection, wherein not all portions of the data delivered have the same level of FEC protection, and bundled object delivery, wherein multiple objects can be handled more efficiently than if separately handled.

The following detailed description together with the accompanying drawings will provide a better understanding of the nature and advantages of the present invention.

BRIEF DESCRIPTION OF THE DRAWINGS

FIG. 1 is a diagram illustrating conventional FEC Payload IDs; FIG. 1A illustrates an FEC Payload ID for Raptor-RFC 5053, while FIG. 1B illustrates an FEC Payload ID for RaptorQ-Spec.

FIG. 2 is a diagram illustrating the FEC Payload ID for a basic universal file delivery ("UFD") method.

FIG. 5 is an example illustrating the (SBN, ESI) identification of symbols of a file and the mapping to and from the corresponding universal file symbol identifiers ("UFSIs") of symbols of a file.

FIG. 8 illustrates an example of an (SBN, ESI) identification of a file that comprises two parts, each having a different priority.

FIG. 9 illustrates an example, corresponding to FIG. 8, of the mapping between the (SBN, ESI) identifiers of encoded symbols from the two parts of the file and the packets containing encoded symbols for the parts together with the UFSI included in each packet.

FIG. 20 illustrates an example of a common FEC OTI element format.

FIG. 21 illustrates an example of a scheme-specific FEC OTI element format.

DETAILED DESCRIPTION OF THE INVENTION

Figure 3:
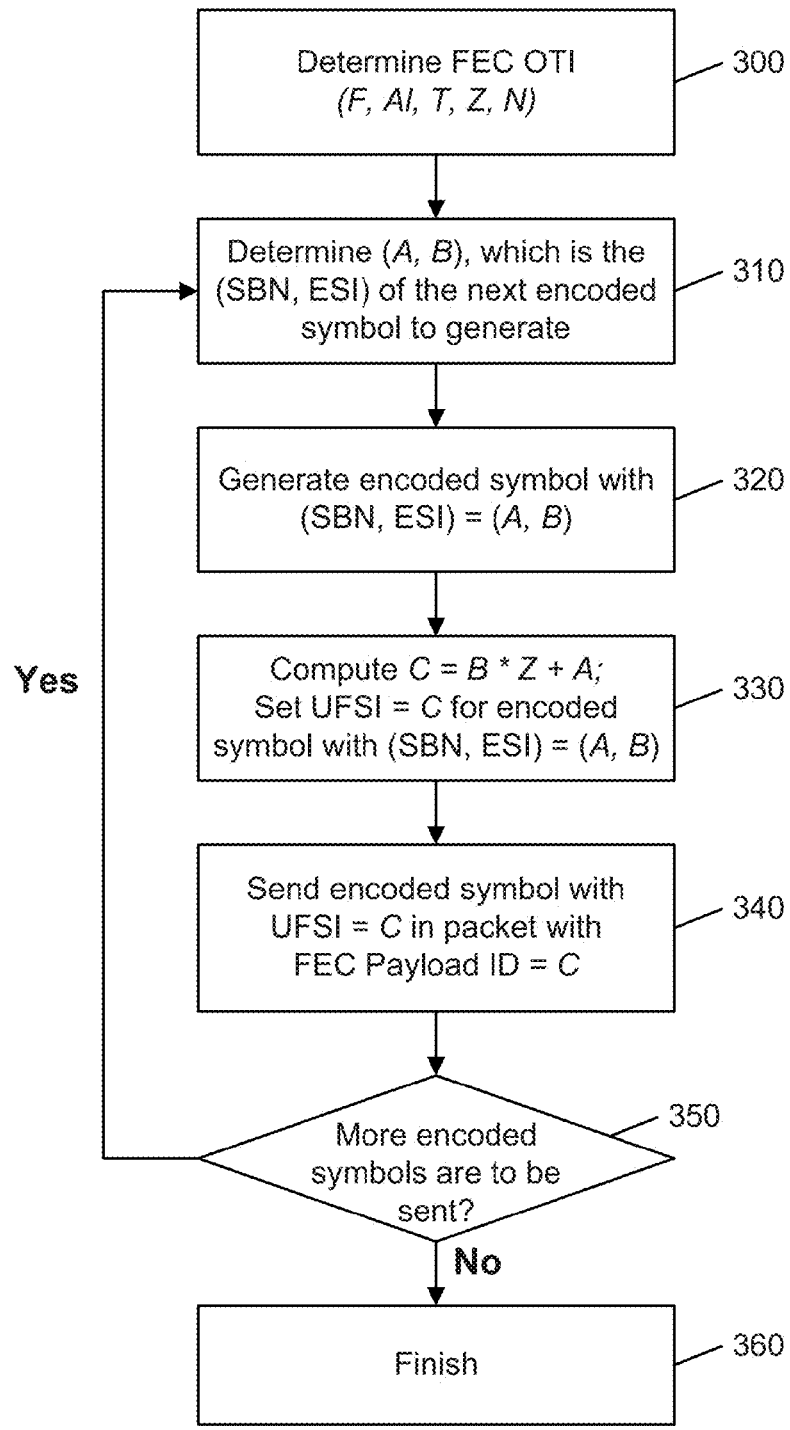
FIG. 3 is a flow chart that illustrates a sender basic UFD method.

In embodiments herein, file delivery is performed by an encoder/transmitter system that sends a file and a receiver/decoder system that receives a file. The format of the transmissions is coordinated so that the decoder understands what the encoder encoded. As shown in various examples below, file delivery is an example of general object delivery and unless otherwise indicated, it should be apparent from these examples that objects can be treated as files and possibly vice versa.

In a packet delivery system, the data is organized into packets and transmitted as packets. Each packet has elements that allow a receiver to determine what is in the packet and how it is laid out. Using the techniques described herein, flexibility is provided for transmitting packets where forward error correction ("FEC") is used.

Using these techniques, unequal FEC protection can be provided, as well as bundled delivery of files. It is well-known that when many files are delivered as separate files, the resiliency of the deliveries to packet loss can be much less than if all the files are concatenated together into a larger file and the larger file is protected in the delivery. However, a signaling of the structure of the larger file as a combination of smaller files is required, and the receiver generally needs to recover the entire large file to recover any of the smaller files within the large file, even if the receiver is only interested in recovering a subset of the smaller files.

Thus, a preferred file delivery system or method should allow any flexible combination of the number of source blocks and the number of encoding symbols per source block that is used as the file delivery structure for a file. It should also be the case that file delivery methods provide efficient protection against packet loss, and support delivery of the file with different parts of the file protected at different priorities, wherein each part of the file may have a different source block structure and sub-block structure than other parts of the file. Again, files are in some cases considered specific examples of objects, but herein it should be understood that the examples used herein to describe transport and handling of files can also be used for data objects that are perhaps not referred to as files, such as large chunks of data from a database, a portion of a video sequence, etc.

The file/object delivery system or method should provide for the delivery of many smaller files/objects with the protection efficiency of a large file/object, simple signaling of the smaller file/object structures, and the capabilities for the receiver to independently recover only a subset of the smaller files/objects without recovering all of the smaller files/objects. Examples of systems with these desirable qualities will now be described.

A Basic Universal File Delivery ("UFD") Method and System

A basic universal file delivery ("UFD") method and corresponding system(s) will now be described, wherein the UFD includes significant advantages over existing file delivery methods. The Forward Error Correction ("FEC") Payload ID for the basic UFD method comprises a universal file symbol identifier ("UFSI") field, which for example can be a 32-bit field. The sender and receiver methods for the basic UFD method will now be described in turn. Again, where files are referred to as objects, "UFSI" might be referred to instead as "UOSI" (a universal object symbol identifier).

The sender basic UFD method is described with reference to FIG. 3. The sender can use existing methods to generate the FEC Object Transmission Information ("OTI"), for example as described in the [Raptor-RFC-5053] or [RaptorQ-Spec] (see, for example, Section 4.3 of [RaptorQ-Spec]), and use the FEC OTI to determine the source block and sub-block structure to be used to transmit the file, and to determine the relationship between (SBN, ESI) pairs and the encoded symbols of the file (see, for example, Section 4.4 of [RaptorQ-Spec]).

For example, as described in [RaptorQ-Spec], the generated FEC OTI can be (F, Al, T, Z, N), where F is the size of the file to be transmitted, Al is an alignment factor that is used to make sure that sub-symbols are aligned on memory boundaries that are multiples of Al, T is the size of the symbols to be generated and sent in the transmission, Z is the number of source blocks into which the file is to be partitioned for transmission, and N is the number of sub-blocks into which each source block is to partitioned for transmission. This is as shown in Step 300 of FIG. 3.

The sender can form encoded symbols to be sent in packets and generate the SBNs and ESIs for these encoded symbols using existing methods based on the source block, and if sub-blocking is used, then also the sub-block structure, e.g., as described in [RaptorQ-Spec]. Each time an encoded symbol is to be sent, the sender can determine the SBN A and the ESI B for the encoded symbol to be generated, as shown in Step 310 of FIG. 3, and then the sender can generate the value of the encoded symbol based on (SBN, ESI)=(A, B) using existing techniques for example those described in [RaptorQ-Spec], as shown in Step 320 of FIG. 3. Then, the UFSI C for that encoded symbol is computed as C=B*Z+A, as shown in Step 330 of FIG. 3.

The sender can send the encoded symbol in a packet with the FEC Payload ID of the packet set to the UFSI C of the encoded symbol, as shown in Step 340 of FIG. 3. The sender can then determine if more encoded symbols are to be sent, as shown in Step 350 of FIG. 3, and if so then the sender can generate additional encoded symbols to send, as shown by the "Yes" branch to Step 310 of FIG. 3 and, and if not then the sender can finish, as shown by the "No" branch to Step 360 of FIG. 3.

There are many variations of the sender basic UFD method. For example, the sender can send more than one encoded symbol in at least some of the packets, in which case the FEC Payload ID can be set to the UFSI of the first encoded symbol contained in the packet and additional symbols contained in the packet can be chosen so that their corresponding UFSI values are consecutive. For example, if there are three encoded symbols carried in the packet and the first such symbol has UFSI=4,234, then the other two encoded symbols can be those with UFSIs 4,235 and 4,235, respectively. As examples of other alternatives, the sender may predetermine how many encoded symbols to generate and determine the (SBN, ESI) values for all the encoded symbols to be generated before generating any of the encoded symbols. As another example, the UFSI values may be generated directly without an intermediate step of generating the (SBN, ESI) values.

As another example of a variation, other forms of FEC OTI information may be generated. For example, a base UFSI BU may be included in the FEC OTI for the file, that can be used as follows: the UFSI to be used by the FEC sender and receiver for an encoded symbol contained in a packet is U+BU, where U is the UFSI carried in the packet carrying the encoded symbol. Thus, for example, if a packet carries U=1,045, and the base UFSI in the FEC OTI is BU=2,000,000, then the encoded symbol UFSI is 2,001,045. Usage of the base UFSI has several advantages. For one, the protocol suite described in [FLUTE], [ALC], [LCT], [FEC BB] associates a Transmission Object Identifier, also called a TOI, with the FEC OTI of a file or object to be transported. It is possible that encoded symbols for the same file may be sent at different times or in different sessions and can be associated with different TOIs. Also, it is advantageous to be able to send encoded packets starting with the UFSI=0 for the packets associated with each different TOI. By having the ability to specify a base UFSI as part of the FEC OTI, a different base UFSI can be associated with each TOI for which encoded symbols are to be sent for the file without sending duplicate encoded symbols for the different TOIs. For example, encoded symbols for the same file may be sent in packets associated with TOI=1 and associated with TOI=2, wherein the base UFSI associated with TOI=1 is set to 0, and wherein the base UFSI associated with TOI=2 is set to 1,000,000. Then, the encoded packets for both TOI=1 and TOI=2 can contain the sequence of UFSIs 0, 1, 2, etc., and there will be no duplicate encoded symbols sent amongst the encoded symbols sent associated with the two TOIs as long as less than 1,000,000 encoded symbols are sent for the file with TOI=1.

Figure 4:
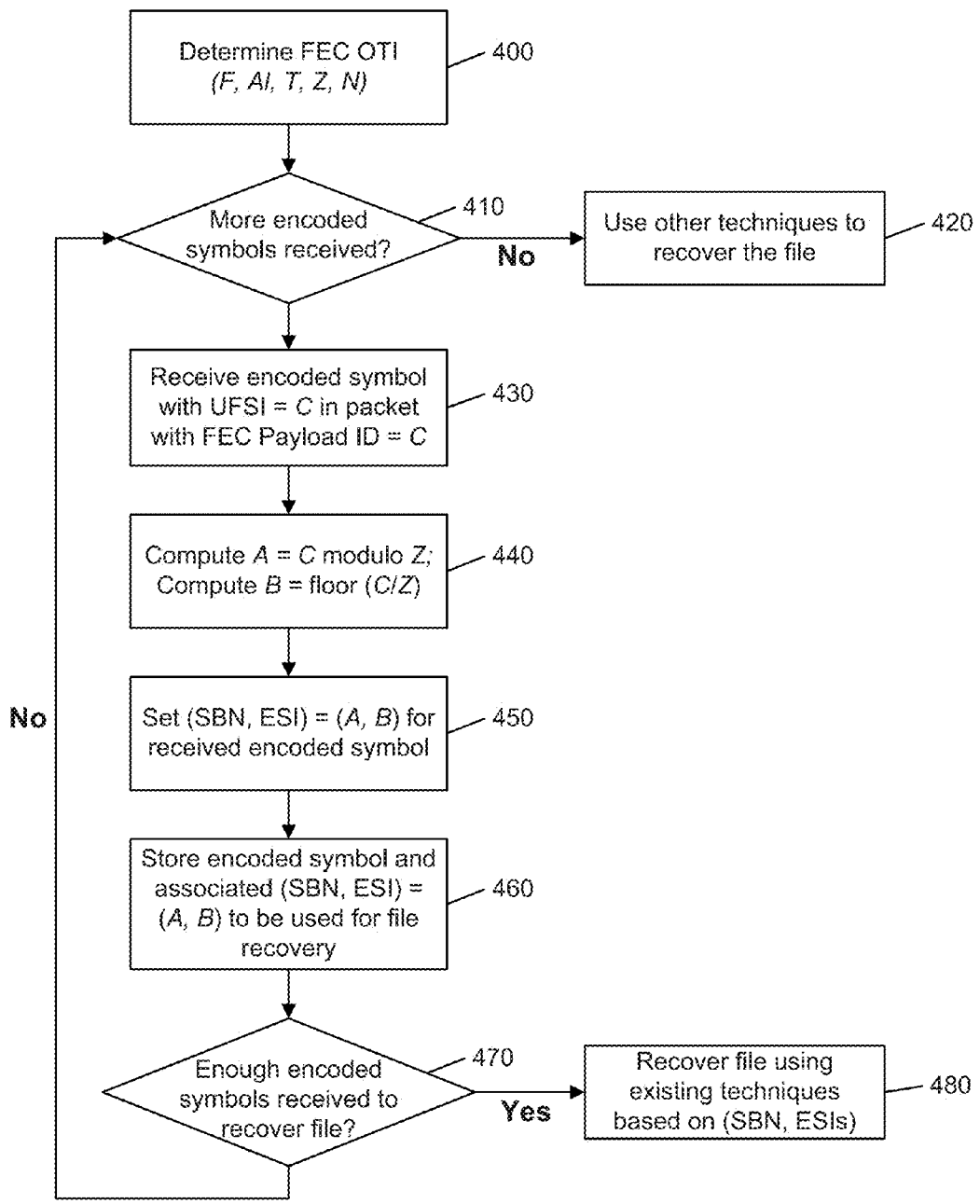
FIG. 4 is a flow chart that illustrates a receiver basic UFD method.

The receiver basic UFD method is described with reference to FIG. 4. The receiver can use existing techniques to determine the FEC OTI (F, Al, T, Z, N) in the same format as described above as for the sender, as shown in Step 400 of FIG. 4. For example, the FEC OTI may be embedded in a FLUTE session description, or the FEC OTI may be encoded into a URL, or the FEC OTI may be obtained via an SDP message. In Step 410, the receiver sees if more encoded symbols are received, and it may stay at this step until it either receives another encoded symbol, in which case the receiver proceeds to Step 430, or the receiver determines that more encoded symbols are not going to be received, in which case the receiver proceeds to Step 420 and either tries to recover the file using other means, for example using HTTP requests to a file repair server, or the receiver may wait for another session to receiver more encoded symbols at a later time, or the receiver may decide that the file cannot be recovered.

When another encoded symbol is available, in Step 430 the receiver determines the UFSI C of the encoded symbol and receives the value of the encoded symbol. In Step 440, the receiver calculates A=C modulo Z, and B=floor(C/Z) based on the number Z of source blocks and the UFSI C, and in Step 450 the receiver sets the (SBN, ESI) for the encoded symbol to (A, B), and in Step 460 the receiver stores the value of the encoded symbol and (A, B) to be used for file recovery. In Step 470 the receiver determines if there are enough encoded symbols received to recover the file, and if so proceeds to recover the file in Step 480, and if not proceeds to receive more encoded symbols in Step 410.

There are many variations of the receiver basic UFD method. For example, the receiver can receive more than one encoded symbol in at least some of the packets, in which case the FEC Payload ID may be set to the UFSI of the first encoded symbol contained in the packet and additional symbols in the packet may have corresponding UFSI values that are consecutive. For example, if there are three encoded symbols carried in the packet and the first such symbol has UFSI=4,234, then the other two encoded symbols can be those with UFSIs 4,235 and 4,235, respectively, and the UFSI carried in the packet might the UFSI=4,234 of the first encoded symbol. As examples of other alternatives, the receiver may predetermine how many encoded symbols to receive before attempting recovery. As another example, the receiver may do some processing that is specific to the FEC code used to determine if enough encoded symbols have been received to recover the file. As another example, the UFSI values may be used directly without an intermediate step of generating the (SBN, ESI) values in the recovery process. As another example, recovery of the file may happen concurrently with reception of encoded symbols. As another example, other forms of FEC OTI information may be used.

Combining the basic UFD method with the techniques described in [RaptorQ-Spec] for determining the source block and sub-block structure provides many advantages. For example, what previous methods called source symbols that were identified by a combination of a SBN and ESI for purposes of transmitting the file can be viewed as file symbols that are identified by a UFSI when using the basic UFD method. Let F be the size of the file in octets to be transmitted, and let T be the symbol size to be used for FEC encoding/decoding purposes when transmitting the file, and thus KT=ceil(F/T) is the total number of symbols in the file, where ceil(x) is the smallest integer greater than or equal to x.

When the source block structure and sub-blocking structure is determined as for example described in [RaptorQ-Spec], and the basic UFD method described above is used to convert the identification of a symbol from (SBN, ESI) format to and from UFSI format, the range of UFSIs for the file symbols are 0, 1, 2, ..., KT, and any repair symbols generated from the file will have UFSIs in the range KT+1, KT+2, etc. This property allows the determination of whether a symbol is part of the original file or is a repair symbol generated from the file by simply comparing its UFSI to the value of KT. This can be useful for example to allow receivers that do not support FEC decoding to determine which symbols are part of the original file (and their position within the file) and which can be ignored as repair symbols, based on the UFSI value carried in packets, and on the value of KT for the file.

FIG. 5 illustrates an example, where in this case the file size is F=28,669 octets, the symbol size is T=1,024 octets, and thus KT=ceil(F/T)=28. In FIG. 5, the (SBN, ESI) labeling of the symbols of the file is shown at the top, where each row corresponds to a source block and each column corresponds to symbols with the same ESI value. The corresponding UFSI labeling of the symbols is shown at the bottom. In this case, the symbol with UFSI=27, i.e., the $28^{th}$ symbol with respect to the UFSI labeling, has its last (KT*T)−F=3 octets padded out with zeroes for the purposes of FEC encoding and decoding, but these last three padded octets of this symbol need not be transmitted. Any encoded symbol with UFSI 28 or larger is a repair symbol in this example, where the encoded symbol with UFSI 28 is generated from the source block with SBN=3, the encoded symbol with UFSI 29 is generated from the source block with SBN=4, the encoded symbol with UFSI 30 is generated from the source block with SBN=0, and so on. There are many other advantages of this property, as one skilled in the art will recognize.

Another advantage of the basic UFD method is that if the encoded symbols are sent in the order defined by their UFSI, i.e., in the UFSI order 0, 1, 2, 3, 4, ..., then the encoded symbols for the Z source blocks are sent in interleaved order, i.e., the Z encoded symbols with ESI 0 from each of the Z source blocks are sent first, followed by the Z encoded symbols with ESI 1 from each of the Z source blocks, etc. For most transmissions, this simple sending order is sufficient and preferred. However, in the case that packet loss experiences some periodicity that might be synchronized with the number of source blocks Z, a potentially better sending order is to randomly permute each set of Z UFSI-consecutive encoded symbols before sending them, i.e., the first Z encoded symbols with UFSIs 0, ..., Z−1 are sent in random permuted order, and then the next Z encoded symbols with UFSIs Z, ..., 2*Z−1 are sent in random permuted order, etc. It should be understood through this description, that "random" can include pseudorandom, unless otherwise indicated.

Using the basic UFD method provides many additional advantages over previous known methods. For example, there is a separate predetermined number of possible source blocks or number of possible encoded symbols per source block when using an FEC Payload ID comprising an SBN and ESI fields of predetermined sizes. For example, an 8-bit SBN and a 24-bit ESI resulting in a 32-bit FEC Payload ID limits the number of possible source blocks to 256 and the number of possible encoded symbols per source block to 16,777,216. Instead, the FEC Payload ID comprising the UFSI field only limits the total number of possible encoded symbols for a file, independent of the source block structure of the file. For example, when using a 32-bit UFSI resulting in a 32-bit FEC Payload ID, the total number of encoded symbols that can be generated for a file is 4,294,967,296, independent of how many source blocks into which the file is partitioned, and independent of the sub-block structure of the file if sub-blocking is used. Thus, if symbol is 1,024 octets in size, in this example the file size could be up to 4 GB and the number of encoded symbols could be 1,024 times the file size, independent of whether the file is partitioned into one source block, 16,384 source blocks, or 4,194,304 source blocks. As another example, the file size could be 2 TB and the number of encoded symbols could be twice the file size. In all cases, the number of encoded symbols that could be generated for the file is independent of the sub-blocking structure of the file, if a sub-blocking structure is used.

A Universal File Delivery Method For Unequal Error Protection File Delivery Services Most previous file delivery methods don't support unequal error protection ("UEP") file delivery. There are some previous methods, for example those currently specified in the ISDB-Tmm (Terrestrial mobile multi-media) standard, using the methods described in [LDPC-Extensions], that support UEP by changing the actual FEC code used to encode the different parts of the file. Besides the disadvantage of having to change the actual FEC code when using UEP, a further disadvantage is that the protection provided by these methods is far from ideal.

Figure 6:
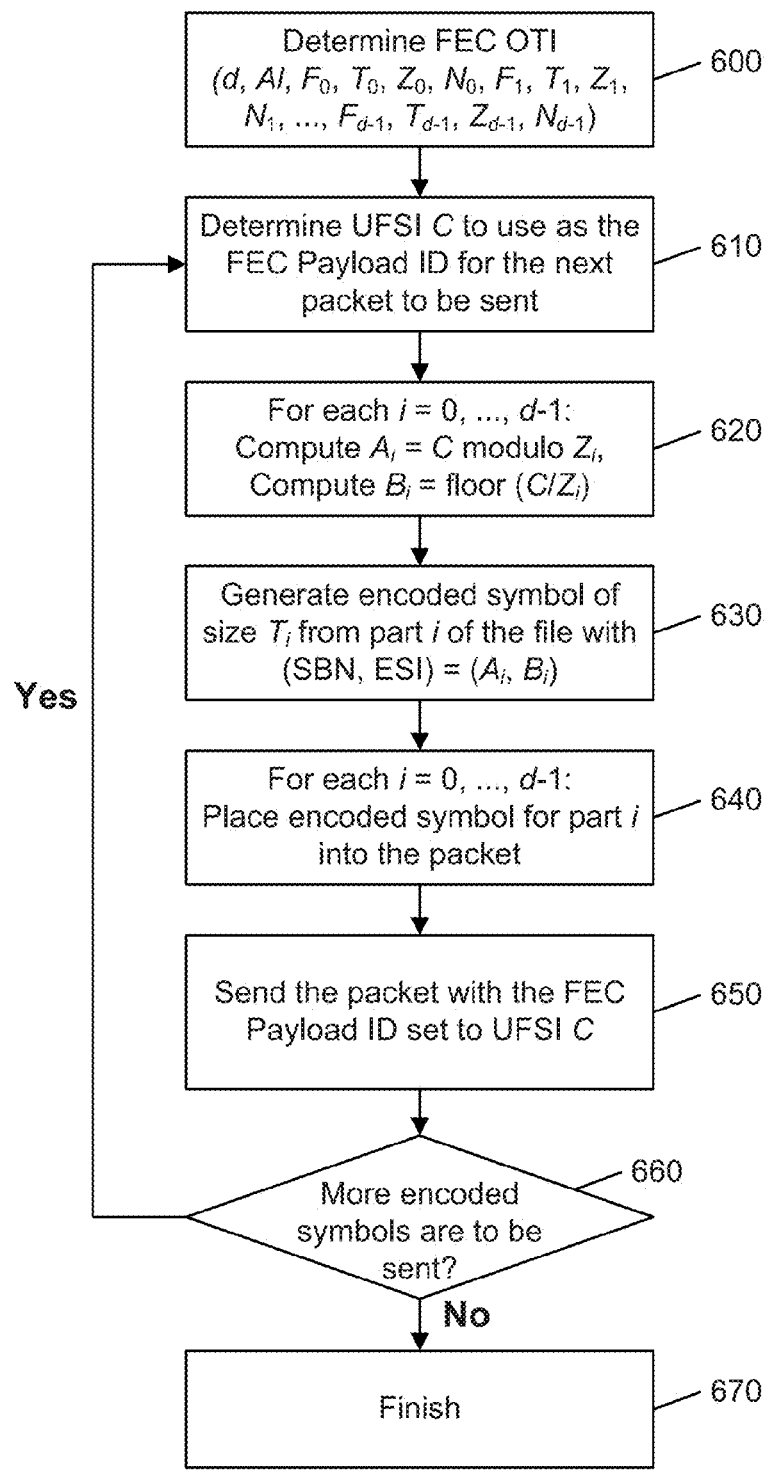
FIG. 6 is a flow chart that illustrates a sender universal file delivery, unequal error protection ("UFD-UEP") method.

As an example, consider the example for which the results are shown in FIG. 6 of [LDPC-Extensions]. In that example, there are two parts to a file of size 1,000 KB that is to be sent in packets, each packet containing a 1 KB symbol: the first part of the file is of size 30 KB and is protected by 100 parity, or repair, packets, and the second part of the file is 970 KB, and overall 1,000 source packets and 1,000 parity packets are sent for the file. The protection provided is far from ideal because of two issues. One issue is that the FEC code that is used, based on [LDPC-RFC-5170], often requires significant reception overhead to recover source block, i.e., more packets are required to be received to recover a file than there are source packets in the file. The second issue is that method essentially sends and protects the first part of the file using a separate set of packets than are used to send and protect the second part of the file. For the second issue, the variance in receiving 30 packets out of the 130 sent for the first part of the file can be large, because the first part of the file is sent over such a small number of packets.

Figure 10:
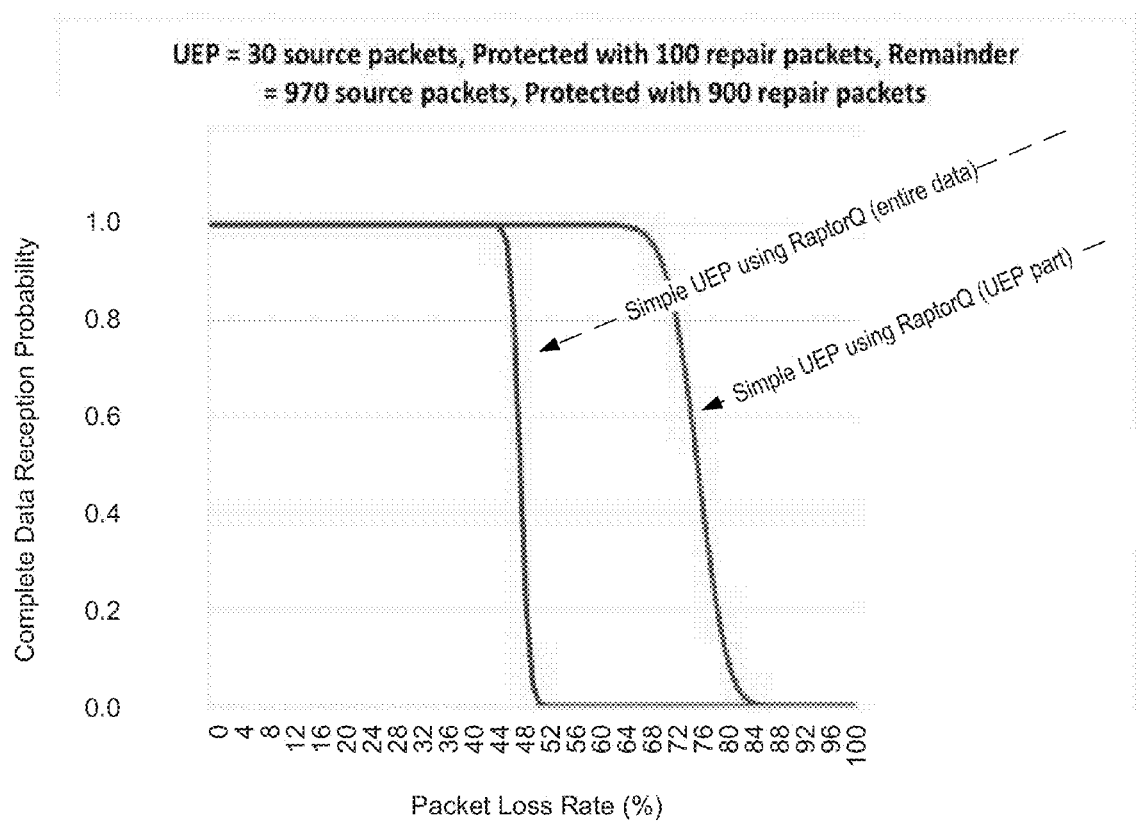
FIG. 10 illustrates the performance of a simple UEP file delivery method using [RaptorQ-Spec].

One can improve on the UEP file delivery method described in [LDPC-Extensions] by an extension, herein called the "simple UEP" file delivery method. The simple UEP file delivery method delivers the parts of a file as separate file deliveries, using existing techniques for file delivery and using different amounts of protection for each part of the file based on its priority, and then the logical connection between the parts of the file can be signaled so that the receiver would know that the delivered files are parts of the same file. For example, the simple UEP file delivery method could use the [RaptorQ-Spec] in the example above to deliver the first 30 KB part of the file by sending a total of 130 packets, each containing an encoded symbol of size 1,024 octets generated from the first part, and then the second 970 KB part of the file could be could delivered as a separate file by sending a total of 1870 packets, each containing an encoded symbol of size 1,024 octets generated from the second part. Thus, a total of 2,000 packets are sent for the two parts of the file sent as separate files. The simple UEP file delivery method is an improvement over the method described in [LDPC-Extensions], because the FEC code itself is not modified, and because, as shown in FIG. 10 herein, the performance of the delivery of the two parts of the file under different packet loss conditions is superior to that shown in FIG. 6 of [LDPC-Extensions].

One possible source of the difference is because the FEC code specified in [RaptorQ-Spec] has superior recovery properties to the FEC code specified in [LDPC-RFC-5170]. However, the simple UEP file delivery method still suffers from the second issue described above.

[PET] and [PET-Patent] provide potentially improved methods for providing a UEP file delivery service, wherein each packet contains a specified amount of encoding data from each part of the file based on its priority. A straightforward incorporation of [PET] would be to include an encoded symbol of the appropriate size for each part of the file in each packet, and then to include a separate FEC Payload ID comprising an (SBN, ESI) pair for each part of the file. However, this method is not advantageous for a few reasons.

For example, there is a separate predetermined number of possible source blocks or number of possible encoded symbols per source block for each part of the file when using an FEC Payload ID comprising an SBN and ESI fields of predetermined sizes for each part. For example, an 8-bit SBN and a 24-bit ESI for each of d parts results in a (32*d)-bit FEC Payload ID that limits the number of possible source blocks per part to 256 and the number of possible encoded symbols per source block to 16,777,216. Furthermore, if the FEC Payload ID size is 32 bits for each of the d parts, then this would mean a total of 32*d bits of FEC Payload IDs for all the parts in each packet, e.g., if d=10 then this is 320 bits, or equivalently 40 octets, just for the FEC Payload ID headers in each packet.

The basic UFD method for file delivery can be extended to provide unequal error protection (UEP) file delivery services, as described in detail below, that provides significant advantages to previous UEP file delivery methods. Herein, these extended methods are referred to as "UFD-UEP" file delivery methods. These UFD-UEP file delivery methods can use some of the methods described in [PET] and [PET-Patent].

An example UFD-UEP file delivery method will now be described in more detail. In such a method, the sender partitions a file of size F into d>1 parts of sizes $F_0, F_1, \ldots, F_{d-1}$, and thus F is equal to the sum over i of $F_i$. The sender partitions the packet size T into d parts of sizes $T_0, T_1, \ldots, T_{d-1}$, and thus T is equal to the sum over i of $T_i$. This partitioning of T is based on $F_0, F_1, \ldots, F_{d-1}$ and the priorities of the corresponding file parts. The ratio $F_i/T_i$ determines how many packets need to be received to recover part i of the file assuming an ideal FEC code is used to protect part i of the file as one source block, and thus the smaller the ratio $F_i/T_i$, the higher the priority of part i of the file. In practice, slightly more than $F_i/T_i$ packets may be needed to recover part i of the file, for example because the FEC code is not perfect and exhibits some reception overhead, or because that part of the file is partitioned into multiple source blocks and the encoded symbols for some source blocks are lost at a higher rate than for other source blocks, or because $F_i/T_i$ is not an integer. As an example of UEP, suppose F=1 MB, T=1,024 octets, d=2, $F_0$=32 KB, $F_1$=F−$F_0$=992 KB, and $T_0$=64 octets, $T_1$=T−$T_0$=960 octets. In this example, $F_0/T_0$=512, and thus ideally reception of 512 packets allows recovery of part 0 of the file, whereas $F_1/T_1$=1,058.13, and thus ideally reception of 1,059 packets allows recovery of part 1 of the file. Thus, in this example, part 0 of the file can be recovered from roughly half as many packets needed to recover part 1 of the file.

Note that in this example, if UEP is not used, i.e., d=1 and thus $F_0$=F=1 MB, and $T_0$=T=1,024 octets, then $F_0/T_0$=1,024 packets are needed to recover the file. Thus, in the UEP example described in the previous paragraph, the recovery of part 1 of the file requires slightly more packets than when UEP is not used, due to the higher priority of part 0 of the file. An analytical study of this fundamental tradeoff can be found in [PET].

There are various ways for the sender UFD-UEP method to generate the partition $T_0, T_1, \ldots, T_{d-1}$ of T based on $F_0, F_1, \ldots, F_{d-1}$ and the priorities of the different file parts. Note that if $T_i$ is chosen so that $F_i/T_i \approx F/T$, then part i of the file is deemed to be of average priority, and the priority of part i would be relatively higher or lower depending on whether $F_i/T_i < F/T$ or $F_i/T_i > F/T$, respectively.

The sender UFD-UEP method for generation of the FEC OTI is now described, with reference to FIG. 6. Given the values of d, $F_0, F_1, \ldots, F_{d-1}, T_0, T_1, \ldots, T_{d-1}$, Al, WS, the FEC OTI can be computed as usual applied to each of the d parts of the file independently using existing methods, for example using the methods described in [RaptorQ-Spec] in Section 4.3, namely that, for each i=0, . . . , d−1, the sender can generate the FEC OTI for file part i that determines how it is to be partitioned into source blocks and sub-blocks using for example the methods described in [RaptorQ-Spec] in Section 4.3, treating $F_i$ as the file size and $T_i$ as the symbol size to be used to carry information for part i in each packet. The sender thus generates the FEC OTI for part i of the file independent of the other parts of the file. This process is shown in Step 600 of FIG. 6 herein.

The sender can also generate the partitioning of part i of the file into source blocks and sub-blocks and the mapping between the (SBN, ESI) of an encoded symbol for part i of the file and how the encoded symbol is generated from part i of the file using existing methods, for example methods described [RaptorQ-Spec] in Section 4.4 and Section 5 therein. These UFD-UEP methods are applied to part i of the file independent of the other parts of the file, and thus different parts of the file may have different source block and sub-block structures, and in particular there may be different numbers of source symbols per source block and different numbers of source blocks between different parts of the file, since the methods are applied independently to each part of the file.

The alignment factor Al is preferably the same for all of the parts of the file, and in particular it is preferable if for each part i the value of $T_i$ is a multiple of Al. Furthermore, if for example, the methods described in Section 4.5 of [RaptorQ-Spec] are used to derive the FEC OTI, it is preferable if the same value of Al and of WS is used when deriving the source block and sub-block structure for each of the parts of the file. The usage of the same value for Al ensures that decoding can occur on memory aligned on multiples of Al octets at the receiver, and the usage of the same value for WS ensures that the maximum block size that needs to be decoded in Random Access Memory (RAM) at the receiver is the same for all parts of the file. There are some applications where using a different value of WS for the different parts of the file are preferred to derive the FEC OTI, for example if it desirable to use less memory to recover the higher priority parts of the file.

There may be applications where usage of different alignment factors for different parts is advantageous. For example, the high priority parts may be decoded by both low-end receivers that have 4-octet aligned memory and high-end receivers that have 8-octet aligned memory, whereas the low priority parts may be decode by only high-end receivers. In this example, it may be advantageous to use Al=4 for the high priority parts so that low-end receivers can efficiently decode these parts, whereas it may be advantageous to use Al=8 for the low priority parts, as the high-end receivers can more efficiently decode these parts with Al=8 than with Al=4.

The corresponding FEC OTI generated by the sender UFD-UEP method specific to file part i comprises $F_i, T_i, Z_i, N_i$, where $Z_i$ is the number of source blocks into which part i of the file is partitioned and $N_i$ is the number of sub-blocks into which each source block of part i of the file is partitioned.

Thus, overall the FEC OTI that the sender UFD-UEP method generates for the file can comprise: $(d, Al, F_0, T_0, Z_0, N_0, F_1, T_1, Z_1, N_1, \ldots, F_{d-1}, T_{d-1}, Z_{d-1}, N_{d-1})$. Other versions of the FEC OTI are also available, e.g., when d is fixed and thus does not need to be explicitly listed in the FEC OTI, or when other methods are used for indicating the source block structure, and the sub-block structure if used.

The sender, using the UFD-UEP method, assembles one encoded symbol for each part of the file to be sent in a packet, and the FEC Payload ID for the packet comprises an UFSI value C. When a packet is to be sent, the sender determines an UFSI value C to be used as the FEC Payload ID for the packet, as shown in Step 610 of FIG. 6. The UFSI values to be used for example can be consecutive, for example UFSI values 0, 1, 2, 3, . . . , etc. For a given UFSI value C, the encoded symbol of size $T_i$ to be placed in the i-th part of the packet in the packet for part i of the file has an SBN $A_i$ and an ESI $B_i$, computed as $A_i$=C modulo $Z_i$, and $B_i$=floor($C/Z_i$), as shown in Step 620 of FIG. 6. For i=0, . . . , d−1, these d encoded symbols are generated for each of the d parts of the packet, and then the UFSI C together with these d encoded symbols of aggregate size T are sent together in the packet, as shown in Steps 630, 640 and 650 of FIG. 6. The sender UFD-UEP method continues to generate and send encoded packets, as shown in the decision made in Step 660 of FIG. 6.

Figure 7:
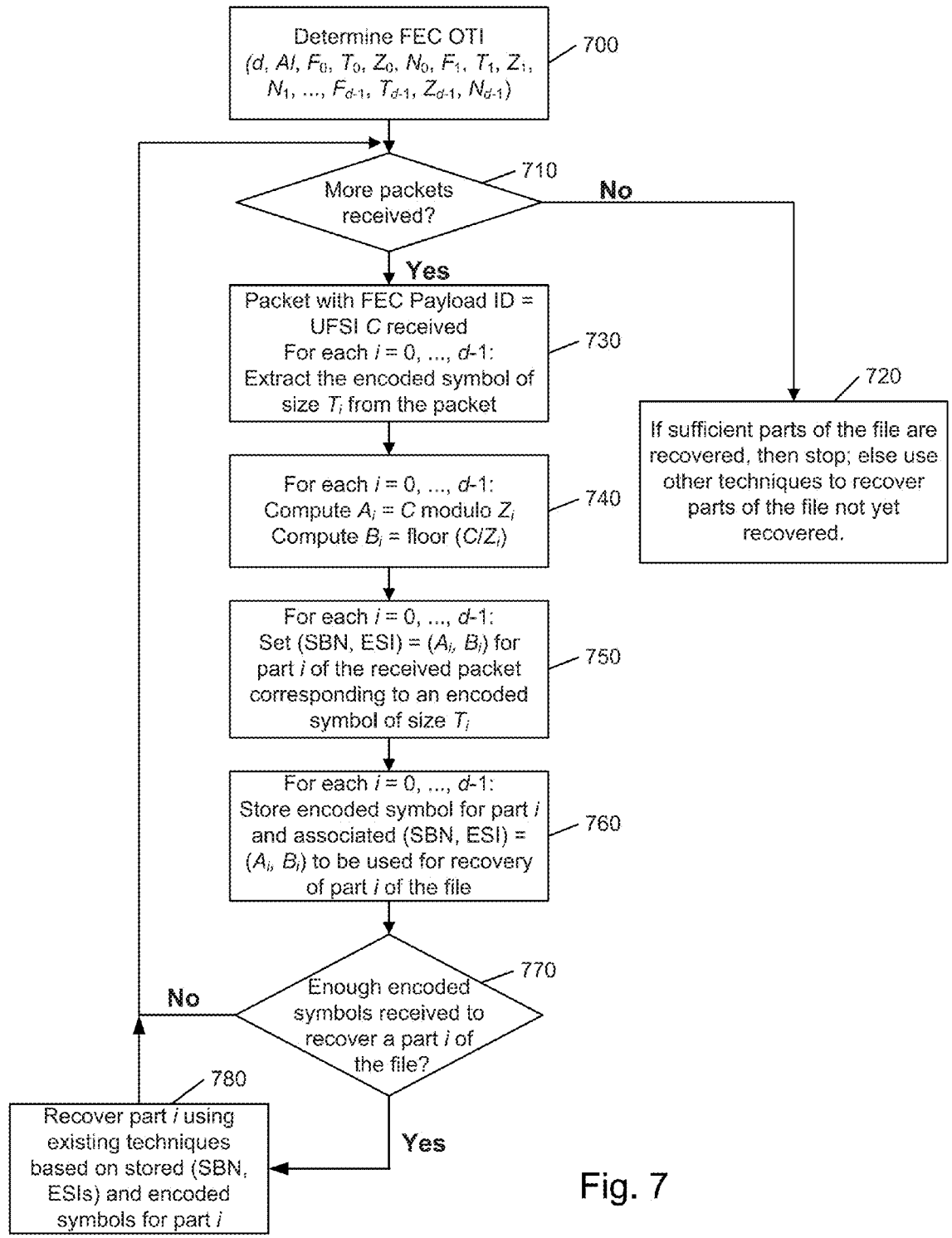
FIG. 7 is a flow chart that illustrates a receiver UFD-UEP method.

The receiver UFD-UEP method is described with reference to FIG. 7. The receiver can use existing techniques to determine the FEC OTI $(d, Al, F_0, T_0, Z_0, N_0, F_1, T_1, Z_1, N_1, \ldots, F_{d-1}, T_{d-1}, Z-1, N_{d-1})$ in the same format as described above as for the sender, as shown in Step 700 of FIG. 7. For example the FEC OTI may be embedded in a FLUTE session description, or the FEC OTI may be encoded into a URL, or the FEC OTI may be obtained via an SDP message. In Step 710, the receiver sees if more packets are received, and it may stay at this step until it either receives another packet, in which case the receiver proceeds to Step 730, or the receiver determines that more packets are not going to be received, in which case the receiver proceeds to Step 720 and either determines that enough parts of the file have been recovered and stops, or else tries to recover additional parts of the file using other means, for example using HTTP requests to a file repair server, or the receiver may wait for another session to receiver more packets at a later time.

When another packet is available, in Step 730 the receiver determines the UFSI C of the received packet and, for each i=0, . . . , d−1, extracts the encoded symbol of size $T_i$ from the packet for each i=0, . . . , d−1. In Step 740, for each i=0, . . . , d−1, the receiver calculates $A_i$=C modulo $Z_i$, and $B_i$=floor($C/Z_i$) based on the number $Z_i$ of source blocks and the UFSI C, and in Step 750 the receiver sets the (SBN, ESI) for the encoded symbol for part i to $(A_i, B_i)$, and in Step 760 the receiver stores the value of the encoded symbol for part i and $(A_i, B_i)$ to be used to recover part i of the file. In Step 770 the receiver determines, for each i=0, . . . , d−1, if there are enough encoded symbols received to recover part i of the file, and if so proceeds to recover part i of the file in Step 780, and if not proceeds to receive more packets in Step 710.

There are many variations of the receiver UFD-UEP method. For example, the sender can send, and thus the receiver can receive, more than one encoded symbol for each part of the file in at least some of the packets, in which case the FEC Payload ID may be set to an UFSI corresponding to the first encoded symbol for each part contained in the packet and additional symbols for each part in the packet may have corresponding UFSI values that are consecutive. For example, if there are three encoded symbols for each part of the file carried in the packet and the first symbol for each part corresponds to UFSI=4,234, then the other two encoded symbols for each part can correspond to UFSIs 4,235 and 4,235, respectively, and the UFSI carried in the packet might be UFSI=4,234.

As examples of other alternatives, the receiver may predetermine how many encoded symbols to receive before attempting recovery, or may calculate packet loss statistics during the session and decide based on this which parts of the file to attempt to recover. As another example, the receiver may do some processing that is specific to the FEC code used to determine if enough encoded symbols have been received to recover each part of the file. As another example, the UFSI values may be used directly without an intermediate step of generating the (SBN, ESI) values in the recovery process for each file part. As another example, recovery of parts of the file may happen concurrently with reception of encoded symbols.

As another example, other forms of FEC OTI information may be used. For example, a base UFSI $BU_i$ may be specified in the FEC OTI for the part i independently of the other parts, that can be used as follows: the UFSI to be used by the FEC sender and receiver for an encoded symbol for part i contained in a packet is $U+BU_i$, where U is the UFSI carried in the packet carrying the encoded symbol. Thus, for example, if a packet carries U=1,045, and the base UFSI in the FEC OTI for part i is $BU_i$=2,000,000, then the encoded symbol UFSI is 2,001,045.

Usage of the base UFSI has several advantages. For example, in the case where only repair symbols are to be transmitted for the different parts (for reasons that are described later), it can be advantageous to set $BU_i=KT_i$, where $KT_i$ is the number of file symbols in part i. In this case, the sequence of UFSIs in the sent packet sequence can be 0, 1, 2, 3, etc., and nevertheless for each part only repair symbols generated from that part will be sent in packets.

This paragraph describes another example advantage of usage of the base UFSI. The protocol suite described in [FLUTE], [ALC], [LCT], [FEC BB] associates a Transmission Object Identifier, also called a TOI, with the FEC OTI of a file or object to be transported. It is possible that encoded symbols for the same parts may be sent at different times or in different sessions and may be associated with different TOIs. Also, it is advantageous to be able to send encoded packets starting with the UFSI=0 for the packets associated with each different TOI. By having the ability to specify a base UFSI as part of the FEC OTI independently for each part, a different base UFSI for each part can be associated with each TOI for which encoded symbols are to be sent for the file without sending duplicate encoded symbols for the different TOIs. For example, encoded symbols for the same part may be sent in packets associated with TOI=1 and associated with TOI=2, wherein the base UFSI for the part associated with TOI=1 is set to 0, and wherein the base UFSI for the same part associated with TOI=2 is set to 1,000,000. Then, the encoded packets for both TOI=1 and TOI=2 can contain the sequence of UFSIs 0, 1, 2, etc., and there will be no duplicate encoded symbols for the part sent amongst the encoded symbols sent associated with the two TOIs as long as less than 1,000,000 encoded symbols are sent for the part with TOI=1. It may also be advantageous to have a base UFSI that is to be used by all of the parts in the FEC OTI, instead of specifying a different base UFSI for each part, as this can reduce the number of octets needed to convey the FEC OTI while at the same time sharing many of the advantages of specifying a separate base UFSI for each part in the FEC OTI, especially when the FEC code used in conjunction with this method is a information additive FEC code such as described for example in Luby I, since in this case the valid range of UFSIs for all the parts can be very large.

Combining the UFD-UEP method with the techniques described in [RaptorQ-Spec] for determining the source block and sub-block structure provides many advantages. In particular, all of the advantages of the basic UFD method also hold for the UFD-UEP method. For example, what previous methods called source symbols that were identified by a combination of a SBN and ESI for purposes of transmitting one of the UEP parts of the file can be viewed as file symbols for that part that are identified by a UFSI when using the UFD-UEP method. Note that $KT_i = \text{ceil}(F_i/T_i)$ is the total number of file symbols in part i of the file. When the source block structure and sub-blocking structure is determined for each part of the file as for example described in [RaptorQ-Spec], and the UFD-UEP method described above is used to convert the identification of a symbol for a part of the file from (SBN, ESI) format to and from UFSI format, the range of UFSIs for the file symbols are $0, 1, 2, \ldots, KT_i$, and any repair symbols generated from the file will have UFSIs in the range $KT_i+1$, $KT_i+2$, etc. This property allows the determination of whether a symbol is part of the original part i of the file or is a repair symbol generated from part i of the file by simply comparing its UFSI to the value of $KT_i$. This can be useful for example to allow receivers that do not support FEC decoding to determine which parts of a packet contain parts of the original file (and their position within the file) and which parts of a packet contain repair symbols that can be ignored, based on the UFSI value carried in packets, and on the values $T_i$ and $KT_i$ for each part i of the file.

FIG. 8 illustrates an example, where in this case the file comprises two parts. The first part is partitioned into 5 source blocks, wherein the first 3 of these source blocks have 6 source symbols each and the remaining 2 source blocks have 5 source symbols each, wherein each of these symbols is of size for example 48 octets, and thus the first part is 28*48=1,344 octets in size. The second part is partitioned into 4 source blocks, wherein the first 3 of these source blocks have 4 source symbols each and the remaining 1 source block has 3 source symbols, wherein each of these symbols is of size for example 256 octets, and thus the second part is 15*256=3,840 octets in size.

FIG. 9 shows a possible packetization for the file structure illustrated in FIG. 8. In this example, each packet comprises the UFSI C, a first encoded symbol of size 48 octets generated from the first part of the file structure shown in FIG. 8 based on C as described previously with reference to FIG. 6, and a second encoded symbol of 256 octets generated from the second part of the file structure shown in FIG. 8 based on C as described previously with reference to FIG. 6. The unshaded portions of the packets carry source symbols of the corresponding part of the file, whereas shaded portions carry repair symbols generated from the corresponding part of the file. In this example, the minimal number of packets needed to recover the first part of the file is 28, whereas the minimal number of packets needed to recover the second part of the file is 15.

FIG. 9 depicts 28 packets with UFSIs $0, \ldots, 27$, and thus all of the encoded symbols for the first part of the file carried in these packets are source symbols. Any additional packets generated with UFSI values at least 28 will carry repair symbols for the first part of the file.

Another advantage of the UFD-UEP method is that if the encoded symbols are sent in the order defined by their UFSI, i.e., in the UFSI order $0, 1, 2, 3, 4, \ldots$, then the encoded symbols for the source blocks of part i of the file are sent in interleaved order, i.e., the $Z_i$ encoded symbols with ESI 0 from each of the $Z_i$ source blocks are sent first, followed by the $Z_i$ encoded symbols with ESI 1 from each of the $Z_i$ source blocks, etc. This property is true for all the parts of the file, even though each part has an independent source block structure. For most transmissions, this simple sending order is sufficient and preferred. However, in the case that packet loss experiences some periodicity that might be synchronized with the number of source blocks $Z_i$, a potentially better sending order is to randomly permute each set of Z UFSI-consecutive encoded symbols before sending them, where Z is the maximum value of $Z_i$ for all $i=0, \ldots, d-1$, i.e., the first Z encoded symbols with UFSIs $0, \ldots, Z-1$ are sent in random permuted order, and then the next Z encoded symbols with UFSIs $Z, \ldots, 2*Z-1$ are sent in random permuted order, etc. Another potential sending order is to randomly permute all of the encoded symbols to be sent before sending them.

Using the UFD-UEP method provides many additional advantages over previous methods or simple extensions of previous methods. For example, the UFD-UEP method using the FEC Payload ID field comprising the UFSI field, the total number of possible encoded symbols for each part of the file is only limited by the size of the UFSI field, and is independent of the source block structure of each part of the file. Furthermore, the usage of the UFSI field provides a universal and succinct FEC Payload ID that allows the concurrent identification of symbols of generated from completely different source block structures for each part of the file. For example, when using a 32-bit UFSI resulting in a 32-bit FEC Payload ID, the total number of encoded symbols that can be generated for a file is 4,294,967,296, independent of how many source blocks into which the file is partitioned, and independent of the sub-block structure of the file if sub-blocking is used, for each part of the file. Thus, if a symbol for the first part of the file is 256 octets in size and a symbol for the second part of the file is 1,024 octets in size, then in this example the first part of the file is 1 GB in size and the second part of the file is 4 GB in size, then the number of encoded symbols could be 1,024 times the number of source symbols for each file part, independent of whether each file part is partitioned into one source block, 16,384 source blocks, or 4,194,304 source blocks.

Figure 11:
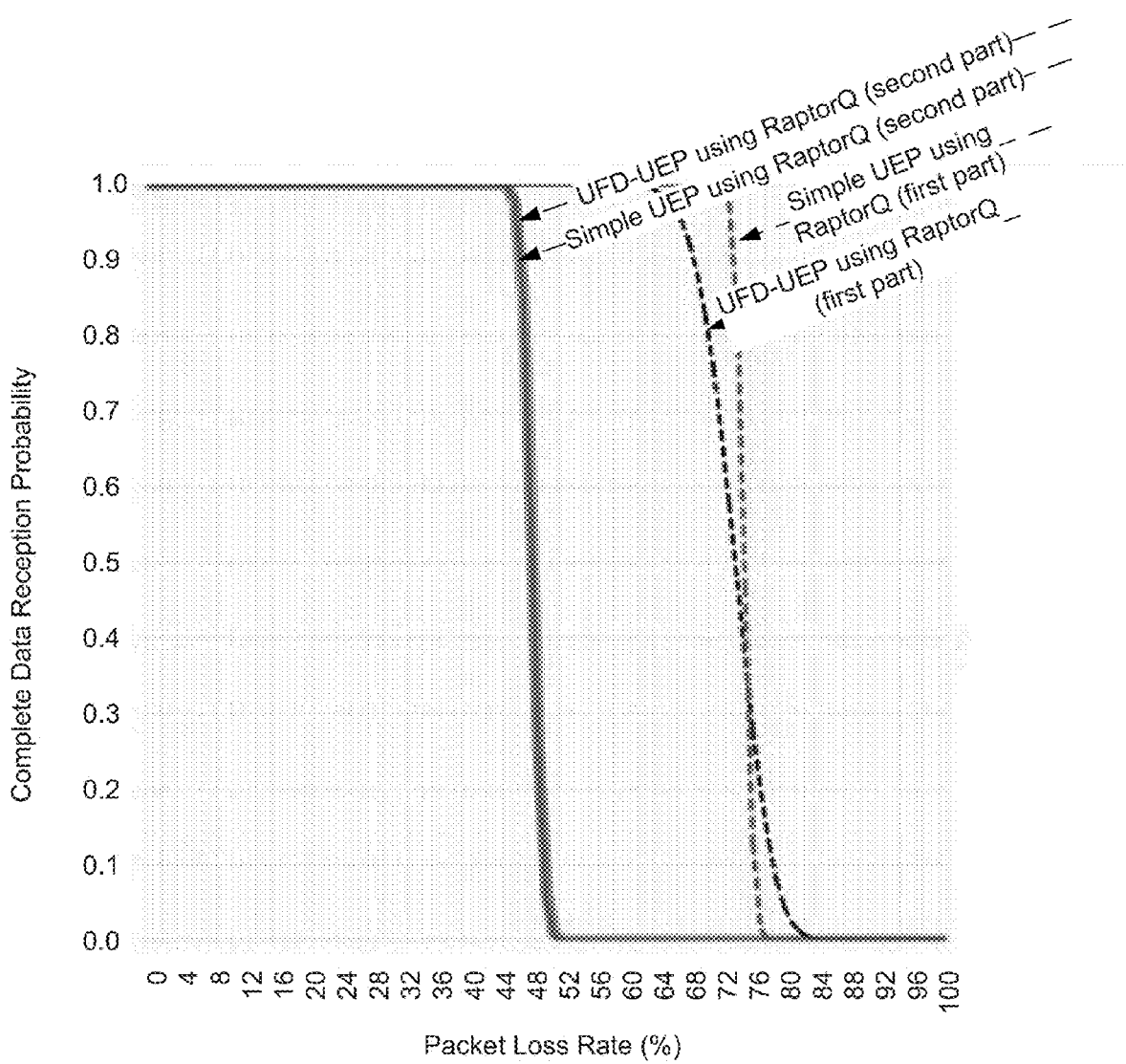
FIG. 11 illustrates an example performance comparison between a simple UEP file delivery method and a UFD-UEP file delivery method, both using [RaptorQ-Spec].

An example of improvements that a UFD-UEP file delivery method provides over a simple UEP file delivery method is shown in FIG. 11. In this example, a file of 1 MB is partitioned into a first part of 32 KB and a second part of 992 KB. For both methods, the FEC codes specified in [RaptorQ-Spec] are used, the size within each packet to carry encoded symbols is 1,024 octets, and a total of 2,048 packets are transmitted.

For the simple UEP file delivery method example shown in FIG. 11, the first part of the file and the second part of the file are processed and delivered independently, where in both cases exactly one encoded symbol of size 1,024 octets is carried in each packet. The source for the first part of the file is carried in 32 packets, and a total of 128 packets are sent containing encoded symbols. The source for the second part of the file is carried in 992 packets, and a total of 1,920 packets are sent containing encoded symbols.

For the UFD-UEP file delivery method example shown in FIG. 11, the first part of the file and the second part of the file are processed and delivered in a combined way, i.e., each packet sent contains an encoded symbol for each of the two parts, where for the first part the size of the encoded symbol is 64 octets and for the second part the size of the encoded symbol is 960 octets. The source for the first part of the file is carried in 512 packets, and all 2,048 packets contain an encoded symbol for the first part. The source for the second part of the file is carried in 1059 packets (the encoded symbol in the last packet of the source an encoded symbol for the second part that is padded out with zeroes to the full symbol size of 992 octets), and all 2,048 packets contain an encoded symbol for the second part.

As can be seen in FIG. 11, the recovery performance of the simple UEP file delivery method and the UFD-UEP file delivery method are practically identical for the second part of the file as a function of the packet loss rate, i.e., in both cases the second part of the file is recovered fairly consistently up to a packet loss rate that is approaching 48%. On the other hand, the recovery performance of the UFD-UEP file delivery method is significantly better than that of the simple UEP file delivery method for the first part of the file: the simple UEP file delivery method can consistently recover the first part of the file for packet loss rates less than 65%, whereas the UFD-UEP file delivery method can consistently recover the first part of the file for packet loss rates approaching 75%.

A Universal File Delivery Method and System For Bundled File Delivery Services

Most previous file delivery methods do not support bundled file delivery, i.e., the delivery of multiple files as a single bundled file. A straightforward method of delivering several files is to deliver each file independently. However, this straightforward method has some drawbacks. For example, the protection provided is far from ideal if the files are small, because there can be large variance in packet loss statistics if the number of packets containing encoded symbols for each file is small.

Figure 12:
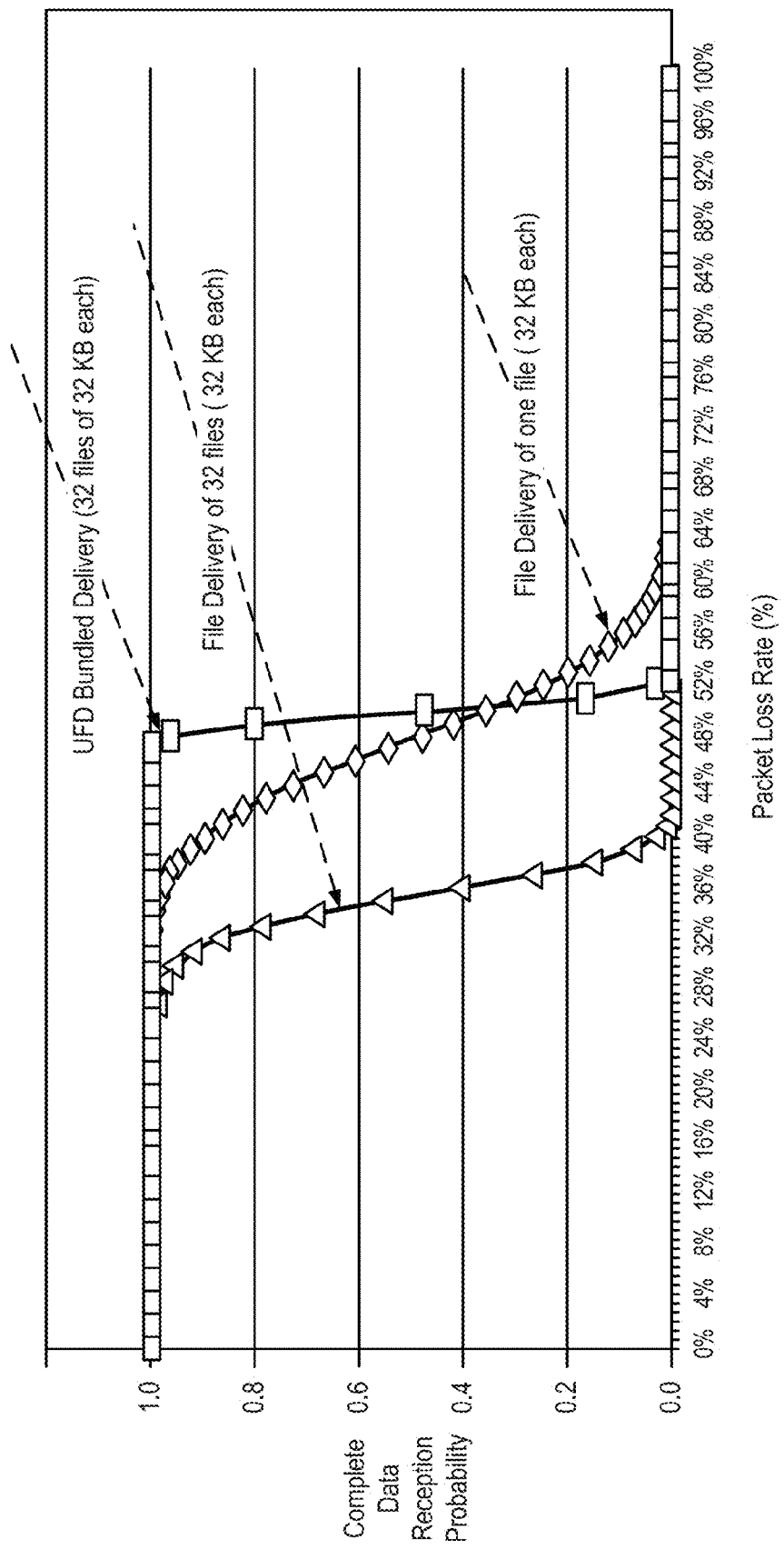
FIG. 12 illustrates an example performance comparison between file delivery of one file, file delivery of multiple files, and a UFD-bundled file delivery method, all using [RaptorQ-Spec].

FIG. 12 illustrates this issue. In FIG. 12, the reliability of the file delivery of a 32 KB file is shown as a function of the percent of packet loss in the network during the delivery. In this file delivery example, symbols are of size 1,024, and the 32 source symbols of the file are encoded into 64 encoded symbols using the FEC codes specified in [RaptorQ-Spec], and each encoded symbol is sent in a separate packet. As can be seen in FIG. 12, the percent of loss under which reliable delivery of the file can be achieved is far less than 50% due to this variance.

Furthermore, if many small files are encoded and transmitted independently, then the percent of packet loss under which all the files are reliably received is even less. FIG. 12 shows this behavior for the delivery of 32 files, each of size 32 KB, where the encoding and transmission of each file is performed independently of the other files using the same parameters as described in the previous paragraph. As can be seen, the delivery of all 32 files can only be reliably achieved when the packet loss is below around 25%, which is far less than 50%.

The UFD-UEP file delivery method can be extended as follows to provide a UFD-bundled file delivery method. The UFD-bundled file delivery method can use the same methods as the UFD-UEP file delivery method, but instead of signaling the delivery of d parts of the same file, instead signal that each part is a separate file and that d files are being delivered as a bundle. Suppose the sender wants to provide the bundled delivery of d files of sizes $F_0, F_1, \ldots, F_{d-1}$, respectively. The sender UFD-bundled method partitions the packet size T into d parts of sizes $T_0, T_1, \ldots, T_{d-1}$, and thus T is equal to the sum over i of $T_i$. This partitioning of T is based on $F_0, F_1, \ldots, F_{d-1}$ and the priorities of the corresponding files.

The ratio $F_i/T_i$ determines how many packets need to be received to recover file i assuming an ideal FEC code is used to protect part i of the file as one source block, and thus the smaller the ratio $F_i/T_i$ the higher the priority of part i of the file. In practice, slightly more than $F_i/T_i$ packets may be needed to recover part i of the file, for example because the FEC code is not perfect and exhibits some reception overhead, or because that part of the file is partitioned into multiple source blocks and the encoded symbols for some source blocks are lost at a higher rate than for other source blocks, or because $F_i/T_i$ is not an integer. If the priority of all the files to be delivered is desired to be the same, then $T_i$ is set so that $F_i/T_i \approx F/T$. Many details of the UFD-bundled file delivery method, for both the sender and receiver, are almost identical to the UFD-UEP file delivery method and are thus omitted.

The UFD-bundled file delivery method can be extended to simultaneously provide both bundled file delivery and UEP file delivery, i.e., the priority of each file in the bundle may be set differently. Furthermore, the UFD-bundled file delivery method can support both delivery of prioritized delivery of multiple files and prioritized delivery of parts of a file, with the proper signaling. For example, if three objects are to be encoded and sent using UFD-bundled file delivery methods, then the first two objects might be different parts of the same file with different priorities, and the third object may be a different file with yet a different priority. The receiver can decide, based on many factors, which of the bundled files and or file parts it is interested in recovering, and recover only those files or parts of files independently of the other files or parts of files. As one skilled in the art will recognize, upon reading this disclosure, there are many possible alternative versions of the UFD-bundled file delivery methods.

As a simple example of UFD-bundled file delivery, suppose that a bundle of 32 files are to be delivered, each file of size 32 KB, where each file has the same priority. Suppose that T=1,024 octets. In this case, for each i=0, . . . , 31, the value of $T_i$=32 octets. Each packet will contain a 32-octet encoded symbol for each of the 32 files, and the UFSI that identifies the 32 encoded symbols in the packet. In this example, there will be 1,024 packets that contain source symbols from each of the 32 equal-size files, and these are the packets with UFSIs in the range 0 through 1,023. Suppose in this example that 1,024 additional repair symbols are generated for each file and sent in an additional 1,024 packets with UFSIs in the range 1,024 through 2,047.

FIG. 12 illustrates the recovery properties of this UFD-bundled file delivery example as a function of packet loss. In this example, all 32 files can be reliably recovered using the UFD-bundled file delivery method for packet loss rates approaching 50%, which is a substantial improvement over the approximately 25% packet loss rate that allows reliably delivery of all 32 files using separate encoding and sending of each file.

Methods For Native HTTP Support of Unicast Repair Requests

A file or file part may be organized into and made available as an "HTTP file" with an associated URL that can be used by standard HTTP web cache servers to store and provide access to the file or file parts by receivers. The file or file part in its original order made available as an HTTP file is herein called an "Original-order HTTP file". Generally, a method for native HTTP support of unicast repair requests can translate repair requests for symbols and sub-symbols of source blocks of the HTTP file, based on SBNs and ESIs, into standard HTTP octet range requests within the HTTP file (often called HTTP partial GET requests with a specified byte range). This allows standard HTTP web cache servers to be able to service these repair requests, avoiding the need to massively deploy specialized HTTP web cache servers that understand how an HTTP file is partitioned into source blocks and source symbols within a source block.

In such scenarios, when a systematic FEC code is in use, it is often advantageous to only send repair symbols in some of the sessions, e.g., the broadcast/multicast sessions, as this allows the receivers to request only source symbols in a unicast repair requests. This has the advantage of only requiring the HTTP file, or a simple reordering transformation of the HTTP file as described in greater detail below, to be provided to the unicast repair servers, which can be standard HTTP web cache servers, making the logistics of defining the HTTP file and distributing the HTTP file simpler, since these logistics are independent of FEC encoding. Another advantage is that, if no source symbols are sent in the sessions, the receiver can request any sequence of source symbols in the unicast repair requests, since all of the source symbols are "missing", which can be preferably since this allows repair requests for consecutive sequence of source symbols. For example, suppose an FEC code with perfect recovery properties is used and a source block of a part comprises 1,000 source symbols, and 700 repair symbols are received for the source block (even though some of the repair symbols may be lost in transmission, and thus the pattern of ESIs of received repair symbols may be far from consecutive). Then, the receiver can request the first 300 consecutive source symbols for the source block in the unicast repair requests, and combine these source symbols with the 700 repair symbols to recover the source block. If the source symbols are consecutive in the HTTP file, then a single HTTP octet range request can be used to request and receive all 300 consecutive source symbols. The receiver doesn't necessarily need to make a prefix request (i.e., a request for a set number of bytes of a file that starts with the first byte), but in some cases, that is simpler.

The request is for a specific number of bytes or symbols. In some cases, the receiver will determine the number of source symbols to request based on the number of repair symbols received and the number of source symbols anticipated to be contained in the files or objects to be received. In other cases, the receiver might perform a scheduling operation, wherein the receiver determines how to decode using only the repair symbols it has already received, and thus can note a more specific number of source symbols needed. For example, it might be that some of the repair symbols are redundant of other repair symbols, in which case more source symbols might be required. In other instances, it might turn out that fewer source symbols are needed.

The receiver can translate requests for source symbols of an Original-order HTTP file corresponding to particular (SBN, ESI) pairs into HTTP octet range requests based on the FEC OTI. For example, suppose the FEC OTI for a file is (F, Al, T, Z, N), and the SBN for a source symbol to be requested is A and the ESI for the source symbol is B, and suppose for sake of simplicity that N=1, i.e., that source blocks are not further partitioned into sub-blocks in this example of a file structure. Then, the receiver can apply for example the methods described in Section 4.4 of [RaptorQ-Spec] to determine (KL, KS, ZL, ZS), where the first ZL source blocks have KL source symbols and the remaining ZS source blocks have KS source symbols. Then, based on A, B, and the symbol size T, the receiver can determine that the start octet index of the source symbol within the file is as shown in Equation 1, wherein the end octet index of the source symbol within the file is EI=SI+T. Then, the receiver can use a standard HTTP octet range request for the source symbol.

$$SI = T*(KL*\min\{A,ZL\} + KS*\max\{A-ZL,0\} + B) \quad \text{(Eqn. 1)}$$

There are many extensions and improvements to these methods, as one skilled in the art will recognize. For example, a single HTTP octet range request may be made if multiple consecutive source symbols are requested from the Original-order HTTP file if sub-blocking is not used. As another example, the HTTP web cache servers may have files containing repair symbols, in addition to or instead of the Original-order HTTP file, or the Original-order HTTP file may already have been extended to contain repair symbols, and the receiver can use similar methods to those described herein to make HTTP octet range requests for repair symbols. As another example of an enhancement, these methods can be extended to handle the case when sub-blocking is used, using similar methods as will be recognized by those skilled in the art. For example, the receiver can use the methods described in Section 4.4 of [RaptorQ-Spec] to determine (TL, TS, NL, NS), where the first NL sub-blocks of a source block are of size TL*Al and the remaining NS sub-blocks of a source block are of size TS*Al. Then, based on A, B, and the symbol size T, the receiver can determine that the start and end octet index of the N sub-symbols symbol within the file that correspond to a source symbol, and make the requests for these octets using standard HTTP octet range requests.

As another example, the receiver can translate requests for source symbols of a file or file part corresponding to particular UFSIs into HTTP octet range requests based on the FEC OTI.

The following methods can greatly enhance the efficiency of using standard HTTP byte range requests by the receiver to recover symbols of an HTTP file, while at the same time using standard HTTP web caching servers to deliver the requested octet range requests to receivers.

A straightforward method to support the HTTP octet range requests as described is to use the Original-order HTTP file. This method has the advantage that no transformation of the original file or file part is needed to generate the Original-order HTTP file for the HTTP web cache servers, but it has the disadvantage that many different HTTP octet range requests might be needed to request source symbols, even when only consecutive source symbols are requested for each source block. There are at least two reasons for this: (1) there might be multiple source blocks, and missing source symbols from each source block, in which case separate octet range requests might be required for each source block; (2) there might be multiple sub-blocks per source block, and thus even to request a single source symbol from one source block might require multiple HTTP octet range requests for the multiple sub-symbols comprising a source symbol, since the sub-symbols for a source symbol may not be consecutive in the Original-order HTTP file.

An advantageous method to support the HTTP octet range requests described above first reorganizes the file or file part into a new format, herein called the "UFSI-order HTTP file", based on the FEC OTI for the original file or file part. This method is useful when there are multiple source blocks and/or multiple sub-blocks per source block. The order of the data in the UFSI-order HTTP file is in order of the file symbol with UFSI 0, the file symbol with UFSI 1, the file symbol with UFSI 2, etc., i.e., the order of the data in the UFSI-order HTTP file is organized into file symbols ordered according to increasing consecutive UFSIs, as determined by the FEC OTI. A URL can be associated with the UFSI-order HTTP file, and the URL can be provided to the HTTP web caching system. The receiver can then use HTTP octet range requests to request portions of the UFSI-order HTTP file as needed. One advantage of the UFSI-order HTTP file is that, if the receiver receives approximately the same number of repair symbols from each of the source blocks then the number of HTTP octet range requests needed to obtain enough source symbols to recover the original file or file part can be minimal, e.g., one HTTP octet range request may be sufficient if exactly the same number of repair symbols is received for each source block. For example, a request for the first L*T*Z consecutive octets of the UFSI-order HTTP file is sufficient to receive the first L source symbols of size T from each of the Z source blocks of the original file or file part. If K-L repair symbols are received in one or more sessions for each of the Z source symbols and if the FEC code has ideal recovery properties then the L*T*Z octets received from the HTTP octet range request is sufficient to FEC decode the HTTP file, where in this example it is presumed that K is the number of source symbols in each of the Z source blocks.

Another advantageous method to support the HTTP octet range requests described above first reorganizes the file or file part into a different new format, herein called the "SS-order HTTP file", based on the FEC OTI for the original file or file part. This method is useful when there are multiple sub-blocks per source block, as in this case each source symbol may not be a consecutive portion of the original file or file part, i.e., the sub-symbols of a source symbol can be scattered throughout the source block in the original file ordering. The order of the data in the SS-order HTTP file is in order of all the source symbols of the first source block, followed by all the source symbols of the second source block, followed by all the source symbols of the third source block, etc., i.e., the order the data in the SS-order HTTP file is organized into source symbols ordered according to increasing consecutive ESI order within a source block, and is the concatenation of the source blocks in increasing consecutive SBN order, as determined by the FEC OTI. A URL can be associated with the SS-order HTTP file, and the URL can be provided to the HTTP web caching system. The receiver can then use HTTP octet range requests to request portions of the SS-order HTTP file as needed. The SS-order HTTP file is especially advantageous if the receiver receives different numbers of repair symbols from each of the source blocks. For example, if there are two source blocks of 1,000 source symbols each, and if the receiver receives 900 repair symbols for the first source block and 100 repair symbols for the second source block from one or more sessions, then the receiver can make one request for the first T*100 octets of the SS-order HTTP file and receive 100 source symbols for the first source block, and the receiver can make another request for octets T*1,000+1 through T*1,900 of the SS-order HTTP file and receive 900 source symbols for the second source block, wherein in this example T is the symbol size in octets for both source blocks.

A combination of both of the methods just described might also be used, i.e., both the UFSI-order HTTP file and the SS-order HTTP file might be made available through different URLs to receivers, and then a receiver might use a combination of HTTP octet requests to the two differently formatted HTTP files. For example, if there are 10 source blocks with 1,000 source symbols each, and if 800 repair symbols are received for each of the first 8 source blocks, 820 repair symbols are received for the $9^{th}$ source block, and 500 repair symbols are received for the $10^{th}$ source block in one or more sessions, then the receiver might make an HTTP octet range requests to the UFSI-order HTTP file to receive 200 source symbols for each of the 10 source blocks, and an additional HTTP octet range request to the SS-order HTTP file to receive an additional 300 source symbols for the $10^{th}$ source block. In this example, the receiver may receive an unneeded 20 source symbols for the $9^{th}$ source block (assuming an FEC code with ideal recovery properties), but in some cases requesting more than the minimum needed octets for some source blocks using a smaller number of HTTP octet range requests may be more efficient than requesting exactly the needed number of source symbols for each source block, which may require a much larger number of different HTTP octet range requests.

As one skilled in the art will recognize, there are many variations on these methods. For example, the HTTP file, the UFSI-order HTTP file and the SS-order HTTP file could all be made available for requests. As another example, the SS-order HTTP file may be split up and made available as a multitude of HTTP files, one such HTTP file for each source block. As other example of variants, methods and protocols other than those based on HTTP might be used, such as methods based on RTP/UDP, or proprietary protocols built on top of UDP, might be used.

Hardware Systems and Examples

The methods and systems described above can be implemented in hardware, software and/or appropriately organized computer-readable media containing program code or other instructions. Some examples of systems that might use the above teachings are provided herein.

Figure 13:
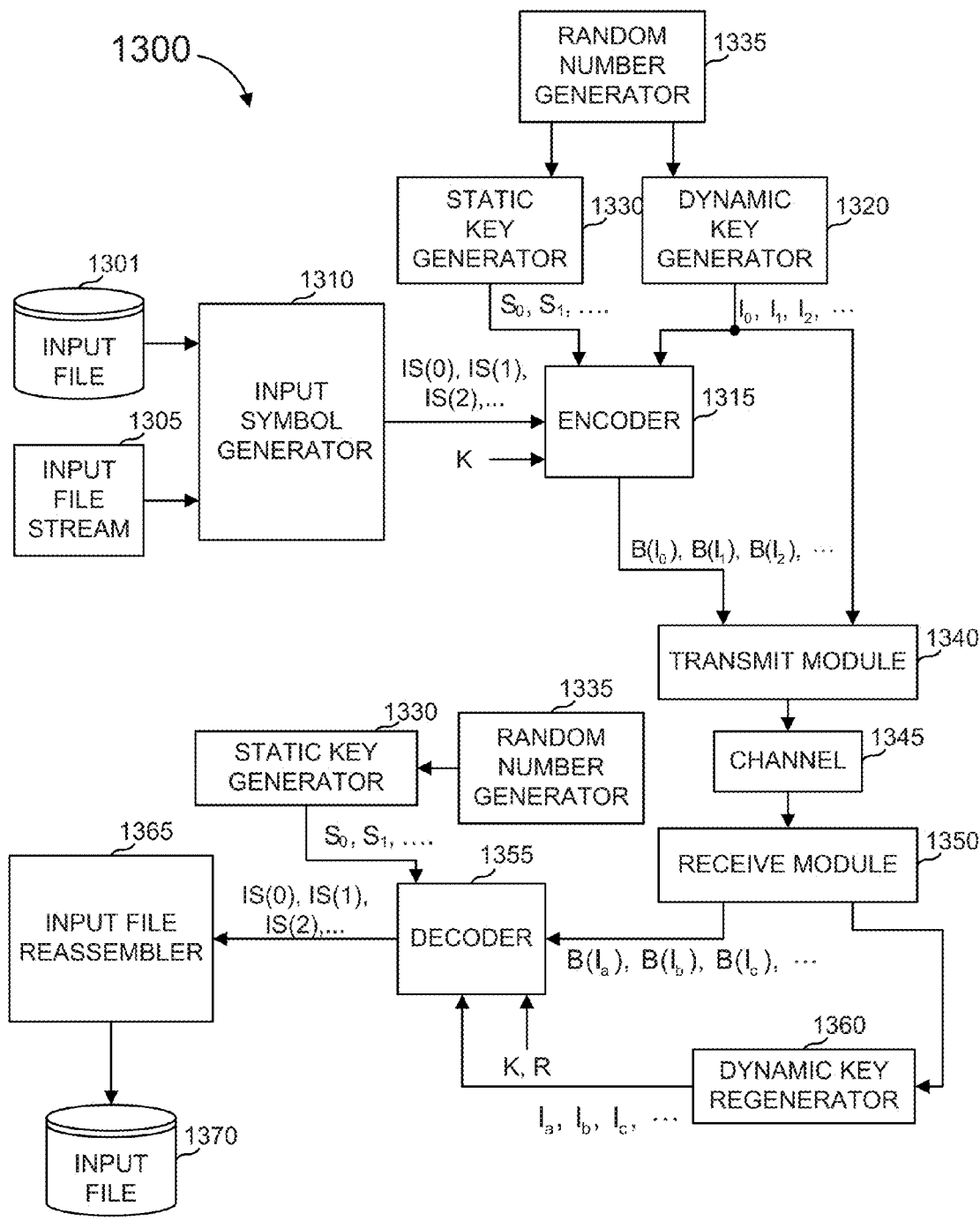
FIG. 13 is a block diagram of a communications system that might be used for generating, sending and receiving Raptor, RaptorQ or other packets as part of a file delivery.

FIG. 13 is a block diagram of a communications system 1300 that uses multi-stage coding as might be used to send packets as part of a file delivery system as described herein. Of course, other codes and/or hardware might be used instead.

In communications system 1300, an input file 1301, or an input stream 1305, is provided to an input symbol generator 1310. Input symbol generator 1310 generates a sequence of one or more input symbols (IS(0), IS(1), IS(2), ...) from the input file or stream, with each input symbol having a value and a position (denoted in FIG. 13 as a parenthesized integer). As explained above, the possible values for input symbols, i.e., its alphabet, is typically an alphabet of $2^M$ symbols, so that each input symbol codes for M bits of the input file. The value of M is generally determined by the use of communication system 1300, but a general purpose system might include a symbol size input for input symbol generator 1310 so that M can be varied from use to use. The output of input symbol generator 1310 is provided to an encoder 1315.

Static key generator 1330 produces a stream of static keys $S_0, S_1, \ldots$. The number of the static keys generated is generally limited and depends on the specific embodiment of encoder 1315. The generation of static keys will be subsequently described in more detail. Dynamic key generator 1320 generates a dynamic key for each output symbol to be generated by the encoder 1315. Each dynamic key is generated so that a large fraction of the dynamic keys for the same input file are unique. For example, Luby I describes embodiments of key generators that can be used. The outputs of dynamic key generator 1320 and the static key generator 1330 are provided to encoder 1315.

From each key I provided by dynamic key generator 1320, encoder 1315 generates an output symbol, with a value B(I), from the input symbols provided by the input symbol generator. The operation of encoder 1315 will be described in more detail below. The value of each output symbol is generated based on its key, on some function of one or more of the input symbols, and possibly one or more redundant symbols that had been computed from the input symbols. The collection of input symbols and redundant symbols that give rise to a specific output symbol is referred to herein as the output symbol's "associated symbols" or just its "associates". The selection of the function (the "value function") and the associates is done according to a process described in more detail below. Typically, but not always, M is the same for input symbols and output symbols, i.e., they both code for the same number of bits.

In some embodiments, the number K of input symbols is used by the encoder 1315 to select the associates. If K is not known in advance, such as where the input is a streaming file, K can be just an estimate. The value K might also be used by encoder 1315 to allocate storage for input symbols and any intermediate symbols generated by encoder 1315.

Encoder 1315 provides output symbols to a transmit module 1340. Transmit module 1340 is also provided the key of each such output symbol from the dynamic key generator 1320. Transmit module 1340 transmits the output symbols, and depending on the keying method used, transmit module 1340 might also transmit some data about the keys of the transmitted output symbols, over a channel 1345 to a receive module 1350. Channel 1345 is assumed to be an erasure channel, but that is not a requirement for proper operation of communication system 1300.

Modules 1340, 1345 and 1350 can be any suitable hardware components, software components, physical media, or any combination thereof, so long as transmit module 1340 is adapted to transmit output symbols and any needed data about their keys to channel 1345 and receive module 1350 is adapted to receive symbols and potentially some data about their keys from channel 1345. The value of K, if used to determine the associates, can be sent over channel 145, or it may be set ahead of time by agreement of encoder 115 and decoder 155. Other elements shown in FIG. 13 (and elsewhere herein, whether described as a module, a step, a process, etc., can also be implemented using hardware, software, and/or program code stored on electronically-readable media).

As explained above, channel 1345 can be a real-time channel, such as a path through the Internet or a broadcast link from a television transmitter to a television recipient or a telephone connection from one point to another, or channel 1345 can be a storage channel, such as a CD-ROM, disk drive, Web site, or the like. Channel 1345 might even be a combination of a real-time channel and a storage channel, such as a channel formed when one person transmits an input file from a personal computer to an Internet Service Provider (ISP) over a telephone line, the input file is stored on a Web server and is subsequently transmitted to a recipient over the Internet.

Because channel 1345 is assumed to be an erasure channel, communications system 1300 does not assume a one-to-one correspondence between the output symbols that exit receive module 1350 and the output symbols that go into transmit module 1340. In fact, where channel 1345 comprises a packet network, communications system 1300 might not even be able to assume that the relative order of any two or more packets is preserved in transit through channel 1345. Therefore, the key of the output symbols is determined using one or more of the keying schemes described above, and not necessarily determined by the order in which the output symbols exit receive module 1350.

Receive module 1350 provides the output symbols to a decoder 1355, and any data receive module 1350 receives about the keys of these output symbols is provided to a dynamic key regenerator 1360. Dynamic key regenerator 1360 regenerates the dynamic keys for the received output symbols and provides these dynamic keys to decoder 1355. Static key generator 1363 regenerates the static keys $S_0$, $S_1$, . . . and provides them to decoder 1355. The static key generator has access to random number generator 1335 used both during the encoding and the decoding process. This can be in the form of access to the same physical device if the random numbers are generated on such device, or in the form of access to the same algorithm for the generation of random numbers to achieve identical behavior. Decoder 1355 uses the keys provided by dynamic key regenerator 1360 and static key generator 1363 together with the corresponding output symbols, to recover the input symbols (again IS(0), IS(1), IS(2), . . . ). Decoder 1355 provides the recovered input symbols to an input file reassembler 1365, which generates a copy 1370 of input file 1301 or input stream 1305.

File delivery can be done with multiple receivers and/or multiple senders. These concepts are illustrated in FIGS. 14-15.

Figure 14:
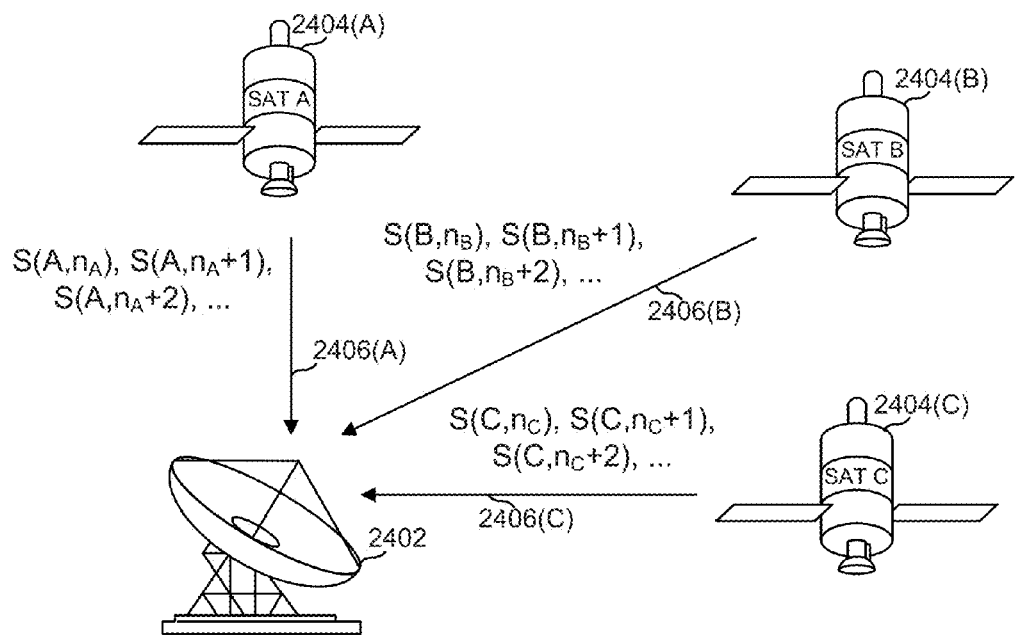
FIG. 14 is an illustration of a communication system where file delivery might be done wherein one receiver receives output symbols from multiple, usually independent, senders.

FIG. 14 illustrates an arrangement wherein one receiver 2402 receives data from three transmitters 2404 (individually denoted "A", "B" and "C") over three channels 2406. This arrangement can be used to triple the bandwidth available to the receiver or to deal with transmitters not being available long enough to obtain an entire file from any one transmitter. As indicated, each transmitter 2404 sends a stream of values, S( ). Each S( ) value represents an output symbol B(I) and a key I, the use of which is explained above. For example, the value $S(A, n_A)$ is the "$n_A$"-th output symbol and "$n_A$"-th key in a sequence of output symbols generated at transmitter 2402(A). The sequence of keys from one transmitter is preferably distinct from the sequence of keys from the other transmitters, so that the transmitters are not duplicating efforts. This is illustrated in FIG. 14 by the fact that the sequence S( ) is a function of the transmitter.

Note that transmitters 2402 do not need to be synchronized or coordinated in order not to duplicate efforts. In fact, without coordination, each transmitter is likely to be in a different location in its sequence (i.e., $n_A \neq n_B \neq n_C$).

Figure 15:
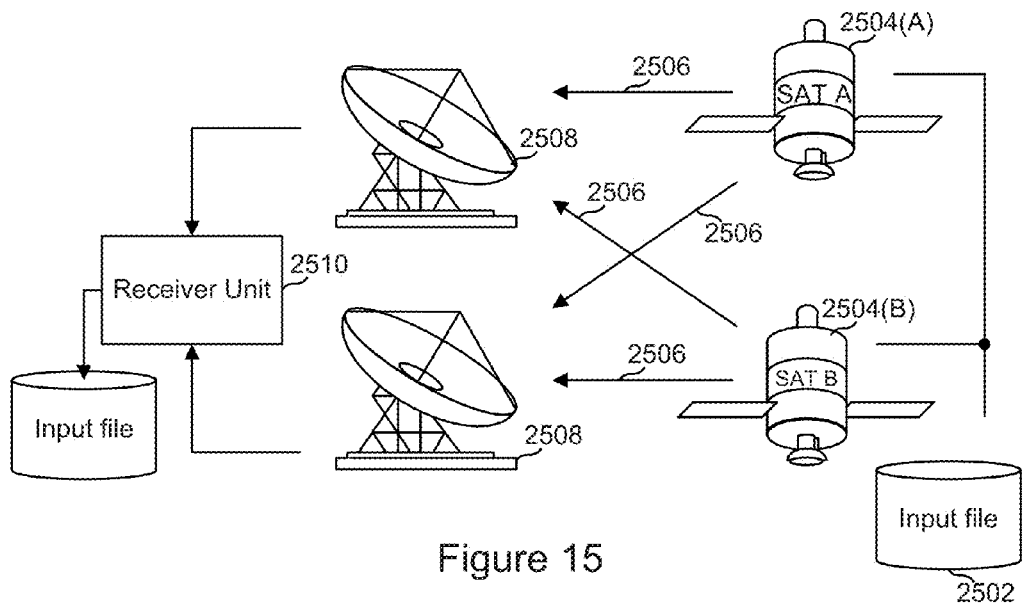
FIG. 15 is an illustration of a communication system where file delivery might be done where multiple, possibly independent, receivers receives output symbols from multiple, usually independent, senders to receive an input file in less time than if only one receiver and/or only one sender is used.

In FIG. 15, copies of one input file 2502 are provided to a plurality of transmitters 2504 (two of which are shown in the figure). Transmitters 2504 independently transmit output symbols generated from the contents of input file 2502 over channels 2506 to receivers 2508. Each transmitter of the two shown might need to only transmit (K+A)/2 output symbols before the receiver's decoder is able to recover the entire input file.

Using two receivers and two transmitters, the total amount of information received by a receiver unit 2510 can be as much as four times the information available over one channel 2506. The amount of information might be less than four times the single channel information if, for example, the transmitters broadcast the same data to both receivers. In that case, the amount of information at receiver unit 2510 is at least double and often more, if data is lost in any channel. Note that, even if the transmitters broadcast only one signal, but the receivers are in view at different times, there is an advantage to having more than one receiver listening to each transmitter. In FIG. 15, receiver unit 2510 performs the functions similar to the functions of receiver 150, decoder 155, key regenerator 160 and input file reassembler 165 shown in FIG. 1.

In some embodiments, input file 2502 is encoded in one computing device having two encoders so that the computing device can provide one output for one transmitter and another output for the other transmitter. Other variations of these examples should be apparent upon review of this disclosure.

It is to be understood that the coding apparatus and methods described herein may also be used in other communication situations and are not limited to communications networks such as the Internet. For example, compact disk technology also uses erasure and error-correcting codes to handle the problem of scratched disks and would benefit from the use of chain reaction codes in storing information thereon. As another example, satellite systems may use erasure codes in order to trade off power requirements for transmission, purposefully allowing for more errors by reducing power and chain reaction coding would be useful in that application. Also, erasure codes have been used to develop RAID (redundant arrays of independent disks) systems for reliability of information storage. The current invention may therefore prove useful in other applications such as the above examples, where codes are used to handle the problems of potentially lossy or erroneous data.

In some preferred embodiments, sets of instructions (or software) to perform the communication processes described above are provided to two or more multi-purpose computing machines that communicate over a possibly lossy communications medium. The number of machines may range from one sender and one recipient to any number of machines sending and/or receiving. The communications medium connecting the machines may be wired, optical, wireless, or the like. The above-described communications systems have many uses, which should be apparent from this description.

A block-request streaming system using an HTTP streaming server might deliver files as described above. Below, an example implementation of such a system is described. With HTTP streaming, the sources might be standard web servers and content delivery networks (CDNs) and might use standard HTTP.

On the client side, requests may be made, using HTTP, for individual segments that are seamlessly spliced together by the client. Advantages of HTTP streaming include the use of standardized and existing infrastructure.

Figure 16:
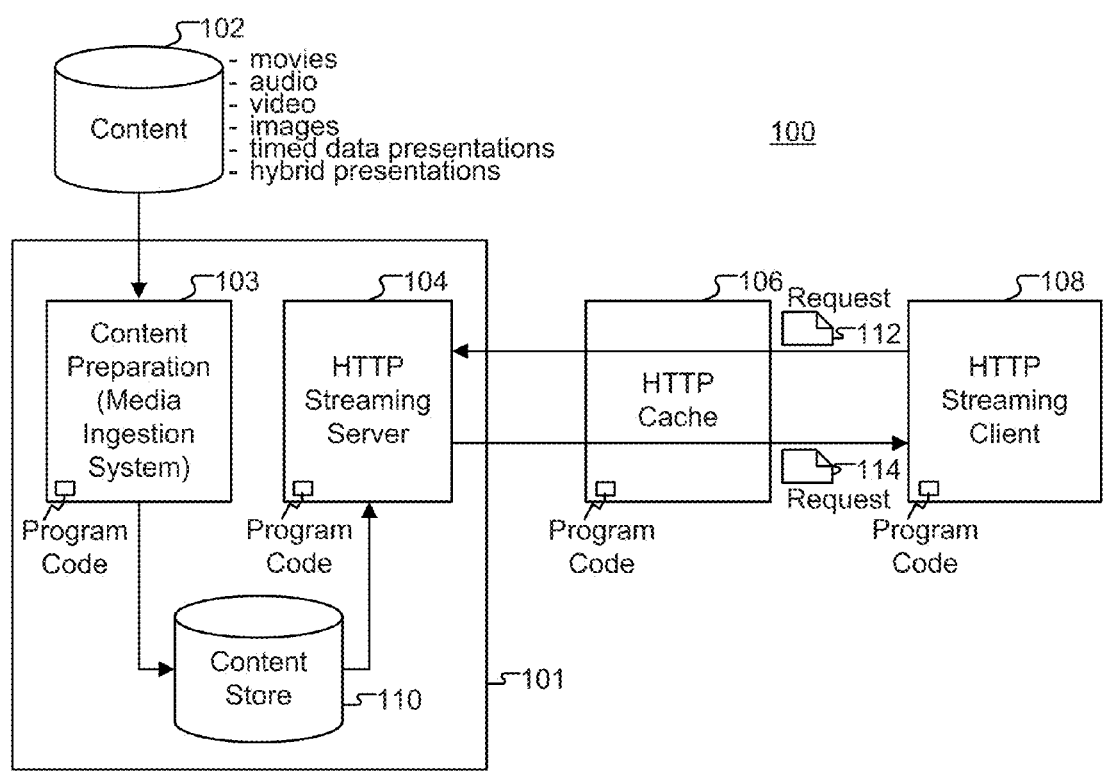
FIG. 16 depicts elements of a block-request streaming system that might be used to provide for file delivery using HTTP streaming servers.

FIG. 16, which shows a simplified diagram of a block-request streaming system that might deliver files. In FIG. 16, a block-streaming system 100 is illustrated, comprising block serving infrastructure ("BSI") 101 in turn comprising an ingestion system 103 for ingesting content 102, preparing that content and packaging it for service by an HTTP streaming server 104 by storing it into a content store 110 that is accessible to both ingestion system 103 and HTTP streaming server 104. As shown, system 100 might also include an HTTP cache 106. In operation, a client 108, such as an HTTP streaming client, sends requests 112 to HTTP streaming server 104 and receives responses 114 from HTTP streaming server 104 or HTTP cache 106. In each case, elements shown in FIG. 16 might be implemented, at least in part, in software, therein comprising program code that is executed on a processor or other electronics.

Figure 17:
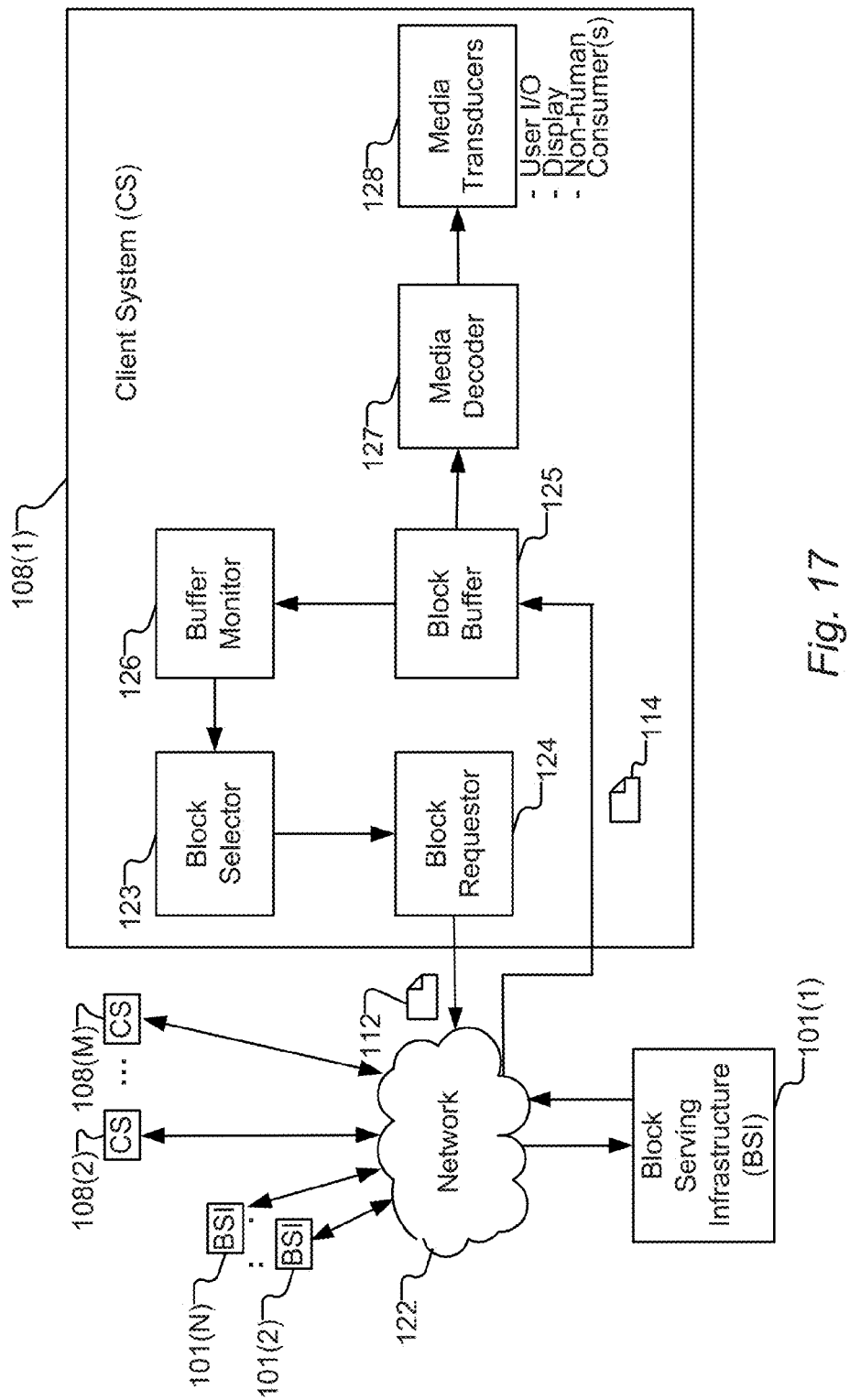
FIG. 17 illustrates the block-request streaming system of FIG. 16, showing greater detail in the elements of a client system that is coupled to a block serving infrastructure ("BSI") to receive data that is processed by a content ingestion system, as might be used for file delivery.

As illustrated in FIG. 17, media blocks may be stored within a block serving infrastructure 101(1), which could be, for example, an HTTP server, a Content Delivery Network device, an HTTP proxy, FTP proxy or server, or some other media server or system. Block serving infrastructure 101(1) is connected to a network 122, which could be, for example, an Internet Protocol ("IP") network such as the Internet. A block-request streaming system client is shown having six functional components, namely a block selector 123, provided with the metadata described above and performing a function of selecting blocks or partial blocks to be requested from among the plurality of available blocks indicated by the metadata, a block requestor 124, that receives request instructions from block selector 123 and performs the operations necessary to send a request for the specified block, portions of a block, or multiple blocks, to block serving infrastructure 101(1) over network 122 and to receive the data comprising the block in return, as well as a block buffer 125, a buffer monitor 126, a media decoder 127 and one or more media transducers 128 that facilitate media consumption.

Block data received by block requestor 124 is passed for temporary storage to block buffer 125, which stores the media data. Alternatively, the received block data can be stored directly into block buffer 125 as illustrated in FIG. 16. Media decoder 127 is provided with media data by block buffer 125 and performs such transformations on this data as are necessary to provide suitable input to media transducers 128, which render the media in a form suitable for user or other consumption. Examples of media transducers include visual display devices such as those found in mobile phones, computer systems or televisions, and might also include audio rendering devices, such as speakers or headphones.

Buffer monitor 126 receives information concerning the contents of block buffer 125 and, based on this information and possibly other information, provides input to block selector 123, which is used to determine the selection of blocks to request, as is described herein.

A block-request streaming system (BRSS) comprises one or more clients that make requests to one or more content servers (for example, HTTP servers, FTP Servers, etc.). An ingestion system comprises one or more ingestion processors, wherein an ingestion processor receives content (in real-time or not), processes the content for use by the BRSS and stores it into storage accessible to the content servers, possibly also along with metadata generated by the ingestion processor.

The BRSS also might contain content caches that coordinate with the content servers. The content servers and content caches might be conventional HTTP servers and HTTP caches that receive requests for files or segments in the form of HTTP requests that include a URL, and may also include a octet range, in order to request less than all of the file or segment indicated by the URL. The clients might include a conventional HTTP client that makes requests of HTTP servers and handles the responses to those requests, where the HTTP client is driven by a novel client system that formulates requests, passes them to the HTTP client, gets responses from the HTTP client and processes those (or storing, transforming, etc.) in order to provide them to a presentation player for playout by a client device. Typically, the client system does not know in advance what media is going to be needed (as the needs might depend on user input, changes in user input, etc.), so it is said to be a "streaming" system in that the media is "consumed" as soon as it is received, or shortly thereafter. As a result, response delays and bandwidth constraints can cause delays in a presentation, such as causing a pause in a presentation as the stream catches up to where the user is in consuming the presentation.

In order to provide for a presentation that is perceived to be of good quality, a number of details can be implemented in the BRSS, either at the client end, at the ingestion end, or both. In some cases, the details that are implemented are done in consideration of, and to deal with, the client-server interface at the network. In some embodiments, both the client system and the ingestion system are aware of the enhancement, whereas in other embodiments, only one side is aware of the enhancement. In such cases, the entire system benefits from the enhancement even though one side is not aware of it, while in others, the benefit only accrues if both sides are aware of it but when one side is not aware, it still operates without failing.

Figure 18:
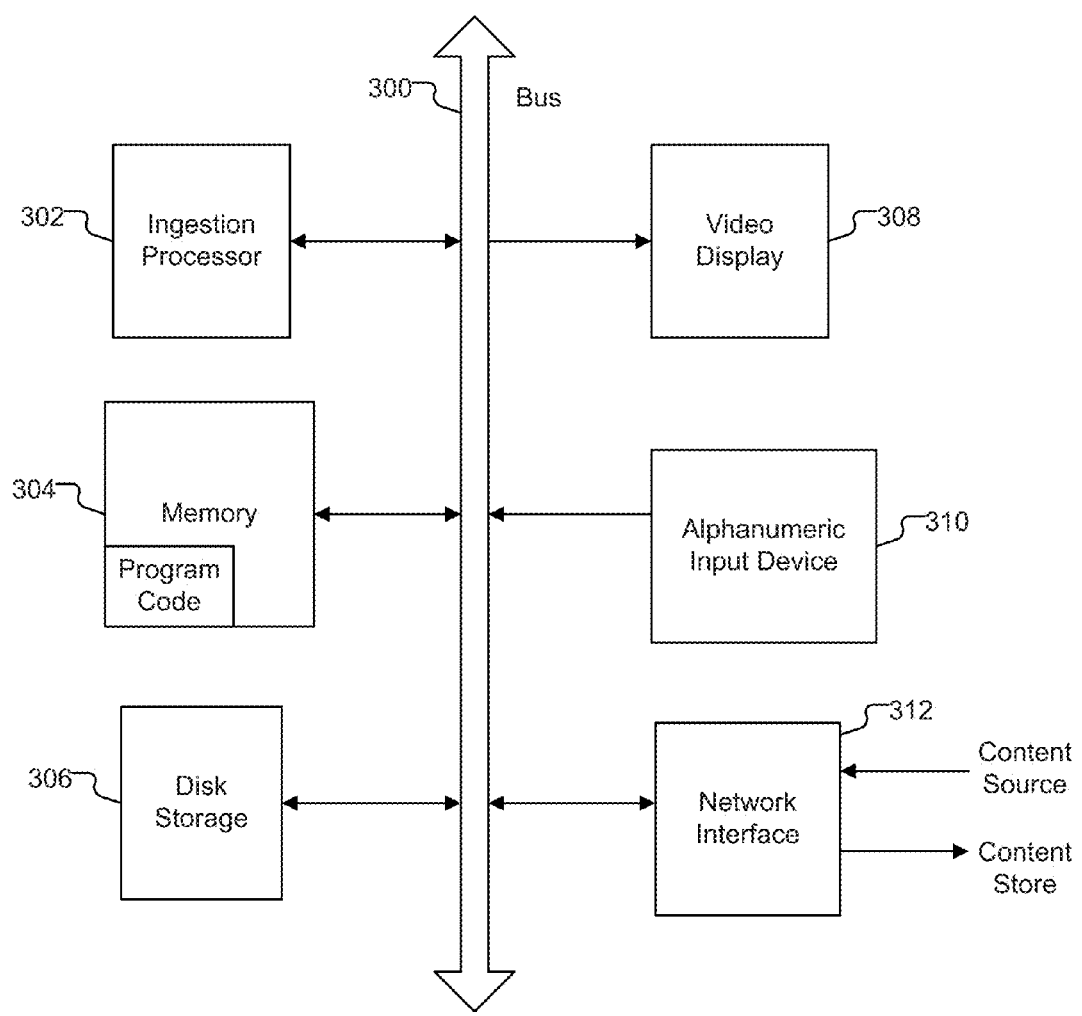
FIG. 18 illustrates a hardware/software implementation of an ingestion system that might be used to prepare files for file delivery.

As illustrated in FIG. 18, the ingestion system may be implemented as a combination of hardware and software components, according to various embodiments. The ingestion system may comprise a set of instructions that can be executed to cause the system to perform any one or more of the methodologies discussed herein. The system may be realized as a specific machine in the form of a computer. The system may be a server computer, a personal computer (PC), or any system capable of executing a set of instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein.

The ingestion system may include the ingestion processor 302 (e.g., a central processing unit (CPU)), a memory 304 which may store program code during execution, and disk storage 306, all of which communicate with each other via a bus 300. The system may further include a video display unit 308 (e.g., a liquid crystal display (LCD) or cathode ray tube (CRT)). The system also may include an alphanumeric input device 310 (e.g., a keyboard), and a network interface device 312 for receiving content source and delivering content store.

The disk storage unit 306 may include a machine-readable medium on which may be stored one or more sets of instructions (e.g., software) embodying any one or more of the methodologies or functions described herein. The instructions may also reside, completely or at least partially, within the memory 304 and/or within the ingestion processor 302 during execution thereof by the system, with the memory 304 and the ingestion processor 302 also constituting machine-readable media.

Figure 19:
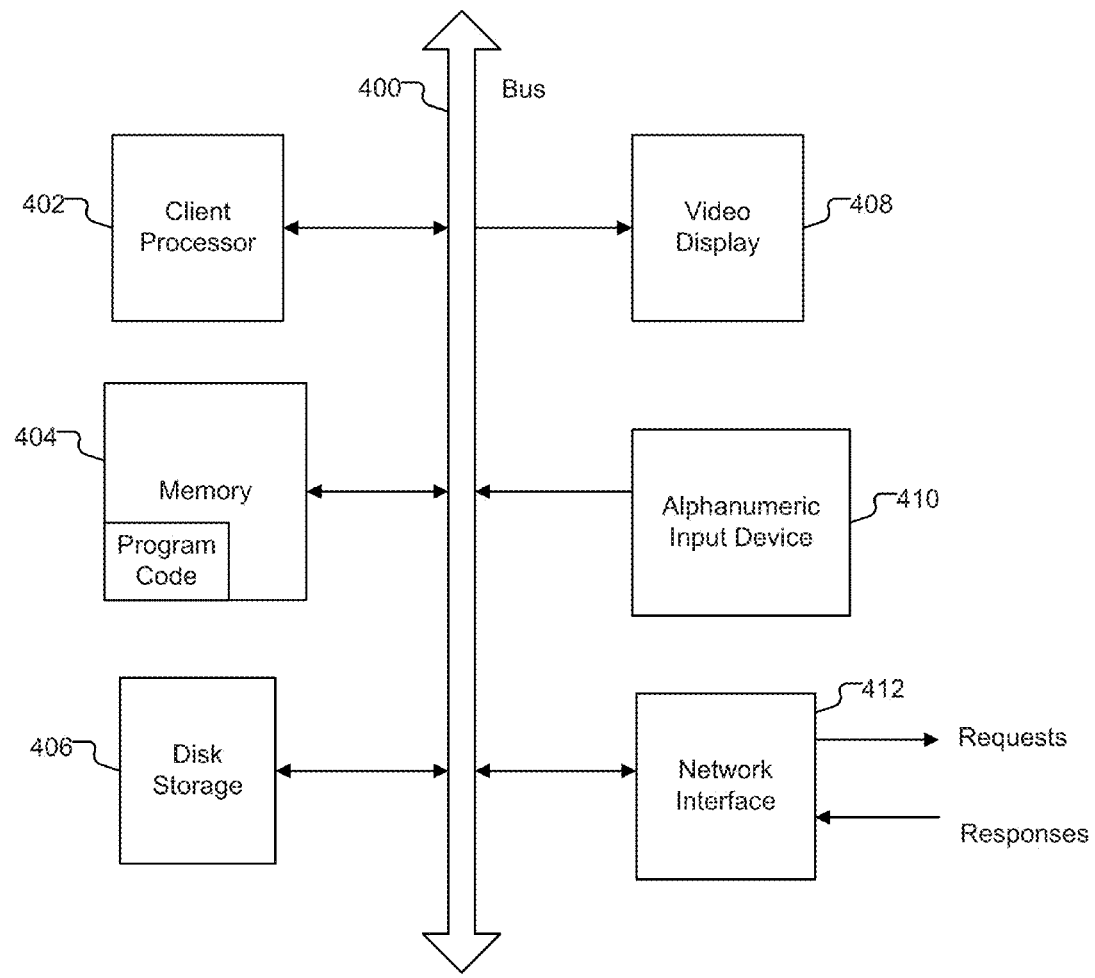
FIG. 19 illustrates a hardware/software implementation of a client system that might be used to receive files delivered to the client system.

As illustrated in FIG. 19, the client system may be implemented as a combination of hardware and software components, according to various embodiments. The client system may comprise a set of instructions that can be executed to cause the system to perform any one or more of the methodologies discussed herein. The system may be realized as a specific machine in the form of a computer. The system may be a server computer, a personal computer (PC), or any system capable of executing a set of instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein.

The client system may include the client processor 402 (e.g., a central processing unit (CPU)), a memory 404 which may store program code during execution, and disk storage 406, all of which communicate with each other via a bus 400. The system may further include a video display unit 408 (e.g., a liquid crystal display (LCD) or cathode ray tube (CRT)). The system also may include an alphanumeric input device 410 (e.g., a keyboard), and a network interface device 412 for sending requests and receiving responses.

The disk storage unit 406 may include a machine-readable medium on which may be stored one or more sets of instructions (e.g., software) embodying any one or more of the methodologies or functions described herein. The instructions may also reside, completely or at least partially, within the memory 404 and/or within the client processor 402 during execution thereof by the system, with the memory 404 and the client processor 402 also constituting machine-readable media.

Example of a Particular Embodiment

A specific embodiment is described in this section of a fully-specified FEC scheme for universal object delivery using the RaptorQ FEC scheme specified in [RaptorQ-Spec]. The UOSI FEC payload ID can be used together with RaptorQ FEC Scheme in [RaptorQ-Spec] (herein referred to as the "UOD-RaptorQ FEC Scheme") to provide simplified and enhanced object delivery capabilities. In particular, more flexible and simpler support is provided for basic object delivery, and support is also provided for unequal error protection (UEP) object delivery, for bundled object delivery, and for combinations of UEP and bundled object delivery. It should be understood that suitable hardware and/or software can be used to implement the "UOD-RaptorQ FEC Scheme" between communicating devices.

The FEC Payload ID format is a 4-octet field as illustrated in FIG. 2, where in this specific implementation, the Universal File Symbol Identifier (UFSI), a 32-bit, unsigned integer, is generalized by a Universal Object Symbol Identifier (UOSI), also a 32-bit, unsigned integer. The UOSI is a non-negative integer that, in conjunction with the FEC OTI, is used to identify the encoding symbols contained within a packet carrying that payload ID.

For the delivery of a single object, or multiple objects, or a single object partitioned into parts with different priorities, or any combination of these, the FEC OTI is as described below. It should be noted that for each object delivered, the FEC OTI can be the same as specified by the RaptorQ FEC Scheme. A delivery might comprise d objects, for some positive integer d. Each object may comprise different parts of the same file, or different files, or combinations thereof. The relationship between the size, $F_i$, of an object, i, and the size, $T_i$, of the encoding symbol to be used for object i can be used to determine the priority of object i in the transmission.

FIG. 20 illustrates an example of a Common FEC OTI field. As used therein, there is an 8-bit, unsigned integer for the number of objects, d, delivered and the example shown is for d=2. A default value might be d=1. Other subfields include are, for each of the d objects (i.e., for i=1, ..., d), the Common FEC OTI elements specific to object i include a 16-bit unsigned integer for the symbol size, $T_i$, a positive integer that is less than $2^{16}$, indicating the size of a symbol for object i in units of octets, a 40-bit unsigned integer for the transfer length, $F_i$, of object i, which is a non-negative integer that is at most $2^{40}$, indicating the transfer length of object i in units of octets. Suitable padding is provided.

In contrast to the Common FEC OTI field, there might be a Scheme-Specific FEC OTI element, such as is shown in FIG. 21. As shown in that example, the Scheme-Specific FEC OTI element includes a symbol alignment parameter (Al) (8 bits, unsigned integer), Scheme-Specific FEC OTI elements for each object, comprising the number, $Z_i$, of source blocks for object i (12 bits, unsigned integer), and the number, $N_i$, of sub-blocks for object i. The encoded Scheme-specific Object Transmission Information is a (1+3*d)-octet field. The example in FIG. 21 is for d=2. The encoded FEC OTI can then be a (2+10*d)-octet field comprising a concatenation of the encoded Common FEC OTI and the encoded Scheme-specific FEC OTI elements.

Content delivery using the encoded FEC OTI can involve an information exchange between devices, computers, programs of systems using the UOD-RaptorQ FEC Scheme and a content delivery protocol ("CDP") that makes use of the UOD-RaptorQ FEC Scheme for object delivery. The CDP should provide an encoder and decoder with d, Al, and for each object, $F_i$, $T_i$ (a multiple of Al), $Z_i$ and $N_i$. The encoder is provided with the objects, i, themselves. The encoder that uses the UOD-RaptorQ encoder scheme would supply the CDP, for each packet to be sent, the packet's UOSI and the encoding symbol(s) for the d object(s). The CDP communicates this information to the receiver.

Examples of Parameter Selection Will Now be Described.

In one example, the example parameter derivation described in Section 4.3 of [RaptorQ-Spec] might be used, applied independently to each of the d objects. In an example, Al=4 octets, SS=8 (which implies that the each sub-symbol will be at least SS*Al=32 octets), and $T_i$ for object i is preferably at least SS*Al octets, with $T_i$ being a multiple of Al, while the payload size of each encoding packet is preferably of size at least T, where T is the sum over i=1, . . . , d of $T_i$.

For source block construction, the procedures in Section 4.4.1 of [RaptorQ-Spec] might be applied independently to each of the d objects.

For encoding packet construction, each encoding packet would contain a UOSI and the encoding symbol(s) for the d object(s). For compatibility between the (SBN, ESI) format of the FEC Payload ID used by the RaptorQ FEC Scheme of [RaptorQ-Spec] and the UOSI format used by the UOD-RaptorQ FEC Scheme might be a specific format. For example, for each object, the mapping from a UOSI value, C, to the corresponding (SBN, ESI) values (A, B) for an object i might be where B=floor($C/Z_i$) and A=C–B*$Z_i$. Similarly, for each object, the mapping from (SBN, ESI) values (A, B) for object i to a corresponding UOSI value C would be C=A+B*$Z_i$.

For each object i=1, . . . , d, UOSI values from 0 to $KT_i$–1 identify the source symbols of object i in source block interleaved order, wherein $KT_i$=ceil($F_i/T_i$). UOSI values from $KT_i$ onwards identify repair symbols generated from the source symbols of object i using the RaptorQ encoder.

Encoding packets may contain source symbols, repair symbols, or combinations of source and repair symbols. A packet may contain any number of symbols from the same source block of object i. Where the last source symbol in a source packet for object i includes padding octets added for FEC encoding purposes, these octets should be included in the packet, so that only whole symbols are included in each packet.

The Universal Object Symbol Identifier, C, carried in each encoding packet is the UOSI of the first encoding symbol for each object carried in that packet. The subsequent encoding symbols in the packet for each object have the UOSIs numbered from C+1 to C+G–1, in sequential order, where G is the number of encoding symbols for each object in the packet.

In a preferred implementation, there is one encoded symbol for each of the d objects in each encoding packet. In a preferred implementation, encoding packets are generated and sent according to the following procedure. For each UOSI value C=0, 1, 2, 3, . . . , the encoder generates and sends an encoding packet as follows with the value of the FEC Payload ID of the encoding packet set to the UOSI value, C, and for each object i in i=1, . . . , d, the encoder determines the (SBN, ESI) values ($A_i$, $B_i$) that correspond to UOSI value C, generates an encoding symbol, $E_i$, of size $T_i$ that corresponds to (SBN, ESI) values ($A_i$, $B_i$) from object i according to the procedures of the RaptorQ FEC Scheme [RaptorQ-Spec], adds encoding symbol $E_i$ to the payload of the encoding packet and sends the encoding packet. Note that it is not necessary for the receiver to know the total number of encoding packets.

This is one specific example. Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method of delivering a plurality of data objects from an electronic device or system over a packet-switched network, wherein source data of the plurality of data objects is represented by encoded symbols in packets such that at least some of the source data is recoverable from the encoded symbols, the method comprising:
   a) identifying object transmission information ("OTI") for each data object of the plurality of data objects to be delivered, including F, a size of the data object in octets, T, a number of octets used to represent each symbol used for representing the data object, and Z, a number of source blocks into which the data object is partitioned for delivery;
   b) generating a universal object symbol identifier ("UOSI") for each packet of a plurality of packets for the plurality of data objects;
   c) generating a plurality of encoded symbols from a plurality of source symbols comprising the source data representing the plurality of data objects, each of the source symbols having a position in the source data, wherein generating an encoded symbol for a given data object of at least two data objects represented in the given packet comprises:
      1) determining an FEC encoding process to use;
      2) determining, from the UOSI of the given packet and the OTI of the given data object, a source block number ("SBN") and an encoded symbol identifier ("ESI"); and
      3) generating, for that encoded symbol, an encoded symbol value of size T based on at least (a) the FEC encoding process, (b) one or more source symbols from a source block of the Z source blocks determined from the SBN of that encoded symbol, and (c) the ESI of that encoded symbol,
   wherein the UOSI of the given packet allows identification of each encoded symbol for each data object represented in the given packet, and the SBN or the ESI of encoded symbols for different data objects of the at least two data objects represented in the given packet can differ;
   d) generating an OTI field that includes a representation of the OTI for each of the data objects handled in step a), wherein the OTI field also includes d, the number of data objects represented by the OTI field;
   e) generating the plurality of packets for the plurality of data objects, wherein each packet of the plurality of packets comprises the UOSI for that packet and one or more encoded symbols for each data object represented in that packet generated from that data object using the OTI for that data object and the UOSI for that packet; and
   f) outputting the OTI field and the plurality of packets in a form usable by the packet-switched network.

2. The method of claim 1, wherein the OTI for each data object also includes N, a number of sub-blocks into which each source block of the data object is partitioned for transmission.

3. The method of claim 1, further comprising:
setting SBN equal to UOSI modulo Z; and
setting ESI equal to the largest integer that is smaller than or equal to UOSI divided by Z.

4. A method of delivering a plurality of data objects from an electronic device or system over a packet-switched network, wherein source data of the plurality of data objects is represented by encoded symbols in packets such that at least some of the source data is recoverable from the encoded symbols, the method comprising:
  a) identifying object transmission information ("OTI") for each data object of the plurality of data objects to be delivered, wherein OTI for two data objects in one delivery can differ;
  b) generating a universal object symbol identifier ("UOSI") for each packet of a plurality of packets for the plurality of data objects;
  c) generating a plurality of encoded symbols from a plurality of source symbols comprising the source data representing the plurality of data objects, each of the source symbols having a position in the source data, wherein generating an encoded symbol for a given data object of at least two data objects represented in the given packet comprises determining a value for that encoded symbol from (a) the UOSI of the given packet, (b) the OTI of the given data object, and (c) one or more source symbol values, wherein the UOSI of the given packet allows identification of each encoded symbol for each data object represented in the given packet, and an identifier of encoded symbols for different data objects of the at least two data objects represented in the given packet can differ;
  d) generating the plurality of packets for the plurality of data objects to be delivered, wherein each packet of the plurality of packets comprises the UOSI for that packet and one or more encoded symbols for each data object represented in that packet generated from that data object using the OTI for that data object and the UOSI for that packet; and
  e) outputting at least the plurality of packets in a form usable by the packet-switched network.

5. The method of claim 4, further comprising labeling symbols such that a receiver can determine if a symbol corresponds to a source symbol of a data object or an FEC repair symbol usable in an FEC decoding process for recovery of one or more source symbols, wherein the receiver performs the determination by comparing the UOSI for the packet comprising the symbol to a value representing a number of symbols in a data object.

6. The method of claim 4, wherein the UOSI is a non-negative integer and the OTI for each data object includes a size of the data object in octets, a number of octets used to represent each symbol used for representing the data object, a number of source blocks into which the data object is partitioned for delivery, a number of sub-blocks into which source blocks are partitioned, and an alignment factor corresponding to a preferred memory alignment.

7. The method of claim 4, wherein
  the OTI of the given data object includes a base UOSI value; and
  determining a value for that encoded symbol from (a) the UOSI of the given packet, (b) the OTI of the given data object, and (c) one or more source symbol values comprises adjusting the UOSI of the given packet by the base UOSI value prior to the determining a value for that encoded symbol, thereby allowing for offset values of the UOSI.

8. The method of claim 4, wherein determining a value for that encoded symbol comprises using forward error correction ("FEC") and wherein different levels of FEC protection are allowed for different data objects of the at least two data objects represented in the given packet and a level of FEC protection is determined from the OTI for each different data object.

9. The method of claim 4, wherein an OTI field comprises a plurality of OTI subfields, one per data object, and a count subfield indicating the number of data objects in the plurality of data objects, wherein not all of the OTI subfields are the same, and wherein an OTI subfield is generated independently of at least one other OTI subfield.

10. The method of claim 9, wherein each OTI subfield includes, for its data object, a size of the data object, a number of source blocks into which the data object is partitioned for transport, a number of sub-blocks used per source block, a symbol size used, and an alignment factor, wherein the number of source blocks for at least two data objects differs.

11. The method of claim 4, wherein the plurality of data objects comprise at least a first data object and a second data object, wherein the delivery is organized into at least two separate packet sequences, wherein encoding symbols for the first data object appear in packets of a first packet sequence and in packets of a second packet sequence, and encoding symbols for the second data object appear in packets of the first packet sequence but not in packets of the second packet sequence.

12. The method of claim 4, wherein each of the plurality of data objects comprises a distinct file stored in computer-readable media that stores data as files.

13. The method of claim 4, wherein at least one of the plurality of data objects comprises a portion of a distinct file stored in computer-readable media that stores data as files.

14. A method of receiving and decoding, using an electronic device or system, a plurality of data objects received over a packet-switched network, wherein encoded symbols received are decoded into source symbols representing the plurality of data objects when sufficient encoded symbols are received, the method comprising:
  a) identifying object transmission information ("OTI") for each data object of the plurality of data objects delivered, wherein OTI for two data objects in one delivery can differ;
  b) determining, for each encoded symbol to be used in decoding, a data object for which the encoded symbol encodes source symbols of that data object, an encoded symbol value, and a universal object symbol identifier ("UOSI") for a packet comprising the encoded symbol;
  c) determining, for each encoded symbol to be used in decoding, decoding parameters used for decoding, wherein determining uses the UOSI for the packet comprising the encoded symbol and the corresponding data object's OTI to determine the decoding parameters, wherein the UOSI for the packet allows identification of each encoded symbol for each data object represented in the packet, and a decoding parameter of encoded symbols for different data objects of at least two data objects represented in the packet can differ;
  d) decoding the encoded symbols into recovered source symbols representing data objects using encoded symbols and decoding parameters determined in step c); and
  e) outputting the recovered source symbols in a computer-readable form.

15. The method of claim 14, further comprising receiving the OTI with the received encoded symbols.

16. The method of claim 14, wherein the decoding parameters comprise a source block number and an encoded symbol identifier, the method further comprising:
setting the source block number equal to the UOSI modulo a number of source blocks used; and
setting the encoded symbol identifier equal to the largest integer that is smaller than or equal to UOSI divided by the number of source blocks used.

17. The method of claim 14, further comprising determining, for each of a plurality of the encoded symbols, if the encoded symbol corresponds to a source symbol or a forward error correction ("FEC") repair symbol usable in an FEC decoding process for recovery of one or more source symbols, wherein a receiver performs the determination by comparing the UOSI for the packet comprising the encoded symbol to a value representing a number of symbols in a data object.

18. The method of claim 14, wherein the UOSI is a non-negative integer and the OTI for each of a plurality of data objects includes a size of each data object in octets, a number of octets used to represent each symbol used for representing each data object, a number of source blocks into which each data object is partitioned for delivery, a number of sub-blocks into which source blocks are partitioned, and an alignment factor corresponding to a preferred memory alignment, wherein OTI values differ for the at least two data objects represented in the packet and different levels of forward error correction ("FEC") are used for the at least two data objects represented in the packet.

19. An apparatus for delivering a plurality of data objects from an electronic device or system over a packet-switched network, wherein source data of the plurality of data objects is represented by encoded symbols in packets such that at least some of the source data is recoverable from the encoded symbols, the apparatus comprising memory and a processor, the memory and processor configured to perform operations comprising:
a) identifying object transmission information ("OTI") for each data object of the plurality of data objects to be delivered, including F, a size of the data object in octets, T, a number of octets used to represent each symbol used for representing the data object, and Z, a number of source blocks into which the data object is partitioned for delivery;
b) generating a universal object symbol identifier ("UOSI") for each packet of a plurality of packets for the plurality of data objects;
c) generating a plurality of encoded symbols from a plurality of source symbols comprising the source data representing the plurality of data objects, each of the source symbols having a position in the source data, wherein generating an encoded symbol for a given data object of at least two data objects represented in the given packet comprises:
1) determining an FEC encoding process to use;
2) determining, from the UOSI of the given packet and the OTI of the given data object, a source block number ("SBN") and an encoded symbol identifier ("ESI"); and
3) generating, for that encoded symbol, an encoded symbol value of size T based on at least (a) the FEC encoding process, (b) one or more source symbols from a source block of the Z source blocks determined from the SBN of that encoded symbol, and (c) the ESI of that encoded symbol,
wherein the UOSI of the given packet allows identification of each encoded symbol for each data object represented in the given packet, and the SBN or the ESI of encoded symbols for different data objects of the at least two data objects represented in the given packet can differ;
d) generating an OTI field that includes a representation of the OTI for each of the data objects handled in step a), wherein the OTI field also includes d, the number of data objects represented by the OTI field;
e) generating the plurality of packets for the plurality of data objects, wherein each packet of the plurality of packets comprises the UOSI for that packet and one or more encoded symbols for each data object represented in that packet generated from that data object using the OTI for that data object and the UOSI for that packet; and
f) outputting the OTI field and the plurality of packets in a form usable by the packet-switched network.

20. The apparatus of claim 19, wherein the memory and processor are configured to perform operations such that the OTI for each data object also includes N, a number of sub-blocks into which each source block of the data object is partitioned for transmission.

21. The apparatus of claim 19, wherein the memory and processor are configured to perform operations further comprising:
setting SBN equal to UOSI modulo Z; and
setting ESI equal to the largest integer that is smaller than or equal to UOSI divided by Z.

22. An apparatus for delivering a plurality of data objects from an electronic device or system over a packet-switched network, wherein source data of the plurality of data objects is represented by encoded symbols in packets such that at least some of the source data is recoverable from the encoded symbols, the apparatus comprising memory and a processor, the memory and processor configured to perform operations comprising:
a) identifying object transmission information ("OTI") for each data object of the plurality of data objects to be delivered, wherein OTI for two data objects in one delivery can differ;
b) generating a universal object symbol identifier ("UOSI") for each packet of a plurality of packets for the plurality of data objects;
c) generating a plurality of encoded symbols from a plurality of source symbols comprising the source data representing the plurality of data objects, each of the source symbols having a position in the source data, wherein generating an encoded symbol for a given data object of at least two data objects represented in the given packet comprises determining a value for that encoded symbol from (a) the UOSI of the given packet, (b) the OTI of the given data object, and (c) one or more source symbol values, wherein the UOSI of the given packet allows identification of each encoded symbol for each data object represented in the given packet, and an identifier of encoded symbols for different data objects of the at least two data objects represented in the given packet can differ;
d) generating the plurality of packets for the plurality of data objects to be delivered, wherein each packet of the plurality of packets comprises the UOSI for that packet and one or more encoded symbols for each data object represented in that packet generated from that data object using the OTI for that data object and the UOSI for that packet; and
e) outputting at least the plurality of packets in a form usable by the packet-switched network.

23. The apparatus of claim 22, wherein the memory and processor are configured to perform operations further comprising labeling symbols such that a receiver can determine if a symbol corresponds to a source symbol of a data object or an FEC repair symbol usable in an FEC decoding process for recovery of one or more source symbols, wherein the receiver performs the determination by comparing the UOSI for the packet comprising the symbol to a value representing a number of symbols in a data object.

24. The apparatus of claim 22, wherein the memory and processor are configured to perform operations such that the UOSI is a non-negative integer and the OTI for each data object includes a size of the data object in octets, a number of octets used to represent each symbol used for representing the data object, a number of source blocks into which the data object is partitioned for delivery, a number of sub-blocks into which source blocks are partitioned, and an alignment factor corresponding to a preferred memory alignment.

25. The apparatus of claim 22, wherein the memory and processor are configured to perform operations such that
the OTI of the given data object includes a base UOSI value; and
determining a value for that encoded symbol from (a) the UOSI of the given packet, (b) the OTI of the given data object, and (c) one or more source symbol values comprises adjusting the UOSI of the given packet by the base UOSI value prior to the determining a value for that encoded symbol, thereby allowing for offset values of the UOSI.

26. The apparatus of claim 22, wherein the memory and processor are configured to perform operations such that determining a value for that encoded symbol comprises using forward error correction ("FEC") and wherein different levels of FEC protection are allowed for different data objects of the at least two data objects represented in the given packet and a level of FEC protection is determined from the OTI for each different data object.

27. The apparatus of claim 22, wherein the memory and processor are configured to perform operations such that an OTI field comprises a plurality of OTI subfields, one per data object, and a count subfield indicating the number of data objects in the plurality of data objects, wherein not all of the OTI subfields are the same, and wherein an OTI subfield is generated independently of at least one other OTI subfield.

28. The apparatus of claim 27, wherein the memory and processor are configured to perform operations such that each OTI subfield includes, for its data object, a size of the data object, a number of source blocks into which the data object is partitioned for transport, a number of sub-blocks used per source block, a symbol size used, and an alignment factor, wherein the number of source blocks for at least two data objects differs.

29. The apparatus of claim 22, wherein the memory and processor are configured to perform operations such that the plurality of data objects comprise at least a first data object and a second data object, wherein the delivery is organized into at least two separate packet sequences, wherein encoding symbols for the first data object appear in packets of a first packet sequence and in packets of a second packet sequence, and encoding symbols for the second data object appear in packets of the first packet sequence but not in packets of the second packet sequence.

30. The apparatus of claim 22, wherein the memory and processor are configured to perform operations such that each of the plurality of data objects comprises a distinct file stored in computer-readable media that stores data as files.

31. The apparatus of claim 22, wherein the memory and processor are configured to perform operations such that at least one of the plurality of data objects comprises a portion of a distinct file stored in computer-readable media that stores data as files.

32. An apparatus for receiving and decoding, using an electronic device or system, a plurality of data objects received over a packet-switched network, wherein encoded symbols received are decodable into source symbols representing the plurality of data objects when sufficient encoded symbols are received, the apparatus comprising memory and a processor, the memory and processor configured to perform operations comprising:
a) identifying object transmission information ("OTI") for each data object of the plurality of data objects delivered, wherein OTI for two data objects in one delivery can differ;
b) determining, for each encoded symbol to be used in decoding, a data object for which the encoded symbol encodes source symbols of that data object, an encoded symbol value, and a universal object symbol identifier ("UOSI") for a packet comprising the encoded symbol;
c) determining, for each encoded symbol to be used in decoding, decoding parameters used for decoding, wherein determining uses the UOSI for the packet comprising the encoded symbol and the corresponding data object's OTI to determine the decoding parameters, wherein the UOSI for the packet allows identification of each encoded symbol for each data object represented in the packet, and a decoding parameter of encoded symbols for different data objects of at least two data objects represented in the packet can differ;
d) decoding the encoded symbols into recovered source symbols representing data objects using encoded symbols and decoding parameters determined in step c); and
e) outputting the recovered source symbols in a computer-readable form.

33. The apparatus of claim 32, wherein the memory and processor are configured to perform operations further comprising receiving the OTI with the received encoded symbols.

34. The apparatus of claim 32, wherein the memory and processor are configured to perform operations such that the decoding parameters comprise a source block number and an encoded symbol identifier, wherein the memory and processor are configured to perform operations further comprising:
setting the source block number equal to the UOSI modulo a number of source blocks used; and
setting the encoded symbol identifier equal to the largest integer that is smaller than or equal to UOSI divided by the number of source blocks used.

35. The apparatus of claim 32, wherein the memory and processor are configured to perform operations further comprising determining, for each of a plurality of the encoded symbols, if the encoded symbol corresponds to a source symbol or a forward error correction ("FEC") repair symbol usable in an FEC decoding process for recovery of one or more source symbols, wherein a receiver performs the determination by comparing the UOSI for the packet comprising the encoded symbol to a value representing a number of symbols in a data object.

36. The apparatus of claim 32, wherein the memory and processor are configured to perform operations such that the UOSI is a non-negative integer and the OTI for each of a plurality of data objects includes a size of each data object in octets, a number of octets used to represent each symbol used for representing each data object, a number of source blocks into which each data object is partitioned for delivery, a number of sub-blocks into which source blocks are partitioned, and an alignment factor corresponding to a preferred memory alignment, wherein OTI values differ for the at least two data objects represented in the packet and different levels of forward error correction ("FEC") are used for the at least two data objects represented in the packet.

37. A non-transitory processor-readable storage medium having stored thereon processor-executable instructions configured to cause a processor of a computing device to perform operations for receiving and decoding a plurality of data objects received over a packet-switched network, wherein encoded symbols received are decodable into source symbols representing the plurality of data objects when sufficient encoded symbols are received, the operations comprising:

a) identifying object transmission information ("OTI") for each data object of the plurality of data objects delivered, wherein OTI for two data objects in one delivery can differ;
  b) determining, for each encoded symbol to be used in decoding, a data object for which the encoded symbol encodes source symbols of that data object, an encoded symbol value, and a universal object symbol identifier ("UOSI") for a packet comprising the encoded symbol;
  c) determining, for each encoded symbol to be used in decoding, decoding parameters used for decoding, wherein determining uses the UOSI for the packet comprising the encoded symbol and the corresponding data object's OTI to determine the decoding parameters, wherein the UOSI for the packet allows identification of each encoded symbol for each data object represented in the packet, and a decoding parameter of encoded symbols for different data objects of at least two data objects represented in the packet can differ;
  d) decoding the encoded symbols into recovered source symbols representing data objects using encoded symbols and decoding parameters determined in step c); and
  e) outputting the recovered source symbols in a computer-readable form.

38. The non-transitory processor-readable storage medium of claim 37, wherein the memory and processor are configured to perform operations further comprising receiving the OTI with the received encoded symbols.

39. The non-transitory processor-readable storage medium of claim 37, wherein the stored processor-executable instructions are configured to cause the processor to perform operations such that the decoding parameters comprise a source block number and an encoded symbol identifier, wherein the memory and processor are configured to perform operations further comprising:

setting the source block number equal to the UOSI modulo a number of source blocks used; and
  setting the encoded symbol identifier equal to the largest integer that is smaller than or equal to UOSI divided by the number of source blocks used.

40. The non-transitory processor-readable storage medium of claim 37, wherein the stored processor-executable instructions are configured to cause the processor to perform operations further comprising determining, for each of a plurality of the encoded symbols, if the encoded symbol corresponds to a source symbol or a forward error correction ("FEC") repair symbol usable in an FEC decoding process for recovery of one or more source symbols, wherein a receiver performs the determination by comparing the UOSI for the packet comprising the encoded symbol to a value representing a number of symbols in a data object.

41. The non-transitory processor-readable storage medium of claim 37, wherein the stored processor-executable instructions are configured to cause the processor to perform operations such that the UOSI is a non-negative integer and the OTI for each of a plurality of data objects includes a size of each data object in octets, a number of octets used to represent each symbol used for representing each data object, a number of source blocks into which each data object is partitioned for delivery, a number of sub-blocks into which source blocks are partitioned, and an alignment factor corresponding to a preferred memory alignment, wherein OTI values differ for the at least two data objects represented in the packet and different levels of forward error correction ("FEC") are used for the at least two data objects represented in the packet.

* * * * *